(12) United States Patent
Dangi et al.

(10) Patent No.: US 10,163,371 B1
(45) Date of Patent: *Dec. 25, 2018

(54) ROTATING BIT VALUES BASED ON A DATA STRUCTURE WHILE GENERATING A LARGE, NON-COMPRESSIBLE DATA STREAM

(71) Applicant: EMC IP Holding Company LLC, Hopkinton, MA (US)

(72) Inventors: Salil Dangi, Mission Viejo, CA (US); James Zarbock, El Toro, CA (US); Ernest Daza, Rancho Santa Margarita, CA (US)

(73) Assignee: EMC IP Holding Company LLC, Hopkinton, MA (US)

( * ) Notice: Subject to any disclaimer, the term of this patent is extended or adjusted under 35 U.S.C. 154(b) by 0 days.

This patent is subject to a terminal disclaimer.

(21) Appl. No.: 15/420,633

(22) Filed: Jan. 31, 2017

Related U.S. Application Data

(63) Continuation-in-part of application No. 14/489,317, filed on Sep. 17, 2014, now Pat. No. 10,038,733.

(51) Int. Cl.
*G09C 5/00* (2006.01)
*G06F 3/06* (2006.01)
*G06N 7/00* (2006.01)
*G06F 7/58* (2006.01)

(52) U.S. Cl.
CPC .............. *G09C 5/00* (2013.01); *G06F 3/067* (2013.01); *G06F 3/0608* (2013.01); *G06F 3/0641* (2013.01); *G06N 7/005* (2013.01); *G06F 7/588* (2013.01)

(58) Field of Classification Search
CPC ......... H03M 7/30; H03M 7/6058; G06F 1/58; G06F 7/588; G06F 7/58
USPC .................................................. 708/203, 254
See application file for complete search history.

(56) References Cited

U.S. PATENT DOCUMENTS

2010/0036900 A1* 2/2010 Ross ..................... G06F 7/58 708/254
2011/0299581 A1* 12/2011 Le-Gall .......... G01R 31/318385 375/224

\* cited by examiner

*Primary Examiner* — Andrew Caldwell
*Assistant Examiner* — Emily E Larocque
(74) *Attorney, Agent, or Firm* — Peter Jovanovic; Theodore A. Chen; Krishnendu Gupta

(57) ABSTRACT

Generating non-compressible data streams is disclosed, including: receiving a sequence comprising a plurality of byte values calculated from an initialization parameter and a constrained prime number; determining a data structure index from a plurality of bits within at least one of the plurality of byte values; retrieving a rotation value from a data structure, wherein the rotation value is stored in the data structure at the data structure index; and rotating a portion of the sequence based on a rotation value to form a rotated sequence, wherein the rotated sequence comprises byte values substantially defeating a predictive compression algorithm.

15 Claims, 58 Drawing Sheets

Sample Primes that are a Member of the Set PrimeM

| Decimal | Hexadecimal | Category | Reason For Categorization |
|---|---|---|---|
| 16,975,109 | 01 03 05 05 | Bad | All bytes are primes but 05 is repeated |
| 16,975,117 | 01 03 05 0D | Good | All bytes are primes with no repeats |
| 16,975,139 | 01 03 05 23 | Bad | 23 hex (35 decimal) is not a prime |
| 16,975,157 | 01 03 05 35 | Good | All bytes are primes with no repeats |
| 16,975,183 | 01 03 05 4F | Good | All bytes are primes with no repeats |
| 16,975,207 | 01 03 05 67 | Good | All bytes are primes with no repeats |
| 16,975,213 | 01 03 05 6D | Good | All bytes are primes with no repeats |
| 16,975,223 | 01 03 05 77 | Bad | 77 hex (119 decimal) is not a prime |
| 16,975,253 | 01 03 05 95 | Good | All bytes are primes with no repeats |
| 16,975,261 | 01 03 05 9D | Good | All bytes are primes with no repeats |
| 16,975,307 | 01 03 05 CB | Bad | CB hex (203 decimal) is not a prime |
| 16,975,331 | 01 03 05 E3 | Good | All bytes are primes with no repeats |
| 16,975,337 | 01 03 05 E9 | Good | All bytes are primes with no repeats |
| 16,975,349 | 01 03 05 F5 | Bad | F5 hex (245 decimal) is not a prime |
| 16,975,363 | 01 03 06 03 | Bad | All bytes are primes but 03 is repeated |
| 16,975,369 | 01 03 06 09 | Bad | 09 hex (9 decimal) is not a prime |
| 16,975,393 | 01 03 06 21 | Bad | 06 and 21 hex (6 and 33 decimal) are not primes |
| | | | |
| 50,661,131 | 03 05 07 0B | Good | All bytes are primes with no repeats |
| 50,661,133 | 03 05 07 0D | Good | All bytes are primes with no repeats |
| 50,661,167 | 03 05 07 2F | Good | All bytes are primes with no repeats |
| 50,661,187 | 03 05 07 43 | Good | All bytes are primes with no repeats |
| 50,661,211 | 03 05 07 5B | Bad | 5B hex (91 decimal) is not a prime |
| 50,661,217 | 03 05 07 61 | Good | All bytes are primes with no repeats |
| 50,661,227 | 03 05 07 6B | Good | All bytes are primes with no repeats |
| 50,661,229 | 03 05 07 6D | Good | All bytes are primes with no repeats |
| 50,661,263 | 03 05 07 8F | Bad | 8F hex (143 decimal) is not a prime |
| 50,661,283 | 03 05 07 A3 | Good | All bytes are primes with no repeats |
| 50,661,301 | 03 05 07 B5 | Good | All bytes are primes with no repeats |
| 50,661,307 | 03 05 07 BB | Bad | BB hex (187 decimal) is not a prime |
| 50,661,323 | 03 05 07 CB | Bad | CB hex (203 decimal) is not a prime |
| 50,661,329 | 03 05 07 D1 | Bad | D1 hex (209 decimal) is not a prime |
| 50,661,349 | 03 05 07 E5 | Good | All bytes are primes with no repeats |
| 50,661,371 | 03 05 07 FB | Good | All bytes are primes with no repeats |
| 50,661,379 | 03 05 08 03 | Bad | 08 is not a prime and 03 is repeated |

FIG. 6

1,032 Bytes of Sample Sequence Data Generated Using an Unconstrained primeM
seed=0E00000E, primeM=01000201, Data is compressible

```
0F00020F  10000410  11000611  12000812  13000A13  14000C14
15000E15  16001016  17001217  18001418  19001619  1A00181A
1B001A1B  1C001C1C  1D001E1D  1E00201E  1F00221F  20002420
21002621  22002822  23002A23  24002C24  25002E25  26003026
27003227  28003428  29003629  2A00382A  2B003A2B  2C003C2C
2D003E2D  2E00402E  2F00422F  30004430  31004631  32004832
33004A33  34004C34  35004E35  36005036  37005237  38005438
39005639  3A00583A  3B005A3B  3C005C3C  3D005E3D  3E00603E
3F00623F  40006440  41006641  42006842  43006A43  44006C44
45006E45  46007046  47007247  48007448  49007649  4A00784A
4B007A4B  4C007C4C  4D007E4D  4E00804E  4F00824F  50008450
51008651  52008852  53008A53  54008C54  55008E55  56009056
57009257  58009458  59009659  5A00985A  5B009A5B  5C009C5C
5D009E5D  5E00A05E  5F00A25F  6000A460  6100A661  6200A862
6300AA63  6400AC64  6500AE65  6600B066  6700B267  6800B468
6900B669  6A00B86A  6B00BA6B  6C00BC6C  6D00BE6D  6E00C06E
6F00C26F  7000C470  7100C671  7200C872  7300CA73  7400CC74
7500CE75  7600D076  7700D277  7800D478  7900D679  7A00D87A
7B00DA7B  7C00DC7C  7D00DE7D  7E00E07E  7F00E27F  8000E480
8100E681  8200E882  8300EA83  8400EC84  8500EE85  8600F086
8700F287  8800F488  8900F689  8A00F88A  8B00FA8B  8C00FC8C
8D00FE8D  8E01008E  8F01028F  90010490  91010691  92010892
93010A93  94010C94  95010E95  96011096  97011297  98011498
99011699  9A01189A  9B011A9B  9C011C9C  9D011E9D  9E01209E
9F01229F  A00124A0  A10126A1  A20128A2  A3012AA3  A4012CA4
A5012EA5  A60130A6  A70132A7  A80134A8  A90136A9  AA0138AA
AB013AAB  AC013CAC  AD013EAD  AE0140AE  AF0142AF  B00144B0
B10146B1  B20148B2  B3014AB3  B4014CB4  B5014EB5  B60150B6
B70152B7  B80154B8  B90156B9  BA0158BA  BB015ABB  BC015CBC
BD015EBD  BE0160BE  BF0162BF  C00164C0  C10166C1  C20168C2
C3016AC3  C4016CC4  C5016EC5  C60170C6  C70172C7  C80174C8
C90176C9  CA0178CA  CB017ACB  CC017CCC  CD017ECD  CE0180CE
CF0182CF  D00184D0  D10186D1  D20188D2  D3018AD3  D4018CD4
D5018ED5  D60190D6  D70192D7  D80194D8  D90196D9  DA0198DA
DB019ADB  DC019CDC  DD019EDD  DE01A0DE  DF01A2DF  E001A4E0
E101A6E1  E201A8E2  E301AAE3  E401ACE4  E501AEE5  E601B0E6
E701B2E7  E801B4E8  E901B6E9  EA01B8EA  EB01BAEB  EC01BCEC
ED01BEED  EE01C0EE  EF01C2EF  F001C4F0  F101C6F1  F201C8F2
F301CAF3  F401CCF4  F501CEF5  F601D0F6  F701D2F7  F801D4F8
F901D6F9  FA01D8FA  FB01DAFB  FC01DCFC  FD01DEFD  FE01E0FE
FF01E2FF  0001E500  0101E701  0201E902  0301EB03  0401ED04
0501EF05  0601F106  0701F307  0801F508  0901F709  0A01F90A
0B01FB0B  0C01FD0C  0D01FF0D  0E02010E  0F02030F  10020510
... the sequence continues".
```

FIG. 9A

Frequency Analysis Table for All Byte Values in the Sample Sequence
Length: 1,032 bytes
seed=0E00000E, primeM=01000201

| \ | 0 | 1 | 2 | 3 | 4 | 5 | 6 | 7 | 8 | 9 | A | B | C | D | E | F |
|---|---|---|---|---|---|---|---|---|---|---|---|---|---|---|---|---|
| 0 | 130 | 131 | 7 | 3 | 4 | 3 | 4 | 2 | 4 | 2 | 4 | 2 | 4 | 2 | 4 | 4 |
| 1 | 6 | 2 | 4 | 2 | 4 | 2 | 4 | 2 | 4 | 2 | 4 | 2 | 4 | 2 | 4 | 2 |
| 2 | 4 | 2 | 4 | 2 | 4 | 2 | 4 | 2 | 4 | 2 | 4 | 2 | 4 | 2 | 4 | 2 |
| 3 | 4 | 2 | 4 | 2 | 4 | 2 | 4 | 2 | 4 | 2 | 4 | 2 | 4 | 2 | 4 | 2 |
| 4 | 4 | 2 | 4 | 2 | 4 | 2 | 4 | 2 | 4 | 2 | 4 | 2 | 4 | 2 | 4 | 2 |
| 5 | 4 | 2 | 4 | 2 | 4 | 2 | 4 | 2 | 4 | 2 | 4 | 2 | 4 | 2 | 4 | 2 |
| 6 | 4 | 2 | 4 | 2 | 4 | 2 | 4 | 2 | 4 | 2 | 4 | 2 | 4 | 2 | 4 | 2 |
| 7 | 4 | 2 | 4 | 2 | 4 | 2 | 4 | 2 | 4 | 2 | 4 | 2 | 4 | 2 | 4 | 2 |
| 8 | 4 | 2 | 4 | 2 | 4 | 2 | 4 | 2 | 4 | 2 | 4 | 2 | 4 | 2 | 4 | 2 |
| 9 | 4 | 2 | 4 | 2 | 4 | 2 | 4 | 2 | 4 | 2 | 4 | 2 | 4 | 2 | 4 | 2 |
| A | 4 | 2 | 4 | 2 | 4 | 2 | 4 | 2 | 4 | 2 | 4 | 2 | 4 | 2 | 4 | 2 |
| B | 4 | 2 | 4 | 2 | 4 | 2 | 4 | 2 | 4 | 2 | 4 | 2 | 4 | 2 | 4 | 2 |
| C | 4 | 2 | 4 | 2 | 4 | 2 | 4 | 2 | 4 | 2 | 4 | 2 | 4 | 2 | 4 | 2 |
| D | 4 | 2 | 4 | 2 | 4 | 2 | 4 | 2 | 4 | 2 | 4 | 2 | 4 | 2 | 4 | 2 |
| E | 4 | 2 | 4 | 2 | 3 | 3 | 3 | 3 | 3 | 3 | 3 | 3 | 3 | 3 | 3 | 3 |
| F | 3 | 3 | 3 | 3 | 3 | 3 | 3 | 3 | 3 | 3 | 3 | 3 | 3 | 3 | 3 | 3 |

FIG. 9B

1,032 Bytes of Sample Sequence Data Generated Using a Constrained primeM
seed=0E00000E, primeM=0103050D, Data is not compressible

```
0F03051B  10060A28  11090F35  120C1442  130F194F  14121E5C
15152369  16182876  171B2D83  181E3290  1921379D  1A243CAA
1B2741B7  1C2A46C4  1D2D4BD1  1E3050DE  1F3355EB  20365AF8
21396005  223C6512  233F6A1F  24426F2C  25457439  26487946
274B7E53  284E8360  2951886D  2A548D7A  2B579287  2C5A9794
2D5D9CA1  2E60A1AE  2F63A6BB  3066ABC8  3169B0D5  326CB5E2
336FBAEF  3472BFFC  3575C509  3678CA16  377BCF23  387ED430
3981D93D  3A84DE4A  3B87E357  3C8AE864  3D8DED71  3E90F27E
3F93F78B  4096FC98  419A01A5  429D06B2  43A00BBF  44A310CC
45A615D9  46A91AE6  47AC1FF3  48AF2500  49B22A0D  4AB52F1A
4BB83427  4CBB3934  4DBE3E41  4EC1434E  4FC4485B  50C74D68
51CA5275  52CD5782  53D05C8F  54D3619C  55D666A9  56D96BB6
57DC70C3  58DF75D0  59E27ADD  5AE57FEA  5BE884F7  5CEB8A04
5DEE8F11  5EF1941E  5FF4992B  60F79E38  61FAA345  62FDA852
6400AD5F  6503B26C  6606B779  6709BC86  680CC193  690FC6A0
6A12CBAD  6B15D0BA  6C18D5C7  6D1BDAD4  6E1EDFE1  6F21E4EE
7024E9FB  7127EF08  722AF415  732DF922  7430FE2F  7534033C
76370849  773A0D56  783D1263  79401770  7A431C7D  7B46218A
7C492697  7D4C2BA4  7E4F30B1  7F5235BE  80553ACB  81583FD8
825B44E5  835E49F2  84614EFF  8564540C  86675919  876A5E26
886D6333  89706840  8A736D4D  8B76725A  8C797767  8D7C7C74
8E7F8181  8F82868E  90858B9B  918890A8  928B95B5  938E9AC2
94919FCF  9594A4DC  9697A9E9  979AAEF6  989DB403  99A0B910
9AA3BE1D  9BA6C32A  9CA9C837  9DACCD44  9EAFD251  9FB2D75E
A0B5DC6B  A1B8E178  A2BBE685  A3BEEB92  A4C1F09F  A5C4F5AC
A6C7FAB9  A7CAFFC6  A8CE04D3  A9D109E0  AAD40EED  ABD713FA
ACDA1907  ADDD1E14  AEE02321  AFE3282E  B0E62D3B  B1E93248
B2EC3755  B3EF3C62  B4F2416F  B5F5467C  B6F84B89  B7FB5096
B8FE55A3  BA015AB0  BB045FBD  BC0764CA  BD0A69D7  BE0D6EE4
BF1073F1  C01378FE  C1167E0B  C2198318  C31C8825  C41F8D32
C522923F  C625974C  C7289C59  C82BA166  C92EA673  CA31AB80
CB34B08D  CC37B59A  CD3ABAA7  CE3DBFB4  CF40C4C1  D043C9CE
D146CEDB  D249D3E8  D34CD8F5  D44FDE02  D552E30F  D655E81C
D758ED29  D85BF236  D95EF743  DA61FC50  DB65015D  DC68066A
DD6B0B77  DE6E1084  DF711591  E0741A9E  E1771FAB  E27A24B8
E37D29C5  E4802ED2  E58333DF  E68638EC  E7893DF9  E88C4306
E98F4813  EA924D20  EB95522D  EC98573A  ED9B5C47  EE9E6154
EFA16661  F0A46B6E  F1A7707B  F2AA7588  F3AD7A95  F4B07FA2
F5B384AF  F6B689BC  F7B98EC9  F8BC93D6  F9BF98E3  FAC29DF0
FBC5A2FD  FCC8A80A  FDCBAD17  FECEB224  FFD1B731  00D4BC3E
01D7C14B  02DAC658  03DDCB65  04E0D072  05E3D57F  06E6DA8C
07E9DF99  08ECE4A6  09EFE9B3  0AF2EEC0  0BF5F3CD  0CF8F8DA
0DFBFDE7  0EFF02F4  10020801  11050D0E  1208121B  130B1728
              ... the sequence continues
```

FIG. 10A

Frequency Analysis Table for All Byte Values in the Sample Sequence
Length: 1,032 bytes
seed=0E00000E, primeM=0103050D, 1,032 Bytes

Frequency Analysis Table for All Byte Values in the Sample Sequence
Length 12,288 Bytes
seed=0E00000E, primeM=0103050D

Table of Accumulator (Generated Data) Internal Byte Value Rotations
primeM=0103050D

| Byte3 | Byte2 | Byte1 | Byte0 |
|---|---|---|---|
| 4B | B8 | 34 | 27 |
| 4C | BB | 39 | 34 |
| 4D | BE | 3E | 41 |
| 4E | C1 | 43 | 4E |
| 4F | C4 | 48 | 5B |
| 50 | C7 | 4D | 68 |
| 51 | CA | 52 | 75 |
| 52 | CD | 57 | 82 |
| 53 | D0 | 5C | 8F |
| 54 | D3 | 61 | 9C |
| 55 | D6 | 66 | A9 |
| 56 | D9 | 6B | B6 |
| 57 | DC | 70 | C3 |
| 58 | DF | 75 | D0 |
| 59 | E2 | 7A | DD |
| 5A | E5 | 7F | EA |
| 5B | E8 | 84 | F7 |
| 5C | EB | 8A | 04 |
| 5D | EE | 8F | 11 |
| 5E | F1 | 94 | 1E |
| 5F | F4 | 99 | 2B |
| 60 | F7 | 9E | 38 |
| 61 | FA | A3 | 45 |
| 62 | FD | A8 | 52 |
| 64 | 00 | AD | 5F |
| 65 | 03 | B2 | 6C |
| 66 | 06 | B7 | 79 |
| 67 | 09 | BC | 86 |
| 68 | 0C | C1 | 93 |
| 69 | 0F | C6 | A0 |
| 6A | 12 | CB | AD |
| 6B | 15 | D0 | BA |
| 6C | 18 | D5 | C7 |
| 6D | 1B | DA | D4 |
| 6E | 1E | DF | E1 |
| 6F | 21 | E4 | EE |

Value added to each byte of the accumulator each tick of the engine plus applicable carries at wrap around.

| | +1 | +3 | +5 | +13 decimal |
|---|---|---|---|---|
| | 01 | 03 | 05 | 0D hexadecimal |

FIG. 11

4,080 Bytes of Sample Sequence Data Generated Using Constrained primeM
seed=0E00000E, primeM=0103050D, Data is not compressible

| | | | | | |
|---|---|---|---|---|---|
| 0F03051B | 10060A28 | 11090F35 | 120C1442 | 130F194F | 14121E5C |
| 15152369 | 16182876 | 171B2D83 | 181E3290 | 1921379D | 1A243CAA |
| 1B2741B7 | 1C2A46C4 | 1D2D4BD1 | 1E3050DE | 1F3355EB | 20365AF8 |
| 21396005 | 223C6512 | 233F6A1F | 24426F2C | 25457439 | 26487946 |
| 274B7E53 | 284E8360 | 2951886D | 2A548D7A | 2B579287 | 2C5A9794 |
| 2D5D9CA1 | 2E60A1AE | 2F63A6BB | 3066ABC8 | 3169B0D5 | 326CB5E2 |
| 336FBAEF | 3472BFFC | 3575C509 | 3678CA16 | 377BCF23 | 387ED430 |
| 3981D93D | 3A84DE4A | 3B87E357 | 3C8AE864 | 3D8DED71 | 3E90F27E |
| 3F93F78B | 4096FC98 | 419A01A5 | 429D06B2 | 43A00BBF | 44A310CC |
| 45A615D9 | 46A91AE6 | 47AC1FF3 | 48AF2500 | 49B22A0D | 4AB52F1A |
| 4BB83427 | 4CBB3934 | 4DBE3E41 | 4EC1434E | 4FC4485B | 50C74D68 |
| 51CA5275 | 52CD5782 | 53D05C8F | 54D3619C | 55D666A9 | 56D96BB6 |
| 57DC70C3 | 58DF75D0 | 59E27ADD | 5AE57FEA | 5BE884F7 | 5CEB8A04 |
| 5DEE8F11 | 5EF1941E | 5FF4992B | 60F79E38 | 61FAA345 | 62FDA852 |
| 6400AD5F | 6503B26C | 6606B779 | 6709BC86 | 680CC193 | 690FC6A0 |
| 6A12CBAD | 6B15D0BA | 6C18D5C7 | 6D1BDAD4 | 6E1EDFE1 | 6F21E4EE |
| 7024E9FB | 7127EF08 | 722AF415 | 732DF922 | 7430FE2F | 7534033C |
| 76370849 | 773A0D56 | 783D1263 | 79401770 | 7A431C7D | 7B46218A |
| 7C492697 | 7D4C2BA4 | 7E4F30B1 | 7F5235BE | 80553ACB | 81583FD8 |
| 825B44E5 | 835E49F2 | 84614EFF | 8564540C | 86675919 | 876A5E26 |
| 886D6333 | 89706840 | 8A736D4D | 8B76725A | 8C797767 | 8D7C7C74 |
| 8E7F8181 | 8F82868E | 90858B9B | 918890A8 | 928B95B5 | 938E9AC2 |
| 94919FCF | 9594A4DC | 9697A9E9 | 979AAEF6 | 989DB403 | 99A0B910 |
| 9AA3BE1D | 9BA6C32A | 9CA9C837 | 9DACCD44 | 9EAFD251 | 9FB2D75E |
| A0B5DC6B | A1B8E178 | A2BBE685 | A3BEEB92 | A4C1F09F | A5C4F5AC |
| A6C7FAB9 | A7CAFFC6 | A8CE04D3 | A9D109E0 | AAD40EED | ABD713FA |
| ACDA1907 | ADDD1E14 | AEE02321 | AFE3282E | B0E62D3B | B1E93248 |
| B2EC3755 | B3EF3C62 | B4F2416F | B5F5467C | B6F84B89 | B7FB5096 |
| B8FE55A3 | BA015AB0 | BB045FBD | BC0764CA | BD0A69D7 | BE0D6EE4 |
| BF1073F1 | C01378FE | C1167E0B | C2198318 | C31C8825 | C41F8D32 |
| C522923F | C625974C | C7289C59 | C82BA166 | C92EA673 | CA31AB80 |
| CB34B08D | CC37B59A | CD3ABAA7 | CE3DBFB4 | CF40C4C1 | D043C9CE |
| D146CEDB | D249D3E8 | D34CD8F5 | D44FDE02 | D552E30F | D655E81C |
| D758ED29 | D85BF236 | D95EF743 | DA61FC50 | DB65015D | DC68066A |
| DD6B0B77 | DE6E1084 | DF711591 | E0741A9E | E1771FAB | E27A24B8 |
| E37D29C5 | E4802ED2 | E58333DF | E68638EC | E7893DF9 | E88C4306 |
| E98F4813 | EA924D20 | EB95522D | EC98573A | ED9B5C47 | EE9E6154 |
| EFA16661 | F0A46B6E | F1A7707B | F2AA7588 | F3AD7A95 | F4B07FA2 |
| F5B384AF | F6B689BC | F7B98EC9 | F8BC93D6 | F9BF98E3 | FAC29DF0 |
| FBC5A2FD | FCC8A80A | FDCBAD17 | FECEB224 | FFD1B731 | 00D4BC3E |
| 01D7C14B | 02DAC658 | 03DDCB65 | 04E0D072 | 05E3D57F | 06E6DA8C |
| 07E9DF99 | 08ECE4A6 | 09EFE9B3 | 0AF2EEC0 | 0BF5F3CD | 0CF8F8DA |
| 0DFBFDE7 | 0EFF02F4 | 10020801 | 11050D0E | 1208121B | 130B1728 |
| 140E1C35 | 15112142 | 1614264F | 17172B5C | 181A3069 | 191D3576 |
| 1A203A83 | 1B233F90 | 1C26449D | 1D2949AA | 1E2C4EB7 | 1F2F53C4 |
| 203258D1 | 21355DDE | 223862EB | 233B67F8 | 243E6D05 | 25417212 |
| 2644771F | 27477C2C | 284A8139 | 294D8646 | 2A508B53 | 2B539060 |
| 2C56956D | 2D599A7A | 2E5C9F87 | 2F5FA494 | 3062A9A1 | 3165AEAE |

| | | | | | |
|---|---|---|---|---|---|
| 3268B3BB | 336BB8C8 | 346EBDD5 | 3571C2E2 | 3674C7EF | 3777CCFC |
| 387AD209 | 397DD716 | 3A80DC23 | 3B83E130 | 3C86E63D | 3D89EB4A |
| 3E8CF057 | 3F8FF564 | 4092FA71 | 4195FF7E | 4299048B | 439C0998 |
| 449F0EA5 | 45A213B2 | 46A518BF | 47A81DCC | 48AB22D9 | 49AE27E6 |
| 4AB12CF3 | 4BB43200 | 4CB7370D | 4DBA3C1A | 4EBD4127 | 4FC04634 |
| 50C34B41 | 51C6504E | 52C9555B | 53CC5A68 | 54CF5F75 | 55D26482 |
| 56D5698F | 57D86E9C | 58DB73A9 | 59DE78B6 | 5AE17DC3 | 5BE482D0 |
| 5CE787DD | 5DEA8CEA | 5EED91F7 | 5FF09704 | 60F39C11 | 61F6A11E |
| 62F9A62B | 63FCAB38 | 64FFB045 | 6602B552 | 6705BA5F | 6808BF6C |
| 690BC479 | 6A0EC986 | 6B11CE93 | 6C14D3A0 | 6D17D8AD | 6E1ADDBA |
| 6F1DE2C7 | 7020E7D4 | 7123ECE1 | 7226F1EE | 7329F6FB | 742CFC08 |
| 75300115 | 76330622 | 77360B2F | 7839103C | 793C1549 | 7A3F1A56 |
| 7B421F63 | 7C452470 | 7D48297D | 7E4B2E8A | 7F4E3397 | 805138A4 |
| 81543DB1 | 825742BE | 835A47CB | 845D4CD8 | 856051E5 | 866356F2 |
| 87665BFF | 8869610C | 896C6619 | 8A6F6B26 | 8B727033 | 8C757540 |
| 8D787A4D | 8E7B7F5A | 8F7E8467 | 90818974 | 91848E81 | 9287938E |
| 938A989B | 948D9DA8 | 9590A2B5 | 9693A7C2 | 9796ACCF | 9899B1DC |
| 999CB6E9 | 9A9FBBF6 | 9BA2C103 | 9CA5C610 | 9DA8CB1D | 9EABD02A |
| 9FAED537 | A0B1DA44 | A1B4DF51 | A2B7E45E | A3BAE96B | A4BDEE78 |
| A5C0F385 | A6C3F892 | A7C6FD9F | A8CA02AC | A9CD07B9 | AAD00CC6 |
| ABD311D3 | ACD616E0 | ADD91BED | AEDC20FA | AFDF2607 | B0E22B14 |
| B1E53021 | B2E8352E | B3EB3A3B | B4EE3F48 | B5F14455 | B6F44962 |
| B7F74E6F | B8FA537C | B9FD5889 | BB005D96 | BC0362A3 | BD0667B0 |
| BE096CBD | BF0C71CA | C00F76D7 | C1127BE4 | C21580F1 | C31885FE |
| C41B8B0B | C51E9018 | C6219525 | C7249A32 | C8279F3F | C92AA44C |
| CA2DA959 | CB30AE66 | CC33B373 | CD36B880 | CE39BD8D | CF3CC29A |
| D03FC7A7 | D142CCB4 | D245D1C1 | D348D6CE | D44BDBDB | D54EE0E8 |
| D651E5F5 | D754EB02 | D857F00F | D95AF51C | DA5DFA29 | DB60FF36 |
| DC640443 | DD670950 | DE6A0E5D | DF6D136A | E0701877 | E1731D84 |
| E2762291 | E379279E | E47C2CAB | E57F31B8 | E68236C5 | E7853BD2 |
| E88840DF | E98B45EC | EA8E4AF9 | EB915006 | EC945513 | ED975A20 |
| EE9A5F2D | EF9D643A | F0A06947 | F1A36E54 | F2A67361 | F3A9786E |
| F4AC7D7B | F5AF8288 | F6B28795 | F7B58CA2 | F8B891AF | F9BB96BC |
| FABE9BC9 | FBC1A0D6 | FCC4A5E3 | FDC7AAF0 | FECAAFFD | FFCDB50A |
| 00D0BA17 | 01D3BF24 | 02D6C431 | 03D9C93E | 04DCCE4B | 05DFD358 |
| 06E2D865 | 07E5DD72 | 08E8E27F | 09EBE78C | 0AEEEC99 | 0BF1F1A6 |
| 0CF4F6B3 | 0DF7FBC0 | 0EFB00CD | 0FFE05DA | 11010AE7 | 12040FF4 |
| 13071501 | 140A1A0E | 150D1F1B | 16102428 | 17132935 | 18162E42 |
| 1919334F | 1A1C385C | 1B1F3D69 | 1C224276 | 1D254783 | 1E284C90 |
| 1F2B519D | 202E56AA | 21315BB7 | 223460C4 | 233765D1 | 243A6ADE |
| 253D6FEB | 264074F8 | 27437A05 | 28467F12 | 2949841F | 2A4C892C |
| 2B4F8E39 | 2C529346 | 2D559853 | 2E589D60 | 2F5BA26D | 305EA77A |
| 3161AC87 | 3264B194 | 3367B6A1 | 346ABBAE | 356DC0BB | 3670C5C8 |
| 3773CAD5 | 3876CFE2 | 3979D4EF | 3A7CD9FC | 3B7FDF09 | 3C82E416 |
| 3D85E923 | 3E88EE30 | 3F8BF33D | 408EF84A | 4191FD57 | 42950264 |

| | | | | | |
|---|---|---|---|---|---|
| 43980771 | 449B0C7E | 459E118B | 46A11698 | 47A41BA5 | 48A720B2 |
| 49AA25BF | 4AAD2ACC | 4BB02FD9 | 4CB334E6 | 4DB639F3 | 4EB93F00 |
| 4FBC440D | 50BF491A | 51C24E27 | 52C55334 | 53C85841 | 54CB5D4E |
| 55CE625B | 56D16768 | 57D46C75 | 58D77182 | 59DA768F | 5ADD7B9C |
| 5BE080A9 | 5CE385B6 | 5DE68AC3 | 5EE98FD0 | 5FEC94DD | 60EF99EA |
| 61F29EF7 | 62F5A404 | 63F8A911 | 64FBAE1E | 65FEB32B | 6701B838 |
| 6804BD45 | 6907C252 | 6A0AC75F | 6B0DCC6C | 6C10D179 | 6D13D686 |
| 6E16DB93 | 6F19E0A0 | 701CE5AD | 711FEABA | 7222EFC7 | 7325F4D4 |
| 7428F9E1 | 752BFEEE | 762F03FB | 77320908 | 78350E15 | 79381322 |
| 7A3B182F | 7B3E1D3C | 7C412249 | 7D442756 | 7E472C63 | 7F4A3170 |
| 804D367D | 81503B8A | 82534097 | 835645A4 | 84594AB1 | 855C4FBE |
| 865F54CB | 876259D8 | 88655EE5 | 896863F2 | 8A6B68FF | 8B6E6E0C |
| 8C717319 | 8D747826 | 8E777D33 | 8F7A8240 | 907D874D | 91808C5A |
| 92839167 | 93869674 | 94899B81 | 958CA08E | 968FA59B | 9792AAA8 |
| 9895AFB5 | 9998B4C2 | 9A9BB9CF | 9B9EBEDC | 9CA1C3E9 | 9DA4C8F6 |
| 9EA7CE03 | 9FAAD310 | A0ADD81D | A1B0DD2A | A2B3E237 | A3B6E744 |
| A4B9EC51 | A5BCF15E | A6BFF66B | A7C2FB78 | A8C60085 | A9C90592 |
| AACC0A9F | ABCF0FAC | ACD214B9 | ADD519C6 | AED81ED3 | AFDB23E0 |
| B0DE28ED | B1E12DFA | B2E43307 | B3E73814 | B4EA3D21 | B5ED422E |
| B6F0473B | B7F34C48 | B8F65155 | B9F95662 | BAFC5B6F | BBFF607C |
| BD026589 | BE056A96 | BF086FA3 | C00B74B0 | C10E79BD | C2117ECA |
| C31483D7 | C41788E4 | C51A8DF1 | C61D92FE | C720980B | C8239D18 |
| C926A225 | CA29A732 | CB2CAC3F | CC2FB14C | CD32B659 | CE35BB66 |
| CF38C073 | D03BC580 | D13ECA8D | D241CF9A | D344D4A7 | D447D9B4 |
| D54ADEC1 | D64DE3CE | D750E8DB | D853EDE8 | D956F2F5 | DA59F802 |
| DB5CFD0F | DC60021C | DD630729 | DE660C36 | DF691143 | E06C1650 |
| E16F1B5D | E272206A | E3752577 | E4782A84 | E57B2F91 | E67E349E |
| E78139AB | E8843EB8 | E98743C5 | EA8A48D2 | EB8D4DDF | EC9052EC |
| ED9357F9 | EE965D06 | EF996213 | F09C6720 | F19F6C2D | F2A2713A |
| F3A57647 | F4A87B54 | F5AB8061 | F6AE856E | F7B18A7B | F8B48F88 |
| F9B79495 | FABA99A2 | FBBD9EAF | FCC0A3BC | FDC3A8C9 | FEC6ADD6 |
| FFC9B2E3 | 00CCB7F0 | 01CFBCFD | 02D2C20A | 03D5C717 | 04D8CC24 |
| 05DBD131 | 06DED63E | 07E1DB4B | 08E4E058 | 09E7E565 | 0AEAEA72 |
| 0BEDEF7F | 0CF0F48C | 0DF3F999 | 0EF6FEA6 | 0FFA03B3 | 10FD08C0 |
| 12000DCD | 130312DA | 140617E7 | 15091CF4 | 160C2201 | 170F270E |
| 18122C1B | 19153128 | 1A183635 | 1B1B3B42 | 1C1E404F | 1D21455C |
| 1E244A69 | 1F274F76 | 202A5483 | 212D5990 | 22305E9D | 233363AA |
| 243668B7 | 25396DC4 | 263C72D1 | 273F77DE | 28427CEB | 294581F8 |
| 2A488705 | 2B4B8C12 | 2C4E911F | 2D51962C | 2E549B39 | 2F57A046 |
| 305AA553 | 315DAA60 | 3260AF6D | 3363B47A | 3466B987 | 3569BE94 |
| 366CC3A1 | 376FC8AE | 3872CDBB | 3975D2C8 | 3A78D7D5 | 3B7BDCE2 |
| 3C7EE1EF | 3D81E6FC | 3E84EC09 | 3F87F116 | 408AF623 | 418DFB30 |
| 4291003D | 4394054A | 44970A57 | 459A0F64 | 469D1471 | 47A0197E |
| 48A31E8B | 49A62398 | 4AA928A5 | 4BAC2DB2 | 4CAF32BF | 4DB237CC |
| 4EB53CD9 | 4FB841E6 | 50BB46F3 | 51BE4C00 | 52C1510D | 53C4561A |

| | | | | | |
|---|---|---|---|---|---|
| 54C75B27 | 55CA6034 | 56CD6541 | 57D06A4E | 58D36F5B | 59D67468 |
| 5AD97975 | 5BDC7E82 | 5CDF838F | 5DE2889C | 5EE58DA9 | 5FE892B6 |
| 60EB97C3 | 61EE9CD0 | 62F1A1DD | 63F4A6EA | 64F7ABF7 | 65FAB104 |
| 66FDB611 | 6800BB1E | 6903C02B | 6A06C538 | 6B09CA45 | 6C0CCF52 |
| 6D0FD45F | 6E12D96C | 6F15DE79 | 7018E386 | 711BE893 | 721EEDA0 |
| 7321F2AD | 7424F7BA | 7527FCC7 | 762B01D4 | 772E06E1 | 78310BEE |
| 793410FB | 7A371608 | 7B3A1B15 | 7C3D2022 | 7D40252F | 7E432A3C |
| 7F462F49 | 80493456 | 814C3963 | 824F3E70 | 8352437D | 8455488A |
| 85584D97 | 865B52A4 | 875E57B1 | 88615CBE | 896461CB | 8A6766D8 |
| 8B6A6BE5 | 8C6D70F2 | 8D7075FF | 8E737B0C | 8F768019 | 90798526 |
| 917C8A33 | 927F8F40 | 9382944D | 9485995A | 95889E67 | 968BA374 |
| 978EA881 | 9891AD8E | 9994B29B | 9A97B7A8 | 9B9ABCB5 | 9C9DC1C2 |
| 9DA0C6CF | 9EA3CBDC | 9FA6D0E9 | A0A9D5F6 | A1ACDB03 | A2AFE010 |
| A3B2E51D | A4B5EA2A | A5B8EF37 | A6BBF444 | A7BEF951 | A8C1FE5E |
| A9C5036B | AAC80878 | ABCB0D85 | ACCE1292 | ADD1179F | AED41CAC |
| AFD721B9 | B0DA26C6 | B1DD2BD3 | B2E030E0 | B3E335ED | B4E63AFA |
| B5E94007 | B6EC4514 | B7EF4A21 | B8F24F2E | B9F5543B | BAF85948 |
| BBFB5E55 | BCFE6362 | BE01686F | BF046D7C | C0077289 | C10A7796 |
| C20D7CA3 | C31081B0 | C41386BD | C5168BCA | C61990D7 | C71C95E4 |
| C81F9AF1 | C9229FFE | CA25A50B | CB28AA18 | CC2BAF25 | CD2EB432 |
| CE31B93F | CF34BE4C | D037C359 | D13AC866 | D23DCD73 | D340D280 |
| D443D78D | D546DC9A | D649E1A7 | D74CE6B4 | D84FEBC1 | D952F0CE |
| DA55F5DB | DB58FAE8 | DC5BFFF5 | DD5F0502 | DE620A0F | DF650F1C |
| E0681429 | E16B1936 | E26E1E43 | E3712350 | E474285D | E5772D6A |
| E67A3277 | E77D3784 | E8803C91 | E983419E | EA8646AB | EB894BB8 |
| EC8C50C5 | ED8F55D2 | EE925ADF | EF955FEC | F09864F9 | F19B6A06 |
| F29E6F13 | F3A17420 | F4A4792D | F5A77E3A | F6AA8347 | F7AD8854 |
| F8B08D61 | F9B3926E | FAB6977B | FBB99C88 | FCBCA195 | FDBFA6A2 |
| FEC2ABAF | FFC5B0BC | 00C8B5C9 | 01CBBAD6 | 02CEBFE3 | 03D1C4F0 |
| 04D4C9FD | 05D7CF0A | 06DAD417 | 07DDD924 | 08E0DE31 | 09E3E33E |
| 0AE6E84B | 0BE9ED58 | 0CECF265 | 0DEFF772 | 0EF2FC7F | 0FF6018C |
| 10F90699 | 11FC0BA6 | 12FF10B3 | 140215C0 | 15051ACD | 16081FDA |

FIG. 13D

Frequency Analysis Table for All Byte Values in the Sample Sequence
Length: 4,080 bytes
seed=0E00000E, constrained primeM=0103050D

4,080 Bytes of Sample Sequence Data Generated Using Constrained primeM
seed=0E00000E, primeM=0305070B, Data is not compressible

```
11050719  140A0E24  170F152F  1A141C3A  1D192345  201E2A50
2323315B  26283866  292D3F71  2C32467C  2F374D87  323C5492
35415B9D  384662A8  3B4B69B3  3E5070BE  415577C9  445A7ED4
475F85DF  4A648CEA  4D6993F5  506E9B00  5373A20B  5678A916
597DB021  5C82B72C  5F87BE37  628CC542  6591CC4D  6896D358
6B9BDA63  6EA0E16E  71A5E879  74AAEF84  77AFF68F  7AB4FD9A
7DBA04A5  80BF0BB0  83C412BB  86C919C6  89CE20D1  8CD327DC
8FD82EE7  92DD35F2  95E23CFD  98E74408  9BEC4B13  9EF1521E
A1F65929  A4FB6034  A800673F  AB056E4A  AE0A7555  B10F7C60
B414836B  B7198A76  BA1E9181  BD23988C  C0289F97  C32DA6A2
C632ADAD  C937B4B8  CC3CBBC3  CF41C2CE  D246C9D9  D54BD0E4
D850D7EF  DB55DEFA  DE5AE605  E15FED10  E464F41B  E769FB26
EA6F0231  ED74093C  F0791047  F37E1752  F6831E5D  F9882568
FC8D2C73  FF92337E  02973A89  059C4194  08A1489F  0BA64FAA
0EAB56B5  11B05DC0  14B564CB  17BA6BD6  1ABF72E1  1DC479EC
20C980F7  23CE8802  26D38F0D  29D89618  2CDD9D23  2FE2A42E
32E7AB39  35ECB244  38F1B94F  3BF6C05A  3EFBC765  4200CE70
4505D57B  480ADC86  4B0FE391  4E14EA9C  5119F1A7  541EF8B2
5723FFBD  5A2906C8  5D2E0DD3  603314DE  63381BE9  663D22F4
694229FF  6C47310A  6F4C3815  72513F20  7556462B  785B4D36
7B605441  7E655B4C  816A6257  846F6962  8774706D  8A797778
8D7E7E83  9083858E  93888C99  968D93A4  99929AAF  9C97A1BA
9F9CA8C5  A2A1AFD0  A5A6B6DB  A8ABBDE6  ABB0C4F1  AEB5CBFC
B1BAD307  B4BFDA12  B7C4E11D  BAC9E828  BDCEEF33  C0D3F63E
C3D8FD49  C6DE0454  C9E30B5F  CCE8126A  CFED1975  D2F22080
D5F7278B  D8FC2E96  DC0135A1  DF063CAC  E20B43B7  E5104AC2
E81551CD  EB1A58D8  EE1F5FE3  F12466EE  F4296DF9  F72E7504
FA337C0F  FD38831A  003D8A25  03429130  0647983B  094C9F46
0C51A651  0F56AD5C  125BB467  1560BB72  1865C27D  1B6AC988
1E6FD093  2174D79E  2479DEA9  277EE5B4  2A83ECBF  2D88F3CA
308DFAD5  339301E0  369808EB  399D0FF6  3CA21701  3FA71E0C
42AC2517  45B12C22  48B6332D  4BBB3A38  4EC04143  51C5484E
54CA4F59  57CF5664  5AD45D6F  5DD9647A  60DE6B85  63E37290
66E8799B  69ED80A6  6CF287B1  6FF78EBC  72FC95C7  76019CD2
7906A3DD  7C0BAAE8  7F10B1F3  8215B8FE  851AC009  881FC714
8B24CE1F  8E29D52A  912EDC35  9433E340  9738EA4B  9A3DF156
9D42F861  A047FF6C  A34D0677  A6520D82  A957148D  AC5C1B98
AF6122A3  B26629AE  B56B30B9  B87037C4  BB753ECF  BE7A45DA
C17F4CE5  C48453F0  C7895AFB  CA8E6206  CD936911  D098701C
D39D7727  D6A27E32  D9A7853D  DCAC8C48  DFB19353  E2B69A5E
E5BBA169  E8C0A874  EBC5AF7F  EECAB68A  F1CFBD95  F4D4C4A0
F7D9CBAB  FADED2B6  FDE3D9C1  00E8E0CC  03EDE7D7  06F2EEE2
09F7F5ED  0CFCFCF8  10020403  13070B0E  160C1219  19111924
1C16202F  1F1B273A  22202E45  25253550  282A3C5B  2B2F4366
2E344A71  3139517C  343E5887  37435F92  3A48669D  3D4D6DA8
```
(Cont. at FIG. 14B)

FIG. 14A

| | | | | | |
|---|---|---|---|---|---|
| 405274B3 | 43577BBE | 465C82C9 | 496189D4 | 4C6690DF | 4F6B97EA |
| 52709EF5 | 5575A600 | 587AAD0B | 5B7FB416 | 5E84BB21 | 6189C22C |
| 648EC937 | 6793D042 | 6A98D74D | 6D9DDE58 | 70A2E563 | 73A7EC6E |
| 76ACF379 | 79B1FA84 | 7CB7018F | 7FBC089A | 82C10FA5 | 85C616B0 |
| 88CB1DBB | 8BD024C6 | 8ED52BD1 | 91DA32DC | 94DF39E7 | 97E440F2 |
| 9AE947FD | 9DEE4F08 | A0F35613 | A3F85D1E | A6FD6429 | AA026B34 |
| AD07723F | B00C794A | B3118055 | B6168760 | B91B8E6B | BC209576 |
| BF259C81 | C22AA38C | C52FAA97 | C834B1A2 | CB39B8AD | CE3EBFB8 |
| D143C6C3 | D448CDCE | D74DD4D9 | DA52DBE4 | DD57E2EF | E05CE9FA |
| E361F105 | E666F810 | E96BFF1B | EC710626 | EF760D31 | F27B143C |
| F5801B47 | F8852252 | FB8A295D | FE8F3068 | 01943773 | 04993E7E |
| 079E4589 | 0AA34C94 | 0DA8539F | 10AD5AAA | 13B261B5 | 16B768C0 |
| 19BC6FCB | 1CC176D6 | 1FC67DE1 | 22CB84EC | 25D08BF7 | 28D59302 |
| 2BDA9A0D | 2EDFA118 | 31E4A823 | 34E9AF2E | 37EEB639 | 3AF3BD44 |
| 3DF8C44F | 40FDCB5A | 4402D265 | 4707D970 | 4A0CE07B | 4D11E786 |
| 5016EE91 | 531BF59C | 5620FCA7 | 592603B2 | 5C2B0ABD | 5F3011C8 |
| 623518D3 | 653A1FDE | 683F26E9 | 6B442DF4 | 6E4934FF | 714E3C0A |
| 74534315 | 77584A20 | 7A5D512B | 7D625836 | 80675F41 | 836C664C |
| 86716D57 | 89767462 | 8C7B7B6D | 8F808278 | 92858983 | 958A908E |
| 988F9799 | 9B949EA4 | 9E99A5AF | A19EACBA | A4A3B3C5 | A7A8BAD0 |
| AAADC1DB | ADB2C8E6 | B0B7CFF1 | B3BCD6FC | B6C1DE07 | B9C6E512 |
| BCCBEC1D | BFD0F328 | C2D5FA33 | C5DB013E | C8E00849 | CBE50F54 |
| CEEA165F | D1EF1D6A | D4F42475 | D7F92B80 | DAFE328B | DE033996 |
| E10840A1 | E40D47AC | E7124EB7 | EA1755C2 | ED1C5CCD | F02163D8 |
| F3266AE3 | F62B71EE | F93078F9 | FC358004 | FF3A870F | 023F8E1A |
| 05449525 | 08499C30 | 0B4EA33B | 0E53AA46 | 1158B151 | 145DB85C |
| 1762BF67 | 1A67C672 | 1D6CCD7D | 2071D488 | 2376DB93 | 267BE29E |
| 2980E9A9 | 2C85F0B4 | 2F8AF7BF | 328FFECA | 359505D5 | 389A0CE0 |
| 3B9F13EB | 3EA41AF6 | 41A92201 | 44AE290C | 47B33017 | 4AB83722 |
| 4DBD3E2D | 50C24538 | 53C74C43 | 56CC534E | 59D15A59 | 5CD66164 |
| 5FDB686F | 62E06F7A | 65E57685 | 68EA7D90 | 6BEF849B | 6EF48BA6 |
| 71F992B1 | 74FE99BC | 7803A0C7 | 7B08A7D2 | 7E0DAEDD | 8112B5E8 |
| 8417BCF3 | 871CC3FE | 8A21CB09 | 8D26D214 | 902BD91F | 9330E02A |
| 9635E735 | 993AEE40 | 9C3FF54B | 9F44FC56 | A24A0361 | A54F0A6C |
| A8541177 | AB591882 | AE5E1F8D | B1632698 | B4682DA3 | B76D34AE |
| BA723BB9 | BD7742C4 | C07C49CF | C38150DA | C68657E5 | C98B5EF0 |
| CC9065FB | CF956D06 | D29A7411 | D59F7B1C | D8A48227 | DBA98932 |
| DEAE903D | E1B39748 | E4B89E53 | E7BDA55E | EAC2AC69 | EDC7B374 |
| F0CCBA7F | F3D1C18A | F6D6C895 | F9DBCFA0 | FCE0D6AB | FFE5DDB6 |
| 02EAE4C1 | 05EFEBCC | 08F4F2D7 | 0BF9F9E2 | 0EFF00ED | 120407F8 |
| 15090F03 | 180E160E | 1B131D19 | 1E182424 | 211D2B2F | 2422323A |
| 27273945 | 2A2C4050 | 2D31475B | 30364E66 | 333B5571 | 36405C7C |
| 39456387 | 3C4A6A92 | 3F4F719D | 425478A8 | 45597FB3 | 485E86BE |
| 4B638DC9 | 4E6894D4 | 516D9BDF | 5472A2EA | 5777A9F5 | 5A7CB100 |
| 5D81B80B | 6086BF16 | 638BC621 | 6690CD2C | 6995D437 | 6C9ADB42 |
| 6F9FE24D | 72A4E958 | 75A9F063 | 78AEF76E | 7BB3FE79 | 7EB90584 |

```
81BE0C8F  84C3139A  87C81AA5  8ACD21B0  8DD228BB  90D72FC6
93DC36D1  96E13DDC  99E644E7  9CEB4BF2  9FF052FD  A2F55A08
A5FA6113  A8FF681E  AC046F29  AF097634  B20E7D3F  B513844A
B8188B55  BB1D9260  BE22996B  C127A076  C42CA781  C731AE8C
CA36B597  CD3BBCA2  D040C3AD  D345CAB8  D64AD1C3  D94FD8CE
DC54DFD9  DF59E6E4  E25EEDEF  E563F4FA  E868FC05  EB6E0310
EE730A1B  F1781126  F47D1831  F7821F3C  FA872647  FD8C2D52
0091345D  03963B68  069B4273  09A0497E  0CA55089  0FAA5794
12AF5E9F  15B465AA  18B96CB5  1BBE73C0  1EC37ACB  21C881D6
24CD88E1  27D28FEC  2AD796F7  2DDC9E02  30E1A50D  33E6AC18
36EBB323  39F0BA2E  3CF5C139  3FFAC844  42FFCF4F  4604D65A
4909DD65  4C0EE470  4F13EB7B  5218F286  551DF991  5823009C
5B2807A7  5E2D0EB2  613215BD  64371CC8  673C23D3  6A412ADE
6D4631E9  704B38F4  73503FFF  7655470A  795A4E15  7C5F5520
7F645C2B  82696336  856E6A41  8873714C  8B787857  8E7D7F62
9182866D  94878D78  978C9483  9A919B8E  9D96A299  A09BA9A4
A3A0B0AF  A6A5B7BA  A9AABEC5  ACAFC5D0  AFB4CCDB  B2B9D3E6
B5BEDAF1  B8C3E1FC  BBC8E907  BECDF012  C1D2F71D  C4D7FE28
C7DD0533  CAE20C3E  CDE71349  D0EC1A54  D3F1215F  D6F6286A
D9FB2F75  DD003680  E0053D8B  E30A4496  E60F4BA1  E91452AC
EC1959B7  EF1E60C2  F22367CD  F5286ED8  F82D75E3  FB327CEE
FE3783F9  013C8B04  0441920F  0746991A  0A4BA025  0D50A730
1055AE3B  135AB546  165FBC51  1964C35C  1C69CA67  1F6ED172
2273D87D  2578DF88  287DE693  2B82ED9E  2E87F4A9  318CFBB4
349202BF  379709CA  3A9C10D5  3DA117E0  40A61EEB  43AB25F6
46B02D01  49B5340C  4CBA3B17  4FBF4222  52C4492D  55C95038
58CE5743  5BD35E4E  5ED86559  61DD6C64  64E2736F  67E77A7A
6AEC8185  6DF18890  70F68F9B  73FB96A6  77009DB1  7A05A4BC
7D0AABC7  800FB2D2  8314B9DD  8619C0E8  891EC7F3  8C23CEFE
8F28D609  922DDD14  9532E41F  9837EB2A  9B3CF235  9E41F940
A147004B  A44C0756  A7510E61  AA56156C  AD5B1C77  B0602382
B3652A8D  B66A3198  B96F38A3  BC743FAE  BF7946B9  C27E4DC4
C58354CF  C8885BDA  CB8D62E5  CE9269F0  D19770FB  D49C7806
D7A17F11  DAA6861C  DDAB8D27  E0B09432  E3B59B3D  E6BAA248
E9BFA953  ECC4B05E  EFC9B769  F2CEBE74  F5D3C57F  F8D8CC8A
FBDDD395  FEE2DAA0  01E7E1AB  04ECE8B6  07F1EFC1  0AF6F6CC
0DFBFDD7  110104E2  14060BED  170B12F8  1A101A03  1D15210E
201A2819  231F2F24  2624362F  29293D3A  2C2E4445  2F334B50
3238525B  353D5966  38426071  3B47677C  3E4C6E87  41517592
44567C9D  475B83A8  4A608AB3  4D6591BE  506A98C9  536F9FD4
5674A6DF  5979ADEA  5C7EB4F5  5F83BC00  6288C30B  658DCA16
6892D121  6B97D82C  6E9CDF37  71A1E642  74A6ED4D  77ABF458
7AB0FB63  7DB6026E  80BB0979  83C01084  86C5178F  89CA1E9A
8CCF25A5  8FD42CB0  92D933BB  95DE3AC6  98E341D1  9BE848DC
9EED4FE7  A1F256F2  A4F75DFD  A7FC6508  AB016C13  AE06731E  (Cont. at
B10B7A29  B4108134  B715883F  BA1A8F4A  BD1F9655  C0249D60   FIG. 14D)
```

FIG. 14C

```
C329A46B  C62EAB76  C933B281  CC38B98C  CF3DC097  D242C7A2
D547CEAD  D84CD5B8  DB51DCC3  DE56E3CE  E15BEAD9  E460F1E4
E765F8EF  EA6AFFFA  ED700705  F0750E10  F37A151B  F67F1C26
F9842331  FC892A3C  FF8E3147  02933852  05983F5D  089D4668
0BA24D73  0EA7547E  11AC5B89  14B16294  17B6699F  1ABB70AA
1DC077B5  20C57EC0  23CA85CB  26CF8CD6  29D493E1  2CD99AEC
2FDEA1F7  32E3A902  35E8B00D  38EDB718  3BF2BE23  3EF7C52E
41FCCC39  4501D344  4806DA4F  4B0BE15A  4E10E865  5115EF70
541AF67B  571FFD86  5A250491  5D2A0B9C  602F12A7  633419B2
663920BD  693E27C8  6C432ED3  6F4835DE  724D3CE9  755243F4
78574AFF  7B5C520A  7E615915  81666020  846B672B  87706E36
8A757541  8D7A7C4C  907F8357  93848A62  9689916D  998E9878
9C939F83  9F98A68E  A29DAD99  A5A2B4A4  A8A7BBAF  ABACC2BA
AEB1C9C5  B1B6D0D0  B4BBD7DB  B7C0DEE6  BAC5E5F1  BDCAECFC
C0CFF407  C3D4FB12  C6DA021D  C9DF0928  CCE41033  CFE9173E
D2EE1E49  D5F32554  D8F82C5F  DBFD336A  DF023A75  E2074180
E50C488B  E8114F96  EB1656A1  EE1B5DAC  F12064B7  F4256BC2
F72A72CD  FA2F79D8  FD3480E3  003987EE  033E8EF9  06439604
09489D0F  0C4DA41A  0F52AB25  1257B230  155CB93B  1861C046
1B66C751  1E6BCE5C  2170D567  2475DC72  277AE37D  2A7FEA88
2D84F193  3089F89E  338EFFA9  369406B4  39990DBF  3C9E14CA
3FA31BD5  42A822E0  45AD29EB  48B230F6  4BB73801  4EBC3F0C
51C14617  54C64D22  57CB542D  5AD05B38  5DD56243  60DA694E
63DF7059  66E47764  69E97E6F  6CEE857A  6FF38C85  72F89390
75FD9A9B  7902A1A6  7C07A8B1  7F0CAFBC  8211B6C7  8516BDD2
881BC4DD  8B20CBE8  8E25D2F3  912AD9FE  942FE109  9734E814
9A39EF1F  9D3EF62A  A043FD35  A3490440  A64E0B4B  A9531256
AC581961  AF5D206C  B2622777  B5672E82  B86C358D  BB713C98
BE7643A3  C17B4AAE  C48051B9  C78558C4  CA8A5FCF  CD8F66DA
D0946DE5  D39974F0  D69E7BFB  D9A38306  DCA88A11  DFAD911C
E2B29827  E5B79F32  E8BCA63D  EBC1AD48  EEC6B453  F1CBBB5E
F4D0C269  F7D5C974  FADAD07F  FDDFD78A  00E4DE95  03E9E5A0
06EEECAB  09F3F3B6  0CF8FAC1  0FFE01CC  130308D7  16080FE2
```

FIG. 14D

Frequency Analysis Table for All Byte Values in the Sample Sequence
Length: 4,080 bytes
seed=0E00000E, constrained primeM=0305070B

| \ | 0 | 1 | 2 | 3 | 4 | 5 | 6 | 7 | 8 | 9 | A | B | C | D | E | F |
|---|---|---|---|---|---|---|---|---|---|---|---|---|---|---|---|---|
| 0 | 16 | 16 | 17 | 14 | 16 | 16 | 18 | 17 | 15 | 16 | 15 | 19 | 17 | 13 | 14 | 18 |
| 1 | 16 | 17 | 16 | 14 | 18 | 17 | 16 | 16 | 14 | 17 | 18 | 17 | 13 | 15 | 18 | 15 |
| 2 | 19 | 13 | 14 | 19 | 15 | 17 | 15 | 15 | 15 | 19 | 17 | 13 | 15 | 17 | 17 | 17 |
| 3 | 15 | 14 | 17 | 17 | 16 | 17 | 13 | 15 | 20 | 16 | 14 | 14 | 19 | 15 | 17 | 17 |
| 4 | 12 | 17 | 17 | 16 | 15 | 14 | 16 | 18 | 17 | 13 | 16 | 17 | 15 | 18 | 15 | 15 |
| 5 | 15 | 18 | 17 | 14 | 17 | 14 | 18 | 17 | 14 | 15 | 17 | 17 | 16 | 17 | 13 | 16 |
| 6 | 18 | 15 | 17 | 15 | 15 | 17 | 18 | 14 | 14 | 19 | 15 | 17 | 15 | 14 | 16 | 17 |
| 7 | 18 | 15 | 15 | 14 | 17 | 18 | 14 | 15 | 16 | 17 | 16 | 16 | 15 | 15 | 18 | 16 |
| 8 | 17 | 13 | 15 | 19 | 16 | 17 | 13 | 16 | 17 | 16 | 17 | 14 | 17 | 16 | 17 | 16 |
| 9 | 13 | 16 | 16 | 19 | 15 | 14 | 16 | 16 | 18 | 15 | 16 | 15 | 16 | 17 | 16 | 16 |
| A | 14 | 18 | 17 | 15 | 15 | 14 | 19 | 15 | 17 | 15 | 13 | 18 | 16 | 17 | 15 | 15 |
| B | 16 | 18 | 16 | 13 | 18 | 15 | 16 | 18 | 14 | 14 | 17 | 18 | 16 | 15 | 15 | 15 |
| C | 19 | 16 | 14 | 16 | 17 | 16 | 17 | 15 | 13 | 19 | 16 | 17 | 15 | 14 | 17 | 17 |
| D | 18 | 12 | 16 | 18 | 15 | 18 | 14 | 15 | 17 | 16 | 17 | 14 | 14 | 15 | 19 | 17 |
| E | 13 | 16 | 17 | 16 | 16 | 17 | 13 | 16 | 19 | 16 | 15 | 14 | 17 | 16 | 17 | 15 |
| F | 13 | 19 | 15 | 17 | 17 | 12 | 18 | 17 | 16 | 14 | 15 | 16 | 17 | 18 | 13 | 16 |

FIG. 14E

8,184 Bytes of Merged (Interleaved) Sample Sequence Data Generated Using
Constrained primeM Primes
seed=0E00000E, primeM1=0103050D, primeM2=0305070B, Data is not compressible

```
0F03051B  11050719  10060A28  140A0E24  11090F35  170F152F
120C1442  1A141C3A  130F194F  1D192345  14121E5C  201E2A50
15152369  2323315B  16182876  26283866  171B2D83  292D3F71
181E3290  2C32467C  1921379D  2F374D87  1A243CAA  323C5492
1B2741B7  35415B9D  1C2A46C4  384662A8  1D2D4BD1  3B4B69B3
1E3050DE  3E5070BE  1F3355EB  415577C9  20365AF8  445A7ED4
21396005  475F85DF  223C6512  4A648CEA  233F6A1F  4D6993F5
24426F2C  506E9B00  25457439  5373A20B  26487946  5678A916
274B7E53  597DB021  284E8360  5C82B72C  2951886D  5F87BE37
2A548D7A  628CC542  2B579287  6591CC4D  2C5A9794  6896D358
2D5D9CA1  6B9BDA63  2E60A1AE  6EA0E16E  2F63A6BB  71A5E879
3066ABC8  74AAEF84  3169B0D5  77AFF68F  326CB5E2  7AB4FD9A
336FBAEF  7DBA04A5  3472BFFC  80BF0BB0  3575C509  83C412BB
3678CA16  86C919C6  377BCF23  89CE20D1  387ED430  8CD327DC
3981D93D  8FD82EE7  3A84DE4A  92DD35F2  3B87E357  95E23CFD
3C8AE864  98E74408  3D8DED71  9BEC4B13  3E90F27E  9EF1521E
3F93F78B  A1F65929  4096FC98  A4FB6034  419A01A5  A800673F
429D06B2  AB056E4A  43A00BBF  AE0A7555  44A310CC  B10F7C60
45A615D9  B414836B  46A91AE6  B7198A76  47AC1FF3  BA1E9181
48AF2500  BD23988C  49B22A0D  C0289F97  4AB52F1A  C32DA6A2
4BB83427  C632ADAD  4CBB3934  C937B4B8  4DBE3E41  CC3CBBC3
4EC1434E  CF41C2CE  4FC4485B  D246C9D9  50C74D68  D54BD0E4
51CA5275  D850D7EF  52CD5782  DB55DEFA  53D05C8F  DE5AE605
54D3619C  E15FED10  55D666A9  E464F41B  56D96BB6  E769FB26
57DC70C3  EA6F0231  58DF75D0  ED74093C  59E27ADD  F0791047
5AE57FEA  F37E1752  5BE884F7  F6831E5D  5CEB8A04  F9882568
5DEE8F11  FC8D2C73  5EF1941E  FF92337E  5FF4992B  02973A89
60F79E38  059C4194  61FAA345  08A1489F  62FDA852  0BA64FAA
6400AD5F  0EAB56B5  6503B26C  11B05DC0  6606B779  14B564CB
6709BC86  17BA6BD6  680CC193  1ABF72E1  690FC6A0  1DC479EC
6A12CBAD  20C980F7  6B15D0BA  23CE8802  6C18D5C7  26D38F0D
6D1BDAD4  29D89618  6E1EDFE1  2CDD9D23  6F21E4EE  2FE2A42E
7024E9FB  32E7AB39  7127EF08  35ECB244  722AF415  38F1B94F
732DF922  3BF6C05A  7430FE2F  3EFBC765  7534033C  4200CE70
76370849  4505D57B  773A0D56  480ADC86  783D1263  4B0FE391
79401770  4E14EA9C  7A431C7D  5119F1A7  7B46218A  541EF8B2
7C492697  5723FFBD  7D4C2BA4  5A2906C8  7E4F30B1  5D2E0DD3
7F5235BE  603314DE  80553ACB  63381BE9  81583FD8  663D22F4
825B44E5  694229FF  835E49F2  6C47310A  84614EFF  6F4C3815
8564540C  72513F20  86675919  7556462B  876A5E26  785B4D36
886D6333  7B605441  89706840  7E655B4C  8A736D4D  816A6257
8B76725A  846F6962  8C797767  8774706D  8D7C7C74  8A797778
8E7F8181  8D7E7E83  8F82868E  9083858E  90858B9B  93888C99
918890A8  968D93A4  928B95B5  99929AAF  938E9AC2  9C97A1BA
94919FCF  9F9CA8C5  9594A4DC  A2A1AFD0  9697A9E9  A5A6B6DB   (Cont. at
979AAEF6  A8ABBDE6  989DB403  ABB0C4F1  99A0B910  AEB5CBFC   FIG. 15B)
```

FIG. 15A

| | | | | | |
|---|---|---|---|---|---|
| 9AA3BE1D | B1BAD307 | 9BA6C32A | B4BFDA12 | 9CA9C837 | B7C4E11D |
| 9DACCD44 | BAC9E828 | 9EAFD251 | BDCEEF33 | 9FB2D75E | C0D3F63E |
| A0B5DC6B | C3D8FD49 | A1B8E178 | C6DE0454 | A2BBE685 | C9E30B5F |
| A3BEEB92 | CCE8126A | A4C1F09F | CFED1975 | A5C4F5AC | D2F22080 |
| A6C7FAB9 | D5F7278B | A7CAFFC6 | D8FC2E96 | A8CE04D3 | DC0135A1 |
| A9D109E0 | DF063CAC | AAD40EED | E20B43B7 | ABD713FA | E5104AC2 |
| ACDA1907 | E81551CD | ADDD1E14 | EB1A58D8 | AEE02321 | EE1F5FE3 |
| AFE3282E | F12466EE | B0E62D3B | F4296DF9 | B1E93248 | F72E7504 |
| B2EC3755 | FA337C0F | B3EF3C62 | FD38831A | B4F2416F | 003D8A25 |
| B5F5467C | 03429130 | B6F84B89 | 0647983B | B7FB5096 | 094C9F46 |
| B8FE55A3 | 0C51A651 | BA015AB0 | 0F56AD5C | BB045FBD | 125BB467 |
| BC0764CA | 1560BB72 | BD0A69D7 | 1865C27D | BE0D6EE4 | 1B6AC988 |
| BF1073F1 | 1E6FD093 | C01378FE | 2174D79E | C1167E0B | 2479DEA9 |
| C2198318 | 277EE5B4 | C31C8825 | 2A83ECBF | C41F8D32 | 2D88F3CA |
| C522923F | 308DFAD5 | C625974C | 339301E0 | C7289C59 | 369808EB |
| C82BA166 | 399D0FF6 | C92EA673 | 3CA21701 | CA31AB80 | 3FA71E0C |
| CB34B08D | 42AC2517 | CC37B59A | 45B12C22 | CD3ABAA7 | 48B6332D |
| CE3DBFB4 | 4BBB3A38 | CF40C4C1 | 4EC04143 | D043C9CE | 51C5484E |
| D146CEDB | 54CA4F59 | D249D3E8 | 57CF5664 | D34CD8F5 | 5AD45D6F |
| D44FDE02 | 5DD9647A | D552E30F | 60DE6B85 | D655E81C | 63E37290 |
| D758ED29 | 66E8799B | D85BF236 | 69ED80A6 | D95EF743 | 6CF287B1 |
| DA61FC50 | 6FF78EBC | DB65015D | 72FC95C7 | DC68066A | 76019CD2 |
| DD6B0B77 | 7906A3DD | DE6E1084 | 7C0BAAE8 | DF711591 | 7F10B1F3 |
| E0741A9E | 8215B8FE | E1771FAB | 851AC009 | E27A24B8 | 881FC714 |
| E37D29C5 | 8B24CE1F | E4802ED2 | 8E29D52A | E58333DF | 912EDC35 |
| E68638EC | 9433E340 | E7893DF9 | 9738EA4B | E88C4306 | 9A3DF156 |
| E98F4813 | 9D42F861 | EA924D20 | A047FF6C | EB95522D | A34D0677 |
| EC98573A | A6520D82 | ED9B5C47 | A957148D | EE9E6154 | AC5C1B98 |
| EFA16661 | AF6122A3 | F0A46B6E | B26629AE | F1A7707B | B56B30B9 |
| F2AA7588 | B87037C4 | F3AD7A95 | BB753ECF | F4B07FA2 | BE7A45DA |
| F5B384AF | C17F4CE5 | F6B689BC | C48453F0 | F7B98EC9 | C7895AFB |
| F8BC93D6 | CA8E6206 | F9BF98E3 | CD936911 | FAC29DF0 | D098701C |
| FBC5A2FD | D39D7727 | FCC8A80A | D6A27E32 | FDCBAD17 | D9A7853D |
| FECEB224 | DCAC8C48 | FFD1B731 | DFB19353 | 00D4BC3E | E2B69A5E |
| 01D7C14B | E5BBA169 | 02DAC658 | E8C0A874 | 03DDCB65 | EBC5AF7F |
| 04E0D072 | EECAB68A | 05E3D57F | F1CFBD95 | 06E6DA8C | F4D4C4A0 |
| 07E9DF99 | F7D9CBAB | 08ECE4A6 | FADED2B6 | 09EFE9B3 | FDE3D9C1 |
| 0AF2EEC0 | 00E8E0CC | 0BF5F3CD | 03EDE7D7 | 0CF8F8DA | 06F2EEE2 |
| 0DFBFDE7 | 09F7F5ED | 0EFF02F4 | 0CFCFCF8 | 10020801 | 10020403 |
| 11050D0E | 13070B0E | 1208121B | 160C1219 | 130B1728 | 19111924 |
| 140E1C35 | 1C16202F | 15112142 | 1F1B273A | 1614264F | 22202E45 |
| 17172B5C | 25253550 | 181A3069 | 282A3C5B | 191D3576 | 2B2F4366 |
| 1A203A83 | 2E344A71 | 1B233F90 | 3139517C | 1C26449D | 343E5887 |
| 1D2949AA | 37435F92 | 1E2C4EB7 | 3A48669D | 1F2F53C4 | 3D4D6DA8 |
| 203258D1 | 405274B3 | 21355DDE | 43577BBE | 223862EB | 465C82C9 |
| 233B67F8 | 496189D4 | 243E6D05 | 4C6690DF | 25417212 | 4F6B97EA |
| 2644771F | 52709EF5 | 27477C2C | 5575A600 | 284A8139 | 587AAD0B |
| 294D8646 | 5B7FB416 | 2A508B53 | 5E84BB21 | 2B539060 | 6189C22C |
| 2C56956D | 648EC937 | 2D599A7A | 6793D042 | 2E5C9F87 | 6A98D74D |
| 2F5FA494 | 6D9DDE58 | 3062A9A1 | 70A2E563 | 3165AEAE | 73A7EC6E |
| 3268B3BB | 76ACF379 | 336BB8C8 | 79B1FA84 | 346EBDD5 | 7CB7018F |
| 3571C2E2 | 7FBC089A | 3674C7EF | 82C10FA5 | 3777CCFC | 85C616B0 |

| | | | | | |
|---|---|---|---|---|---|
| 387AD209 | 88CB1DBB | 397DD716 | 8BD024C6 | 3A80DC23 | 8ED52BD1 |
| 3B83E130 | 91DA32DC | 3C86E63D | 94DF39E7 | 3D89EB4A | 97E440F2 |
| 3E8CF057 | 9AE947FD | 3F8FF564 | 9DEE4F08 | 4092FA71 | A0F35613 |
| 4195FF7E | A3F85D1E | 4299048B | A6FD6429 | 439C0998 | AA026B34 |
| 449F0EA5 | AD07723F | 45A213B2 | B00C794A | 46A518BF | B3118055 |
| 47A81DCC | B6168760 | 48AB22D9 | B91B8E6B | 49AE27E6 | BC209576 |
| 4AB12CF3 | BF259C81 | 4BB43200 | C22AA38C | 4CB7370D | C52FAA97 |
| 4DBA3C1A | C834B1A2 | 4EBD4127 | CB39B8AD | 4FC04634 | CE3EBFB8 |
| 50C34B41 | D143C6C3 | 51C6504E | D448CDCE | 52C9555B | D74DD4D9 |
| 53CC5A68 | DA52DBE4 | 54CF5F75 | DD57E2EF | 55D26482 | E05CE9FA |
| 56D5698F | E361F105 | 57D86E9C | E666F810 | 58DB73A9 | E96BFF1B |
| 59DE78B6 | EC710626 | 5AE17DC3 | EF760D31 | 5BE482D0 | F27B143C |
| 5CE787DD | F5801B47 | 5DEA8CEA | F8852252 | 5EED91F7 | FB8A295D |
| 5FF09704 | FE8F3068 | 60F39C11 | 01943773 | 61F6A11E | 04993E7E |
| 62F9A62B | 079E4589 | 63FCAB38 | 0AA34C94 | 64FFB045 | 0DA8539F |
| 6602B552 | 10AD5AAA | 6705BA5F | 13B261B5 | 6808BF6C | 16B768C0 |
| 690BC479 | 19BC6FCB | 6A0EC986 | 1CC176D6 | 6B11CE93 | 1FC67DE1 |
| 6C14D3A0 | 22CB84EC | 6D17D8AD | 25D08BF7 | 6E1ADDBA | 28D59302 |
| 6F1DE2C7 | 2BDA9A0D | 7020E7D4 | 2EDFA118 | 7123ECE1 | 31E4A823 |
| 7226F1EE | 34E9AF2E | 7329F6FB | 37EEB639 | 742CFC08 | 3AF3BD44 |
| 75300115 | 3DF8C44F | 76330622 | 40FDCB5A | 77360B2F | 4402D265 |
| 7839103C | 4707D970 | 793C1549 | 4A0CE07B | 7A3F1A56 | 4D11E786 |
| 7B421F63 | 5016EE91 | 7C452470 | 531BF59C | 7D48297D | 5620FCA7 |
| 7E4B2E8A | 592603B2 | 7F4E3397 | 5C2B0ABD | 805138A4 | 5F3011C8 |
| 81543DB1 | 623518D3 | 825742BE | 653A1FDE | 835A47CB | 683F26E9 |
| 845D4CD8 | 6B442DF4 | 856051E5 | 6E4934FF | 866356F2 | 714E3C0A |
| 87665BFF | 74534315 | 8869610C | 77584A20 | 896C6619 | 7A5D512B |
| 8A6F6B26 | 7D625836 | 8B727033 | 80675F41 | 8C757540 | 836C664C |
| 8D787A4D | 86716D57 | 8E7B7F5A | 89767462 | 8F7E8467 | 8C7B7B6D |
| 90818974 | 8F808278 | 91848E81 | 92858983 | 9287938E | 958A908E |
| 938A989B | 988F9799 | 948D9DA8 | 9B949EA4 | 9590A2B5 | 9E99A5AF |
| 9693A7C2 | A19EACBA | 9796ACCF | A4A3B3C5 | 9899B1DC | A7A8BAD0 |
| 999CB6E9 | AAADC1DB | 9A9FBBF6 | ADB2C8E6 | 9BA2C103 | B0B7CFF1 |
| 9CA5C610 | B3BCD6FC | 9DA8CB1D | B6C1DE07 | 9EABD02A | B9C6E512 |
| 9FAED537 | BCCBEC1D | A0B1DA44 | BFD0F328 | A1B4DF51 | C2D5FA33 |
| A2B7E45E | C5DB013E | A3BAE96B | C8E00849 | A4BDEE78 | CBE50F54 |
| A5C0F385 | CEEA165F | A6C3F892 | D1EF1D6A | A7C6FD9F | D4F42475 |
| A8CA02AC | D7F92B80 | A9CD07B9 | DAFE328B | AAD00CC6 | DE033996 |
| ABD311D3 | E10840A1 | ACD616E0 | E40D47AC | ADD91BED | E7124EB7 |
| AEDC20FA | EA1755C2 | AFDF2607 | ED1C5CCD | B0E22B14 | F02163D8 |
| B1E53021 | F3266AE3 | B2E8352E | F62B71EE | B3EB3A3B | F93078F9 |
| B4EE3F48 | FC358004 | B5F14455 | FF3A870F | B6F44962 | 023F8E1A |
| B7F74E6F | 05449525 | B8FA537C | 08499C30 | B9FD5889 | 0B4EA33B |
| BB005D96 | 0E53AA46 | BC0362A3 | 1158B151 | BD0667B0 | 145DB85C |
| BE096CBD | 1762BF67 | BF0C71CA | 1A67C672 | C00F76D7 | 1D6CCD7D |
| C1127BE4 | 2071D488 | C21580F1 | 2376DB93 | C31885FE | 267BE29E |
| C41B8B0B | 2980E9A9 | C51E9018 | 2C85F0B4 | C6219525 | 2F8AF7BF |
| C7249A32 | 328FFECA | C8279F3F | 359505D5 | C92AA44C | 389A0CE0 |
| CA2DA959 | 3B9F13EB | CB30AE66 | 3EA41AF6 | CC33B373 | 41A92201 |
| CD36B880 | 44AE290C | CE39BD8D | 47B33017 | CF3CC29A | 4AB83722 |
| D03FC7A7 | 4DBD3E2D | D142CCB4 | 50C24538 | D245D1C1 | 53C74C43 |
| D348D6CE | 56CC534E | D44BDBDB | 59D15A59 | D54EE0E8 | 5CD66164 |

| | | | | | |
|---|---|---|---|---|---|
| D651E5F5 | 5FDB686F | D754EB02 | 62E06F7A | D857F00F | 65E57685 |
| D95AF51C | 68EA7D90 | DA5DFA29 | 6BEF849B | DB60FF36 | 6EF48BA6 |
| DC640443 | 71F992B1 | DD670950 | 74FE99BC | DE6A0E5D | 7803A0C7 |
| DF6D136A | 7B08A7D2 | E0701877 | 7E0DAEDD | E1731D84 | 8112B5E8 |
| E2762291 | 8417BCF3 | E379279E | 871CC3FE | E47C2CAB | 8A21CB09 |
| E57F31B8 | 8D26D214 | E68236C5 | 902BD91F | E7853BD2 | 9330E02A |
| E88840DF | 9635E735 | E98B45EC | 993AEE40 | EA8E4AF9 | 9C3FF54B |
| EB915006 | 9F44FC56 | EC945513 | A24A0361 | ED975A20 | A54F0A6C |
| EE9A5F2D | A8541177 | EF9D643A | AB591882 | F0A06947 | AE5E1F8D |
| F1A36E54 | B1632698 | F2A67361 | B4682DA3 | F3A9786E | B76D34AE |
| F4AC7D7B | BA723BB9 | F5AF8288 | BD7742C4 | F6B28795 | C07C49CF |
| F7B58CA2 | C38150DA | F8B891AF | C68657E5 | F9BB96BC | C98B5EF0 |
| FABE9BC9 | CC9065FB | FBC1A0D6 | CF956D06 | FCC4A5E3 | D29A7411 |
| FDC7AAF0 | D59F7B1C | FECAAFFD | D8A48227 | FFCDB50A | DBA98932 |
| 00D0BA17 | DEAE903D | 01D3BF24 | E1B39748 | 02D6C431 | E4B89E53 |
| 03D9C93E | E7BDA55E | 04DCCE4B | EAC2AC69 | 05DFD358 | EDC7B374 |
| 06E2D865 | F0CCBA7F | 07E5DD72 | F3D1C18A | 08E8E27F | F6D6C895 |
| 09EBE78C | F9DBCFA0 | 0AEEEC99 | FCE0D6AB | 0BF1F1A6 | FFE5DDB6 |
| 0CF4F6B3 | 02EAE4C1 | 0DF7FBC0 | 05EFEBCC | 0EFB00CD | 08F4F2D7 |
| 0FFE05DA | 0BF9F9E2 | 11010AE7 | 0EFF00ED | 12040FF4 | 120407F8 |
| 13071501 | 15090F03 | 140A1A0E | 180E160E | 150D1F1B | 1B131D19 |
| 16102428 | 1E182424 | 17132935 | 211D2B2F | 18162E42 | 2422323A |
| 1919334F | 27273945 | 1A1C385C | 2A2C4050 | 1B1F3D69 | 2D31475B |
| 1C224276 | 30364E66 | 1D254783 | 333B5571 | 1E284C90 | 36405C7C |
| 1F2B519D | 39456387 | 202E56AA | 3C4A6A92 | 21315BB7 | 3F4F719D |
| 223460C4 | 425478A8 | 233765D1 | 45597FB3 | 243A6ADE | 485E86BE |
| 253D6FEB | 4B638DC9 | 264074F8 | 4E6894D4 | 27437A05 | 516D9BDF |
| 28467F12 | 5472A2EA | 2949841F | 5777A9F5 | 2A4C892C | 5A7CB100 |
| 2B4F8E39 | 5D81B80B | 2C529346 | 6086BF16 | 2D559853 | 638BC621 |
| 2E589D60 | 6690CD2C | 2F5BA26D | 6995D437 | 305EA77A | 6C9ADB42 |
| 3161AC87 | 6F9FE24D | 3264B194 | 72A4E958 | 3367B6A1 | 75A9F063 |
| 346ABBAE | 78AEF76E | 356DC0BB | 7BB3FE79 | 3670C5C8 | 7EB90584 |
| 3773CAD5 | 81BE0C8F | 3876CFE2 | 84C3139A | 3979D4EF | 87C81AA5 |
| 3A7CD9FC | 8ACD21B0 | 3B7FDF09 | 8DD228BB | 3C82E416 | 90D72FC6 |
| 3D85E923 | 93DC36D1 | 3E88EE30 | 96E13DDC | 3F8BF33D | 99E644E7 |
| 408EF84A | 9CEB4BF2 | 4191FD57 | 9FF052FD | 42950264 | A2F55A08 |
| 43980771 | A5FA6113 | 449B0C7E | A8FF681E | 459E118B | AC046F29 |
| 46A11698 | AF097634 | 47A41BA5 | B20E7D3F | 48A720B2 | B513844A |
| 49AA25BF | B8188B55 | 4AAD2ACC | BB1D9260 | 4BB02FD9 | BE22996B |
| 4CB334E6 | C127A076 | 4DB639F3 | C42CA781 | 4EB93F00 | C731AE8C |
| 4FBC440D | CA36B597 | 50BF491A | CD3BBCA2 | 51C24E27 | D040C3AD |
| 52C55334 | D345CAB8 | 53C85841 | D64AD1C3 | 54CB5D4E | D94FD8CE |
| 55CE625B | DC54DFD9 | 56D16768 | DF59E6E4 | 57D46C75 | E25EEDEF |
| 58D77182 | E563F4FA | 59DA768F | E868FC05 | 5ADD7B9C | EB6E0310 |
| 5BE080A9 | EE730A1B | 5CE385B6 | F1781126 | 5DE68AC3 | F47D1831 |
| 5EE98FD0 | F7821F3C | 5FEC94DD | FA872647 | 60EF99EA | FD8C2D52 |
| 61F29EF7 | 0091345D | 62F5A404 | 03963B68 | 63F8A911 | 069B4273 |
| 64FBAE1E | 09A0497E | 65FEB32B | 0CA55089 | 6701B838 | 0FAA5794 |
| 6804BD45 | 12AF5E9F | 6907C252 | 15B465AA | 6A0AC75F | 18B96CB5 |
| 6B0DCC6C | 1BBE73C0 | 6C10D179 | 1EC37ACB | 6D13D686 | 21C881D6 |
| 6E16DB93 | 24CD88E1 | 6F19E0A0 | 27D28FEC | 701CE5AD | 2AD796F7 |

| | | | | | |
|---|---|---|---|---|---|
| 711FEABA | 2DDC9E02 | 7222EFC7 | 30E1A50D | 7325F4D4 | 33E6AC18 |
| 7428F9E1 | 36EBB323 | 752BFEEE | 39F0BA2E | 762F03FB | 3CF5C139 |
| 77320908 | 3FFAC844 | 78350E15 | 42FFCF4F | 79381322 | 4604D65A |
| 7A3B182F | 4909DD65 | 7B3E1D3C | 4C0EE470 | 7C412249 | 4F13EB7B |
| 7D442756 | 5218F286 | 7E472C63 | 551DF991 | 7F4A3170 | 5823009C |
| 804D367D | 5B2807A7 | 81503B8A | 5E2D0EB2 | 82534097 | 613215BD |
| 835645A4 | 64371CC8 | 84594AB1 | 673C23D3 | 855C4FBE | 6A412ADE |
| 865F54CB | 6D4631E9 | 876259D8 | 704B38F4 | 88655EE5 | 73503FFF |
| 896863F2 | 7655470A | 8A6B68FF | 795A4E15 | 8B6E6E0C | 7C5F5520 |
| 8C717319 | 7F645C2B | 8D747826 | 82696336 | 8E777D33 | 856E6A41 |
| 8F7A8240 | 8873714C | 907D874D | 8B787857 | 91808C5A | 8E7D7F62 |
| 92839167 | 9182866D | 93869674 | 94878D78 | 94899B81 | 978C9483 |
| 958CA08E | 9A919B8E | 968FA59B | 9D96A299 | 9792AAA8 | A09BA9A4 |
| 9895AFB5 | A3A0B0AF | 9998B4C2 | A6A5B7BA | 9A9BB9CF | A9AABEC5 |
| 9B9EBEDC | ACAFC5D0 | 9CA1C3E9 | AFB4CCDB | 9DA4C8F6 | B2B9D3E6 |
| 9EA7CE03 | B5BEDAF1 | 9FAAD310 | B8C3E1FC | A0ADD81D | BBC8E907 |
| A1B0DD2A | BECDF012 | A2B3E237 | C1D2F71D | A3B6E744 | C4D7FE28 |
| A4B9EC51 | C7DD0533 | A5BCF15E | CAE20C3E | A6BFF66B | CDE71349 |
| A7C2FB78 | D0EC1A54 | A8C60085 | D3F1215F | A9C90592 | D6F6286A |
| AACC0A9F | D9FB2F75 | ABCF0FAC | DD003680 | ACD214B9 | E0053D8B |
| ADD519C6 | E30A4496 | AED81ED3 | E60F4BA1 | AFDB23E0 | E91452AC |
| B0DE28ED | EC1959B7 | B1E12DFA | EF1E60C2 | B2E43307 | F22367CD |
| B3E73814 | F5286ED8 | B4EA3D21 | F82D75E3 | B5ED422E | FB327CEE |
| B6F0473B | FE3783F9 | B7F34C48 | 013C8B04 | B8F65155 | 0441920F |
| B9F95662 | 0746991A | BAFC5B6F | 0A4BA025 | BBFF607C | 0D50A730 |
| BD026589 | 1055AE3B | BE056A96 | 135AB546 | BF086FA3 | 165FBC51 |
| C00B74B0 | 1964C35C | C10E79BD | 1C69CA67 | C2117ECA | 1F6ED172 |
| C31483D7 | 2273D87D | C41788E4 | 2578DF88 | C51A8DF1 | 287DE693 |
| C61D92FE | 2B82ED9E | C720980B | 2E87F4A9 | C8239D18 | 318CFBB4 |
| C926A225 | 349202BF | CA29A732 | 379709CA | CB2CAC3F | 3A9C10D5 |
| CC2FB14C | 3DA117E0 | CD32B659 | 40A61EEB | CE35BB66 | 43AB25F6 |
| CF38C073 | 46B02D01 | D03BC580 | 49B5340C | D13ECA8D | 4CBA3B17 |
| D241CF9A | 4FBF4222 | D344D4A7 | 52C4492D | D447D9B4 | 55C95038 |
| D54ADEC1 | 58CE5743 | D64DE3CE | 5BD35E4E | D750E8DB | 5ED86559 |
| D853EDE8 | 61DD6C64 | D956F2F5 | 64E2736F | DA59F802 | 67E77A7A |
| DB5CFD0F | 6AEC8185 | DC60021C | 6DF18890 | DD630729 | 70F68F9B |
| DE660C36 | 73FB96A6 | DF691143 | 77009DB1 | E06C1650 | 7A05A4BC |
| E16F1B5D | 7D0AABC7 | E272206A | 800FB2D2 | E3752577 | 8314B9DD |
| E4782A84 | 8619C0E8 | E57B2F91 | 891EC7F3 | E67E349E | 8C23CEFE |
| E78139AB | 8F28D609 | E8843EB8 | 922DDD14 | E98743C5 | 9532E41F |
| EA8A48D2 | 9837EB2A | EB8D4DDF | 9B3CF235 | EC9052EC | 9E41F940 |
| ED9357F9 | A147004B | EE965D06 | A44C0756 | EF996213 | A7510E61 |
| F09C6720 | AA56156C | F19F6C2D | AD5B1C77 | F2A2713A | B0602382 |
| F3A57647 | B3652A8D | F4A87B54 | B66A3198 | F5AB8061 | B96F38A3 |
| F6AE856E | BC743FAE | F7B18A7B | BF7946B9 | F8B48F88 | C27E4DC4 |
| F9B79495 | C58354CF | FABA99A2 | C8885BDA | FBBD9EAF | CB8D62E5 |
| FCC0A3BC | CE9269F0 | FDC3A8C9 | D19770FB | FEC6ADD6 | D49C7806 |
| FFC9B2E3 | D7A17F11 | 00CCB7F0 | DAA6861C | 01CFBCFD | DDAB8D27 |
| 02D2C20A | E0B09432 | 03D5C717 | E3B59B3D | 04D8CC24 | E6BAA248 |
| 05DBD131 | E9BFA953 | 06DED63E | ECC4B05E | 07E1DB4B | EFC9B769 |
| 08E4E058 | F2CEBE74 | 09E7E565 | F5D3C57F | 0AEAEA72 | F8D8CC8A |
| 0BEDEF7F | FBDDD395 | 0CF0F48C | FEE2DAA0 | 0DF3F999 | 01E7E1AB |

| | | | | | |
|---|---|---|---|---|---|
| 0EF6FEA6 | 04ECE8B6 | 0FFA03B3 | 07F1EFC1 | 10FD08C0 | 0AF6F6CC |
| 12000DCD | 0DFBFDD7 | 130312DA | 110104E2 | 140617E7 | 14060BED |
| 15091CF4 | 170B12F8 | 160C2201 | 1A101A03 | 170F270E | 1D15210E |
| 18122C1B | 201A2819 | 19153128 | 231F2F24 | 1A183635 | 2624362F |
| 1B1B3B42 | 29293D3A | 1C1E404F | 2C2E4445 | 1D21455C | 2F334B50 |
| 1E244A69 | 3238525B | 1F274F76 | 353D5966 | 202A5483 | 38426071 |
| 212D5990 | 3B47677C | 22305E9D | 3E4C6E87 | 233363AA | 41517592 |
| 243668B7 | 44567C9D | 25396DC4 | 475B83A8 | 263C72D1 | 4A608AB3 |
| 273F77DE | 4D6591BE | 28427CEB | 506A98C9 | 294581F8 | 536F9FD4 |
| 2A488705 | 5674A6DF | 2B4B8C12 | 5979ADEA | 2C4E911F | 5C7EB4F5 |
| 2D51962C | 5F83BC00 | 2E549B39 | 6288C30B | 2F57A046 | 658DCA16 |
| 305AA553 | 6892D121 | 315DAA60 | 6B97D82C | 3260AF6D | 6E9CDF37 |
| 3363B47A | 71A1E642 | 3466B987 | 74A6ED4D | 3569BE94 | 77ABF458 |
| 366CC3A1 | 7AB0FB63 | 376FC8AE | 7DB6026E | 3872CDBB | 80BB0979 |
| 3975D2C8 | 83C01084 | 3A78D7D5 | 86C5178F | 3B7BDCE2 | 89CA1E9A |
| 3C7EE1EF | 8CCF25A5 | 3D81E6FC | 8FD42CB0 | 3E84EC09 | 92D933BB |
| 3F87F116 | 95DE3AC6 | 408AF623 | 98E341D1 | 418DFB30 | 9BE848DC |
| 4291003D | 9EED4FE7 | 4394054A | A1F256F2 | 44970A57 | A4F75DFD |
| 459A0F64 | A7FC6508 | 469D1471 | AB016C13 | 47A0197E | AE06731E |
| 48A31E8B | B10B7A29 | 49A62398 | B4108134 | 4AA928A5 | B715883F |
| 4BAC2DB2 | BA1A8F4A | 4CAF32BF | BD1F9655 | 4DB237CC | C0249D60 |
| 4EB53CD9 | C329A46B | 4FB841E6 | C62EAB76 | 50BB46F3 | C933B281 |
| 51BE4C00 | CC38B98C | 52C1510D | CF3DC097 | 53C4561A | D242C7A2 |
| 54C75B27 | D547CEAD | 55CA6034 | D84CD5B8 | 56CD6541 | DB51DCC3 |
| 57D06A4E | DE56E3CE | 58D36F5B | E15BEAD9 | 59D67468 | E460F1E4 |
| 5AD97975 | E765F8EF | 5BDC7E82 | EA6AFFFA | 5CDF838F | ED700705 |
| 5DE2889C | F0750E10 | 5EE58DA9 | F37A151B | 5FE892B6 | F67F1C26 |
| 60EB97C3 | F9842331 | 61EE9CD0 | FC892A3C | 62F1A1DD | FF8E3147 |
| 63F4A6EA | 02933852 | 64F7ABF7 | 05983F5D | 65FAB104 | 089D4668 |
| 66FDB611 | 0BA24D73 | 6800BB1E | 0EA7547E | 6903C02B | 11AC5B89 |
| 6A06C538 | 14B16294 | 6B09CA45 | 17B6699F | 6C0CCF52 | 1ABB70AA |
| 6D0FD45F | 1DC077B5 | 6E12D96C | 20C57EC0 | 6F15DE79 | 23CA85CB |
| 7018E386 | 26CF8CD6 | 711BE893 | 29D493E1 | 721EEDA0 | 2CD99AEC |
| 7321F2AD | 2FDEA1F7 | 7424F7BA | 32E3A902 | 7527FCC7 | 35E8B00D |
| 762B01D4 | 38EDB718 | 772E06E1 | 3BF2BE23 | 78310BEE | 3EF7C52E |
| 793410FB | 41FCCC39 | 7A371608 | 4501D344 | 7B3A1B15 | 4806DA4F |
| 7C3D2022 | 4B0BE15A | 7D40252F | 4E10E865 | 7E432A3C | 5115EF70 |
| 7F462F49 | 541AF67B | 80493456 | 571FFD86 | 814C3963 | 5A250491 |
| 824F3E70 | 5D2A0B9C | 8352437D | 602F12A7 | 8455488A | 633419B2 |
| 85584D97 | 663920BD | 865B52A4 | 693E27C8 | 875E57B1 | 6C432ED3 |
| 88615CBE | 6F4835DE | 896461CB | 724D3CE9 | 8A6766D8 | 755243F4 |
| 8B6A6BE5 | 78574AFF | 8C6D70F2 | 7B5C520A | 8D7075FF | 7E615915 |
| 8E737B0C | 81666020 | 8F768019 | 846B672B | 90798526 | 87706E36 |
| 917C8A33 | 8A757541 | 927F8F40 | 8D7A7C4C | 9382944D | 907F8357 |
| 9485995A | 93848A62 | 95889E67 | 9689916D | 968BA374 | 998E9878 |
| 978EA881 | 9C939F83 | 9891AD8E | 9F98A68E | 9994B29B | A29DAD99 |
| 9A97B7A8 | A5A2B4A4 | 9B9ABCB5 | A8A7BBAF | 9C9DC1C2 | ABACC2BA |
| 9DA0C6CF | AEB1C9C5 | 9EA3CBDC | B1B6D0D0 | 9FA6D0E9 | B4BBD7DB |
| A0A9D5F6 | B7C0DEE6 | A1ACDB03 | BAC5E5F1 | A2AFE010 | BDCAECFC |
| A3B2E51D | C0CFF407 | A4B5EA2A | C3D4FB12 | A5B8EF37 | C6DA021D |
| A6BBF444 | C9DF0928 | A7BEF951 | CCE41033 | A8C1FE5E | CFE9173E |
| A9C5036B | D2EE1E49 | AAC80878 | D5F32554 | ABCB0D85 | D8F82C5F |

| | | | | | |
|---|---|---|---|---|---|
| ACCE1292 | DBFD336A | ADD1179F | DF023A75 | AED41CAC | E2074180 |
| AFD721B9 | E50C488B | B0DA26C6 | E8114F96 | B1DD2BD3 | EB1656A1 |
| B2E030E0 | EE1B5DAC | B3E335ED | F12064B7 | B4E63AFA | F4256BC2 |
| B5E94007 | F72A72CD | B6EC4514 | FA2F79D8 | B7EF4A21 | FD3480E3 |
| B8F24F2E | 003987EE | B9F5543B | 033E8EF9 | BAF85948 | 06439604 |
| BBFB5E55 | 09489D0F | BCFE6362 | 0C4DA41A | BE01686F | 0F52AB25 |
| BF046D7C | 1257B230 | C0077289 | 155CB93B | C10A7796 | 1861C046 |
| C20D7CA3 | 1B66C751 | C31081B0 | 1E6BCE5C | C41386BD | 2170D567 |
| C5168BCA | 2475DC72 | C61990D7 | 277AE37D | C71C95E4 | 2A7FEA88 |
| C81F9AF1 | 2D84F193 | C9229FFE | 3089F89E | CA25A50B | 338EFFA9 |
| CB28AA18 | 369406B4 | CC2BAF25 | 39990DBF | CD2EB432 | 3C9E14CA |
| CE31B93F | 3FA31BD5 | CF34BE4C | 42A822E0 | D037C359 | 45AD29EB |
| D13AC866 | 48B230F6 | D23DCD73 | 4BB73801 | D340D280 | 4EBC3F0C |
| D443D78D | 51C14617 | D546DC9A | 54C64D22 | D649E1A7 | 57CB542D |
| D74CE6B4 | 5AD05B38 | D84FEBC1 | 5DD56243 | D952F0CE | 60DA694E |
| DA55F5DB | 63DF7059 | DB58FAE8 | 66E47764 | DC5BFFF5 | 69E97E6F |
| DD5F0502 | 6CEE857A | DE620A0F | 6FF38C85 | DF650F1C | 72F89390 |
| E0681429 | 75FD9A9B | E16B1936 | 7902A1A6 | E26E1E43 | 7C07A8B1 |
| E3712350 | 7F0CAFBC | E474285D | 8211B6C7 | E5772D6A | 8516BDD2 |
| E67A3277 | 881BC4DD | E77D3784 | 8B20CBE8 | E8803C91 | 8E25D2F3 |
| E983419E | 912AD9FE | EA8646AB | 942FE109 | EB894BB8 | 9734E814 |
| EC8C50C5 | 9A39EF1F | ED8F55D2 | 9D3EF62A | EE925ADF | A043FD35 |
| EF955FEC | A3490440 | F09864F9 | A64E0B4B | F19B6A06 | A9531256 |
| F29E6F13 | AC581961 | F3A17420 | AF5D206C | F4A4792D | B2622777 |
| F5A77E3A | B5672E82 | F6AA8347 | B86C358D | F7AD8854 | BB713C98 |
| F8B08D61 | BE7643A3 | F9B3926E | C17B4AAE | FAB6977B | C48051B9 |
| FBB99C88 | C78558C4 | FCBCA195 | CA8A5FCF | FDBFA6A2 | CD8F66DA |
| FEC2ABAF | D0946DE5 | FFC5B0BC | D39974F0 | 00C8B5C9 | D69E7BFB |
| 01CBBAD6 | D9A38306 | 02CEBFE3 | DCA88A11 | 03D1C4F0 | DFAD911C |
| 04D4C9FD | E2B29827 | 05D7CF0A | E5B79F32 | 06DAD417 | E8BCA63D |
| 07DDD924 | EBC1AD48 | 08E0DE31 | EEC6B453 | 09E3E33E | F1CBBB5E |
| 0AE6E84B | F4D0C269 | 0BE9ED58 | F7D5C974 | 0CECF265 | FADAD07F |
| 0DEFF772 | FDDFD78A | 0EF2FC7F | 00E4DE95 | 0FF6018C | 03E9E5A0 |
| 10F90699 | 06EEECAB | 11FC0BA6 | 09F3F3B6 | 12FF10B3 | 0CF8FAC1 |
| 140215C0 | 0FFE01CC | 15051ACD | 130308D7 | 16081FDA | 16080FE2 |
| 170B24E7 | 190D16ED | 180E29F4 | 1C121DF8 | 19112F01 | 1F172503 |

FIG. 15G

Frequency Analysis Table for All Byte Values in the Sample Sequence
Length: 8,184 Bytes
seed=0E00000E, constrained primeM1=0103050D, constrained primeM2=0305070B

4,080 Bytes of Sample Sequence Data Generated Using Unconstrained primeM
seed=0E00000E, primeM=01000201, Data is compressible

```
0F00020F  10000410  11000611  12000812  13000A13  14000C14
15000E15  16001016  17001217  18001418  19001619  1A00181A
1B001A1B  1C001C1C  1D001E1D  1E00201E  1F00221F  20002420
21002621  22002822  23002A23  24002C24  25002E25  26003026
27003227  28003428  29003629  2A00382A  2B003A2B  2C003C2C
2D003E2D  2E00402E  2F00422F  30004430  31004631  32004832
33004A33  34004C34  35004E35  36005036  37005237  38005438
39005639  3A00583A  3B005A3B  3C005C3C  3D005E3D  3E00603E
3F00623F  40006440  41006641  42006842  43006A43  44006C44
45006E45  46007046  47007247  48007448  49007649  4A00784A
4B007A4B  4C007C4C  4D007E4D  4E00804E  4F00824F  50008450
51008651  52008852  53008A53  54008C54  55008E55  56009056
57009257  58009458  59009659  5A00985A  5B009A5B  5C009C5C
5D009E5D  5E00A05E  5F00A25F  6000A460  6100A661  6200A862
6300AA63  6400AC64  6500AE65  6600B066  6700B267  6800B468
6900B669  6A00B86A  6B00BA6B  6C00BC6C  6D00BE6D  6E00C06E
6F00C26F  7000C470  7100C671  7200C872  7300CA73  7400CC74
7500CE75  7600D076  7700D277  7800D478  7900D679  7A00D87A
7B00DA7B  7C00DC7C  7D00DE7D  7E00E07E  7F00E27F  8000E480
8100E681  8200E882  8300EA83  8400EC84  8500EE85  8600F086
8700F287  8800F488  8900F689  8A00F88A  8B00FA8B  8C00FC8C
8D00FE8D  8E01008E  8F01028F  90010490  91010691  92010892
93010A93  94010C94  95010E95  96011096  97011297  98011498
99011699  9A01189A  9B011A9B  9C011C9C  9D011E9D  9E01209E
9F01229F  A00124A0  A10126A1  A20128A2  A3012AA3  A4012CA4
A5012EA5  A60130A6  A70132A7  A80134A8  A90136A9  AA0138AA
AB013AAB  AC013CAC  AD013EAD  AE0140AE  AF0142AF  B00144B0
B10146B1  B20148B2  B3014AB3  B4014CB4  B5014EB5  B60150B6
B70152B7  B80154B8  B90156B9  BA0158BA  BB015ABB  BC015CBC
BD015EBD  BE0160BE  BF0162BF  C00164C0  C10166C1  C20168C2
C3016AC3  C4016CC4  C5016EC5  C60170C6  C70172C7  C80174C8
C90176C9  CA0178CA  CB017ACB  CC017CCC  CD017ECD  CE0180CE
CF0182CF  D00184D0  D10186D1  D20188D2  D3018AD3  D4018CD4
D5018ED5  D60190D6  D70192D7  D80194D8  D90196D9  DA0198DA
DB019ADB  DC019CDC  DD019EDD  DE01A0DE  DF01A2DF  E001A4E0
E101A6E1  E201A8E2  E301AAE3  E401ACE4  E501AEE5  E601B0E6
E701B2E7  E801B4E8  E901B6E9  EA01B8EA  EB01BAEB  EC01BCEC
ED01BEED  EE01C0EE  EF01C2EF  F001C4F0  F101C6F1  F201C8F2
F301CAF3  F401CCF4  F501CEF5  F601D0F6  F701D2F7  F801D4F8
F901D6F9  FA01D8FA  FB01DAFB  FC01DCFC  FD01DEFD  FE01E0FE
FF01E2FF  0001E500  0101E701  0201E902  0301EB03  0401ED04
0501EF05  0601F106  0701F307  0801F508  0901F709  0A01F90A
0B01FB0B  0C01FD0C  0D01FF0D  0E02010E  0F02030F  10020510
11020711  12020912  13020B13  14020D14  15020F15  16021116
17021317  18021518  19021719  1A02191A  1B021B1B  1C021D1C
1D021F1D  1E02211E  1F02231F  20022520  21022721  22022922
23022B23  24022D24  25022F25  26023126  27023327  28023528
```
(Cont. at FIG. 16B)

FIG. 16A

```
29023729  2A02392A  2B023B2B  2C023D2C  2D023F2D  2E02412E
2F02432F  30024530  31024731  32024932  33024B33  34024D34
35024F35  36025136  37025337  38025538  39025739  3A02593A
3B025B3B  3C025D3C  3D025F3D  3E02613E  3F02633F  40026540
41026741  42026942  43026B43  44026D44  45026F45  46027146
47027347  48027548  49027749  4A02794A  4B027B4B  4C027D4C
4D027F4D  4E02814E  4F02834F  50028550  51028751  52028952
53028B53  54028D54  55028F55  56029156  57029357  58029558
59029759  5A02995A  5B029B5B  5C029D5C  5D029F5D  5E02A15E
5F02A35F  6002A560  6102A761  6202A962  6302AB63  6402AD64
6502AF65  6602B166  6702B367  6802B568  6902B769  6A02B96A
6B02BB6B  6C02BD6C  6D02BF6D  6E02C16E  6F02C36F  7002C570
7102C771  7202C972  7302CB73  7402CD74  7502CF75  7602D176
7702D377  7802D578  7902D779  7A02D97A  7B02DB7B  7C02DD7C
7D02DF7D  7E02E17E  7F02E37F  8002E580  8102E781  8202E982
8302EB83  8402ED84  8502EF85  8602F186  8702F387  8802F588
8902F789  8A02F98A  8B02FB8B  8C02FD8C  8D02FF8D  8E03018E
8F03038F  90030590  91030791  92030992  93030B93  94030D94
95030F95  96031196  97031397  98031598  99031799  9A03199A
9B031B9B  9C031D9C  9D031F9D  9E03219E  9F03239F  A00325A0
A10327A1  A20329A2  A3032BA3  A4032DA4  A5032FA5  A60331A6
A70333A7  A80335A8  A90337A9  AA0339AA  AB033BAB  AC033DAC
AD033FAD  AE0341AE  AF0343AF  B00345B0  B10347B1  B20349B2
B3034BB3  B4034DB4  B5034FB5  B60351B6  B70353B7  B80355B8
B90357B9  BA0359BA  BB035BBB  BC035DBC  BD035FBD  BE0361BE
BF0363BF  C00365C0  C10367C1  C20369C2  C3036BC3  C4036DC4
C5036FC5  C60371C6  C70373C7  C80375C8  C90377C9  CA0379CA
CB037BCB  CC037DCC  CD037FCD  CE0381CE  CF0383CF  D00385D0
D10387D1  D20389D2  D3038BD3  D4038DD4  D5038FD5  D60391D6
D70393D7  D80395D8  D90397D9  DA0399DA  DB039BDB  DC039DDC
DD039FDD  DE03A1DE  DF03A3DF  E003A5E0  E103A7E1  E203A9E2
E303ABE3  E403ADE4  E503AFE5  E603B1E6  E703B3E7  E803B5E8
E903B7E9  EA03B9EA  EB03BBEB  EC03BDEC  ED03BFED  EE03C1EE
EF03C3EF  F003C5F0  F103C7F1  F203C9F2  F303CBF3  F403CDF4
F503CFF5  F603D1F6  F703D3F7  F803D5F8  F903D7F9  FA03D9FA
FB03DBFB  FC03DDFC  FD03DFFD  FE03E1FE  FF03E3FF  0003E600
0103E801  0203EA02  0303EC03  0403EE04  0503F005  0603F206
0703F407  0803F608  0903F809  0A03FA0A  0B03FC0B  0C03FE0C
0D04000D  0E04020E  0F04040F  10040610  11040811  12040A12
13040C13  14040E14  15041015  16041216  17041417  18041618
19041819  1A041A1A  1B041C1B  1C041E1C  1D04201D  1E04221E
1F04241F  20042620  21042821  22042A22  23042C23  24042E24
25043025  26043226  27043427  28043628  29043829  2A043A2A
2B043C2B  2C043E2C  2D04402D  2E04422E  2F04442F  30044630
31044831  32044A32  33044C33  34044E34  35045035  36045236
37045437  38045638  39045839  3A045A3A  3B045C3B  3C045E3C
3D04603D  3E04623E  3F04643F  40046640  41046841  42046A42
43046C43  44046E44  45047045  46047246  47047447  48047648
49047849  4A047A4A  4B047C4B  4C047E4C  4D04804D  4E04824E
4F04844F  50048650  51048851  52048A52  53048C53  54048E54
55049055  56049256  57049457  58049658  59049859  5A049A5A
```

| | | | | | |
|---|---|---|---|---|---|
| 5B049C5B | 5C049E5C | 5D04A05D | 5E04A25E | 5F04A45F | 6004A660 |
| 6104A861 | 6204AA62 | 6304AC63 | 6404AE64 | 6504B065 | 6604B266 |
| 6704B467 | 6804B668 | 6904B869 | 6A04BA6A | 6B04BC6B | 6C04BE6C |
| 6D04C06D | 6E04C26E | 6F04C46F | 7004C670 | 7104C871 | 7204CA72 |
| 7304CC73 | 7404CE74 | 7504D075 | 7604D276 | 7704D477 | 7804D678 |
| 7904D879 | 7A04DA7A | 7B04DC7B | 7C04DE7C | 7D04E07D | 7E04E27E |
| 7F04E47F | 8004E680 | 8104E881 | 8204EA82 | 8304EC83 | 8404EE84 |
| 8504F085 | 8604F286 | 8704F487 | 8804F688 | 8904F889 | 8A04FA8A |
| 8B04FC8B | 8C04FE8C | 8D05008D | 8E05028E | 8F05048F | 90050690 |
| 91050891 | 92050A92 | 93050C93 | 94050E94 | 95051095 | 96051296 |
| 97051497 | 98051698 | 99051899 | 9A051A9A | 9B051C9B | 9C051E9C |
| 9D05209D | 9E05229E | 9F05249F | A00526A0 | A10528A1 | A2052AA2 |
| A3052CA3 | A4052EA4 | A50530A5 | A60532A6 | A70534A7 | A80536A8 |
| A90538A9 | AA053AAA | AB053CAB | AC053EAC | AD0540AD | AE0542AE |
| AF0544AF | B00546B0 | B10548B1 | B2054AB2 | B3054CB3 | B4054EB4 |
| B50550B5 | B60552B6 | B70554B7 | B80556B8 | B90558B9 | BA055ABA |
| BB055CBB | BC055EBC | BD0560BD | BE0562BE | BF0564BF | C00566C0 |
| C10568C1 | C2056AC2 | C3056CC3 | C4056EC4 | C50570C5 | C60572C6 |
| C70574C7 | C80576C8 | C90578C9 | CA057ACA | CB057CCB | CC057ECC |
| CD0580CD | CE0582CE | CF0584CF | D00586D0 | D10588D1 | D2058AD2 |
| D3058CD3 | D4058ED4 | D50590D5 | D60592D6 | D70594D7 | D80596D8 |
| D90598D9 | DA059ADA | DB059CDB | DC059EDC | DD05A0DD | DE05A2DE |
| DF05A4DF | E005A6E0 | E105A8E1 | E205AAE2 | E305ACE3 | E405AEE4 |
| E505B0E5 | E605B2E6 | E705B4E7 | E805B6E8 | E905B8E9 | EA05BAEA |
| EB05BCEB | EC05BEEC | ED05C0ED | EE05C2EE | EF05C4EF | F005C6F0 |
| F105C8F1 | F205CAF2 | F305CCF3 | F405CEF4 | F505D0F5 | F605D2F6 |
| F705D4F7 | F805D6F8 | F905D8F9 | FA05DAFA | FB05DCFB | FC05DEFC |
| FD05E0FD | FE05E2FE | FF05E4FF | 0005E700 | 0105E901 | 0205EB02 |
| 0305ED03 | 0405EF04 | 0505F105 | 0605F306 | 0705F507 | 0805F708 |
| 0905F909 | 0A05FB0A | 0B05FD0B | 0C05FF0C | 0D06010D | 0E06030E |
| 0F06050F | 10060710 | 11060911 | 12060B12 | 13060D13 | 14060F14 |
| 15061115 | 16061316 | 17061517 | 18061718 | 19061919 | 1A061B1A |
| 1B061D1B | 1C061F1C | 1D06211D | 1E06231E | 1F06251F | 20062720 |
| 21062921 | 22062B22 | 23062D23 | 24062F24 | 25063125 | 26063326 |
| 27063527 | 28063728 | 29063929 | 2A063B2A | 2B063D2B | 2C063F2C |
| 2D06412D | 2E06432E | 2F06452F | 30064730 | 31064931 | 32064B32 |
| 33064D33 | 34064F34 | 35065135 | 36065336 | 37065537 | 38065738 |
| 39065939 | 3A065B3A | 3B065D3B | 3C065F3C | 3D06613D | 3E06633E |
| 3F06653F | 40066740 | 41066941 | 42066B42 | 43066D43 | 44066F44 |
| 45067145 | 46067346 | 47067547 | 48067748 | 49067949 | 4A067B4A |
| 4B067D4B | 4C067F4C | 4D06814D | 4E06834E | 4F06854F | 50068750 |
| 51068951 | 52068B52 | 53068D53 | 54068F54 | 55069155 | 56069356 |
| 57069557 | 58069758 | 59069959 | 5A069B5A | 5B069D5B | 5C069F5C |
| 5D06A15D | 5E06A35E | 5F06A55F | 6006A760 | 6106A961 | 6206AB62 |
| 6306AD63 | 6406AF64 | 6506B165 | 6606B366 | 6706B567 | 6806B768 |
| 6906B969 | 6A06BB6A | 6B06BD6B | 6C06BF6C | 6D06C16D | 6E06C36E |
| 6F06C56F | 7006C770 | 7106C971 | 7206CB72 | 7306CD73 | 7406CF74 |
| 7506D175 | 7606D376 | 7706D577 | 7806D778 | 7906D979 | 7A06DB7A |

```
7B06DD7B  7C06DF7C  7D06E17D  7E06E37E  7F06E57F  8006E780
8106E981  8206EB82  8306ED83  8406EF84  8506F185  8606F386
8706F587  8806F788  8906F989  8A06FB8A  8B06FD8B  8C06FF8C
8D07018D  8E07038E  8F07058F  90070790  91070991  92070B92
93070D93  94070F94  95071195  96071396  97071597  98071798
99071999  9A071B9A  9B071D9B  9C071F9C  9D07219D  9E07239E
9F07259F  A00727A0  A10729A1  A2072BA2  A3072DA3  A4072FA4
A50731A5  A60733A6  A70735A7  A80737A8  A90739A9  AA073BAA
AB073DAB  AC073FAC  AD0741AD  AE0743AE  AF0745AF  B00747B0
B10749B1  B2074BB2  B3074DB3  B4074FB4  B50751B5  B60753B6
B70755B7  B80757B8  B90759B9  BA075BBA  BB075DBB  BC075FBC
BD0761BD  BE0763BE  BF0765BF  C00767C0  C10769C1  C2076BC2
C3076DC3  C4076FC4  C50771C5  C60773C6  C70775C7  C80777C8
C90779C9  CA077BCA  CB077DCB  CC077FCC  CD0781CD  CE0783CE
CF0785CF  D00787D0  D10789D1  D2078BD2  D3078DD3  D4078FD4
D50791D5  D60793D6  D70795D7  D80797D8  D90799D9  DA079BDA
DB079DDB  DC079FDC  DD07A1DD  DE07A3DE  DF07A5DF  E007A7E0
E107A9E1  E207ABE2  E307ADE3  E407AFE4  E507B1E5  E607B3E6
E707B5E7  E807B7E8  E907B9E9  EA07BBEA  EB07BDEB  EC07BFEC
ED07C1ED  EE07C3EE  EF07C5EF  F007C7F0  F107C9F1  F207CBF2
F307CDF3  F407CFF4  F507D1F5  F607D3F6  F707D5F7  F807D7F8
F907D9F9  FA07DBFA  FB07DDFB  FC07DFFC  FD07E1FD  FE07E3FE
FF07E5FF  0007E800  0107EA01  0207EC02  0307EE03  0407F004
0507F205  0607F406  0707F607  0807F808  0907FA09  0A07FC0A
```

FIG. 16D

Frequency Analysis Table for All Byte Values in the Sample Sequence
Length: 4,080 Bytes
seed=0E00000E, unconstrained primeM=01000201

| \ | 0 | 1 | 2 | 3 | 4 | 5 | 6 | 7 | 8 | 9 | A | B | C | D | E | F |
|---|---|---|---|---|---|---|---|---|---|---|---|---|---|---|---|---|
| 0 | 138 | 140 | 140 | 139 | 140 | 140 | 140 | 138 | 12 | 12 | 12 | 10 | 10 | 10 | 10 | 12 |
| 1 | 12 | 12 | 12 | 12 | 12 | 12 | 12 | 12 | 12 | 12 | 12 | 12 | 12 | 12 | 12 | 12 |
| 2 | 12 | 12 | 12 | 12 | 12 | 12 | 12 | 12 | 12 | 12 | 12 | 12 | 12 | 12 | 12 | 12 |
| 3 | 12 | 12 | 12 | 12 | 12 | 12 | 12 | 12 | 12 | 12 | 12 | 12 | 12 | 12 | 12 | 12 |
| 4 | 12 | 12 | 12 | 12 | 12 | 12 | 12 | 12 | 12 | 12 | 12 | 12 | 12 | 12 | 12 | 12 |
| 5 | 12 | 12 | 12 | 12 | 12 | 12 | 12 | 12 | 12 | 12 | 12 | 12 | 12 | 12 | 12 | 12 |
| 6 | 12 | 12 | 12 | 12 | 12 | 12 | 12 | 12 | 12 | 12 | 12 | 12 | 12 | 12 | 12 | 12 |
| 7 | 12 | 12 | 12 | 12 | 12 | 12 | 12 | 12 | 12 | 12 | 12 | 12 | 12 | 12 | 12 | 12 |
| 8 | 12 | 12 | 12 | 12 | 12 | 12 | 12 | 12 | 12 | 12 | 12 | 12 | 12 | 12 | 12 | 12 |
| 9 | 12 | 12 | 12 | 12 | 12 | 12 | 12 | 12 | 12 | 12 | 12 | 12 | 12 | 12 | 12 | 12 |
| A | 12 | 12 | 12 | 12 | 12 | 12 | 12 | 12 | 12 | 12 | 12 | 12 | 12 | 12 | 12 | 12 |
| B | 12 | 12 | 12 | 12 | 12 | 12 | 12 | 12 | 12 | 12 | 12 | 12 | 12 | 12 | 12 | 12 |
| C | 12 | 12 | 12 | 12 | 12 | 12 | 12 | 12 | 12 | 12 | 12 | 12 | 12 | 12 | 12 | 12 |
| D | 12 | 12 | 12 | 12 | 12 | 12 | 12 | 12 | 12 | 12 | 12 | 12 | 12 | 12 | 12 | 12 |
| E | 12 | 12 | 12 | 12 | 11 | 12 | 11 | 12 | 12 | 12 | 12 | 12 | 12 | 12 | 12 | 12 |
| F | 12 | 12 | 12 | 12 | 12 | 12 | 12 | 12 | 12 | 12 | 12 | 12 | 12 | 12 | 11 | 12 |

FIG. 16E

4,080 Bytes of Sample Sequence Data Generated Using Unconstrained primeM
seed=0E00000E, primeM=00000017, Data is compressible

| | | | | | |
|---|---|---|---|---|---|
| 0E000025 | 0E00003C | 0E000053 | 0E00006A | 0E000081 | 0E000098 |
| 0E0000AF | 0E0000C6 | 0E0000DD | 0E0000F4 | 0E00010B | 0E000122 |
| 0E000139 | 0E000150 | 0E000167 | 0E00017E | 0E000195 | 0E0001AC |
| 0E0001C3 | 0E0001DA | 0E0001F1 | 0E000208 | 0E00021F | 0E000236 |
| 0E00024D | 0E000264 | 0E00027B | 0E000292 | 0E0002A9 | 0E0002C0 |
| 0E0002D7 | 0E0002EE | 0E000305 | 0E00031C | 0E000333 | 0E00034A |
| 0E000361 | 0E000378 | 0E00038F | 0E0003A6 | 0E0003BD | 0E0003D4 |
| 0E0003EB | 0E000402 | 0E000419 | 0E000430 | 0E000447 | 0E00045E |
| 0E000475 | 0E00048C | 0E0004A3 | 0E0004BA | 0E0004D1 | 0E0004E8 |
| 0E0004FF | 0E000516 | 0E00052D | 0E000544 | 0E00055B | 0E000572 |
| 0E000589 | 0E0005A0 | 0E0005B7 | 0E0005CE | 0E0005E5 | 0E0005FC |
| 0E000613 | 0E00062A | 0E000641 | 0E000658 | 0E00066F | 0E000686 |
| 0E00069D | 0E0006B4 | 0E0006CB | 0E0006E2 | 0E0006F9 | 0E000710 |
| 0E000727 | 0E00073E | 0E000755 | 0E00076C | 0E000783 | 0E00079A |
| 0E0007B1 | 0E0007C8 | 0E0007DF | 0E0007F6 | 0E00080D | 0E000824 |
| 0E00083B | 0E000852 | 0E000869 | 0E000880 | 0E000897 | 0E0008AE |
| 0E0008C5 | 0E0008DC | 0E0008F3 | 0E00090A | 0E000921 | 0E000938 |
| 0E00094F | 0E000966 | 0E00097D | 0E000994 | 0E0009AB | 0E0009C2 |
| 0E0009D9 | 0E0009F0 | 0E000A07 | 0E000A1E | 0E000A35 | 0E000A4C |
| 0E000A63 | 0E000A7A | 0E000A91 | 0E000AA8 | 0E000ABF | 0E000AD6 |
| 0E000AED | 0E000B04 | 0E000B1B | 0E000B32 | 0E000B49 | 0E000B60 |
| 0E000B77 | 0E000B8E | 0E000BA5 | 0E000BBC | 0E000BD3 | 0E000BEA |
| 0E000C01 | 0E000C18 | 0E000C2F | 0E000C46 | 0E000C5D | 0E000C74 |
| 0E000C8B | 0E000CA2 | 0E000CB9 | 0E000CD0 | 0E000CE7 | 0E000CFE |
| 0E000D15 | 0E000D2C | 0E000D43 | 0E000D5A | 0E000D71 | 0E000D88 |
| 0E000D9F | 0E000DB6 | 0E000DCD | 0E000DE4 | 0E000DFB | 0E000E12 |
| 0E000E29 | 0E000E40 | 0E000E57 | 0E000E6E | 0E000E85 | 0E000E9C |
| 0E000EB3 | 0E000ECA | 0E000EE1 | 0E000EF8 | 0E000F0F | 0E000F26 |
| 0E000F3D | 0E000F54 | 0E000F6B | 0E000F82 | 0E000F99 | 0E000FB0 |
| 0E000FC7 | 0E000FDE | 0E000FF5 | 0E00100C | 0E001023 | 0E00103A |
| 0E001051 | 0E001068 | 0E00107F | 0E001096 | 0E0010AD | 0E0010C4 |
| 0E0010DB | 0E0010F2 | 0E001109 | 0E001120 | 0E001137 | 0E00114E |
| 0E001165 | 0E00117C | 0E001193 | 0E0011AA | 0E0011C1 | 0E0011D8 |
| 0E0011EF | 0E001206 | 0E00121D | 0E001234 | 0E00124B | 0E001262 |
| 0E001279 | 0E001290 | 0E0012A7 | 0E0012BE | 0E0012D5 | 0E0012EC |
| 0E001303 | 0E00131A | 0E001331 | 0E001348 | 0E00135F | 0E001376 |
| 0E00138D | 0E0013A4 | 0E0013BB | 0E0013D2 | 0E0013E9 | 0E001400 |
| 0E001417 | 0E00142E | 0E001445 | 0E00145C | 0E001473 | 0E00148A |
| 0E0014A1 | 0E0014B8 | 0E0014CF | 0E0014E6 | 0E0014FD | 0E001514 |
| 0E00152B | 0E001542 | 0E001559 | 0E001570 | 0E001587 | 0E00159E |
| 0E0015B5 | 0E0015CC | 0E0015E3 | 0E0015FA | 0E001611 | 0E001628 |
| 0E00163F | 0E001656 | 0E00166D | 0E001684 | 0E00169B | 0E0016B2 |
| 0E0016C9 | 0E0016E0 | 0E0016F7 | 0E00170E | 0E001725 | 0E00173C |
| 0E001753 | 0E00176A | 0E001781 | 0E001798 | 0E0017AF | 0E0017C6 |
| 0E0017DD | 0E0017F4 | 0E00180B | 0E001822 | 0E001839 | 0E001850 |
| 0E001867 | 0E00187E | 0E001895 | 0E0018AC | 0E0018C3 | 0E0018DA |

```
0E0018F1  0E001908  0E00191F  0E001936  0E00194D  0E001964
0E00197B  0E001992  0E0019A9  0E0019C0  0E0019D7  0E0019EE
0E001A05  0E001A1C  0E001A33  0E001A4A  0E001A61  0E001A78
0E001A8F  0E001AA6  0E001ABD  0E001AD4  0E001AEB  0E001B02
0E001B19  0E001B30  0E001B47  0E001B5E  0E001B75  0E001B8C
0E001BA3  0E001BBA  0E001BD1  0E001BE8  0E001BFF  0E001C16
0E001C2D  0E001C44  0E001C5B  0E001C72  0E001C89  0E001CA0
0E001CB7  0E001CCE  0E001CE5  0E001CFC  0E001D13  0E001D2A
0E001D41  0E001D58  0E001D6F  0E001D86  0E001D9D  0E001DB4
0E001DCB  0E001DE2  0E001DF9  0E001E10  0E001E27  0E001E3E
0E001E55  0E001E6C  0E001E83  0E001E9A  0E001EB1  0E001EC8
0E001EDF  0E001EF6  0E001F0D  0E001F24  0E001F3B  0E001F52
0E001F69  0E001F80  0E001F97  0E001FAE  0E001FC5  0E001FDC
0E001FF3  0E00200A  0E002021  0E002038  0E00204F  0E002066
0E00207D  0E002094  0E0020AB  0E0020C2  0E0020D9  0E0020F0
0E002107  0E00211E  0E002135  0E00214C  0E002163  0E00217A
0E002191  0E0021A8  0E0021BF  0E0021D6  0E0021ED  0E002204
0E00221B  0E002232  0E002249  0E002260  0E002277  0E00228E
0E0022A5  0E0022BC  0E0022D3  0E0022EA  0E002301  0E002318
0E00232F  0E002346  0E00235D  0E002374  0E00238B  0E0023A2
0E0023B9  0E0023D0  0E0023E7  0E0023FE  0E002415  0E00242C
0E002443  0E00245A  0E002471  0E002488  0E00249F  0E0024B6
0E0024CD  0E0024E4  0E0024FB  0E002512  0E002529  0E002540
0E002557  0E00256E  0E002585  0E00259C  0E0025B3  0E0025CA
0E0025E1  0E0025F8  0E00260F  0E002626  0E00263D  0E002654
0E00266B  0E002682  0E002699  0E0026B0  0E0026C7  0E0026DE
0E0026F5  0E00270C  0E002723  0E00273A  0E002751  0E002768
0E00277F  0E002796  0E0027AD  0E0027C4  0E0027DB  0E0027F2
0E002809  0E002820  0E002837  0E00284E  0E002865  0E00287C
0E002893  0E0028AA  0E0028C1  0E0028D8  0E0028EF  0E002906
0E00291D  0E002934  0E00294B  0E002962  0E002979  0E002990
0E0029A7  0E0029BE  0E0029D5  0E0029EC  0E002A03  0E002A1A
0E002A31  0E002A48  0E002A5F  0E002A76  0E002A8D  0E002AA4
0E002ABB  0E002AD2  0E002AE9  0E002B00  0E002B17  0E002B2E
0E002B45  0E002B5C  0E002B73  0E002B8A  0E002BA1  0E002BB8
0E002BCF  0E002BE6  0E002BFD  0E002C14  0E002C2B  0E002C42
0E002C59  0E002C70  0E002C87  0E002C9E  0E002CB5  0E002CCC
0E002CE3  0E002CFA  0E002D11  0E002D28  0E002D3F  0E002D56
0E002D6D  0E002D84  0E002D9B  0E002DB2  0E002DC9  0E002DE0
0E002DF7  0E002E0E  0E002E25  0E002E3C  0E002E53  0E002E6A
0E002E81  0E002E98  0E002EAF  0E002EC6  0E002EDD  0E002EF4
0E002F0B  0E002F22  0E002F39  0E002F50  0E002F67  0E002F7E
0E002F95  0E002FAC  0E002FC3  0E002FDA  0E002FF1  0E003008
0E00301F  0E003036  0E00304D  0E003064  0E00307B  0E003092
0E0030A9  0E0030C0  0E0030D7  0E0030EE  0E003105  0E00311C
0E003133  0E00314A  0E003161  0E003178  0E00318F  0E0031A6
0E0031BD  0E0031D4  0E0031EB  0E003202  0E003219  0E003230
0E003247  0E00325E  0E003275  0E00328C  0E0032A3  0E0032BA
0E0032D1  0E0032E8  0E0032FF  0E003316  0E00332D  0E003344  (Cont. at
0E00335B  0E003372  0E003389  0E0033A0  0E0033B7  0E0033CE  FIG. 17C)
```

FIG. 17B

```
0E0033E5  0E0033FC  0E003413  0E00342A  0E003441  0E003458
0E00346F  0E003486  0E00349D  0E0034B4  0E0034CB  0E0034E2
0E0034F9  0E003510  0E003527  0E00353E  0E003555  0E00356C
0E003583  0E00359A  0E0035B1  0E0035C8  0E0035DF  0E0035F6
0E00360D  0E003624  0E00363B  0E003652  0E003669  0E003680
0E003697  0E0036AE  0E0036C5  0E0036DC  0E0036F3  0E00370A
0E003721  0E003738  0E00374F  0E003766  0E00377D  0E003794
0E0037AB  0E0037C2  0E0037D9  0E0037F0  0E003807  0E00381E
0E003835  0E00384C  0E003863  0E00387A  0E003891  0E0038A8
0E0038BF  0E0038D6  0E0038ED  0E003904  0E00391B  0E003932
0E003949  0E003960  0E003977  0E00398E  0E0039A5  0E0039BC
0E0039D3  0E0039EA  0E003A01  0E003A18  0E003A2F  0E003A46
0E003A5D  0E003A74  0E003A8B  0E003AA2  0E003AB9  0E003AD0
0E003AE7  0E003AFE  0E003B15  0E003B2C  0E003B43  0E003B5A
0E003B71  0E003B88  0E003B9F  0E003BB6  0E003BCD  0E003BE4
0E003BFB  0E003C12  0E003C29  0E003C40  0E003C57  0E003C6E
0E003C85  0E003C9C  0E003CB3  0E003CCA  0E003CE1  0E003CF8
0E003D0F  0E003D26  0E003D3D  0E003D54  0E003D6B  0E003D82
0E003D99  0E003DB0  0E003DC7  0E003DDE  0E003DF5  0E003E0C
0E003E23  0E003E3A  0E003E51  0E003E68  0E003E7F  0E003E96
0E003EAD  0E003EC4  0E003EDB  0E003EF2  0E003F09  0E003F20
0E003F37  0E003F4E  0E003F65  0E003F7C  0E003F93  0E003FAA
0E003FC1  0E003FD8  0E003FEF  0E004006  0E00401D  0E004034
0E00404B  0E004062  0E004079  0E004090  0E0040A7  0E0040BE
0E0040D5  0E0040EC  0E004103  0E00411A  0E004131  0E004148
0E00415F  0E004176  0E00418D  0E0041A4  0E0041BB  0E0041D2
0E0041E9  0E004200  0E004217  0E00422E  0E004245  0E00425C
0E004273  0E00428A  0E0042A1  0E0042B8  0E0042CF  0E0042E6
0E0042FD  0E004314  0E00432B  0E004342  0E004359  0E004370
0E004387  0E00439E  0E0043B5  0E0043CC  0E0043E3  0E0043FA
0E004411  0E004428  0E00443F  0E004456  0E00446D  0E004484
0E00449B  0E0044B2  0E0044C9  0E0044E0  0E0044F7  0E00450E
0E004525  0E00453C  0E004553  0E00456A  0E004581  0E004598
0E0045AF  0E0045C6  0E0045DD  0E0045F4  0E00460B  0E004622
0E004639  0E004650  0E004667  0E00467E  0E004695  0E0046AC
0E0046C3  0E0046DA  0E0046F1  0E004708  0E00471F  0E004736
0E00474D  0E004764  0E00477B  0E004792  0E0047A9  0E0047C0
0E0047D7  0E0047EE  0E004805  0E00481C  0E004833  0E00484A
0E004861  0E004878  0E00488F  0E0048A6  0E0048BD  0E0048D4
0E0048EB  0E004902  0E004919  0E004930  0E004947  0E00495E
0E004975  0E00498C  0E0049A3  0E0049BA  0E0049D1  0E0049E8
0E0049FF  0E004A16  0E004A2D  0E004A44  0E004A5B  0E004A72
0E004A89  0E004AA0  0E004AB7  0E004ACE  0E004AE5  0E004AFC
0E004B13  0E004B2A  0E004B41  0E004B58  0E004B6F  0E004B86
0E004B9D  0E004BB4  0E004BCB  0E004BE2  0E004BF9  0E004C10
0E004C27  0E004C3E  0E004C55  0E004C6C  0E004C83  0E004C9A
0E004CB1  0E004CC8  0E004CDF  0E004CF6  0E004D0D  0E004D24
0E004D3B  0E004D52  0E004D69  0E004D80  0E004D97  0E004DAE
0E004DC5  0E004DDC  0E004DF3  0E004E0A  0E004E21  0E004E38   (Cont. at
0E004E4F  0E004E66  0E004E7D  0E004E94  0E004EAB  0E004EC2   FIG. 17D)
```

FIG. 17C

```
0E004ED9  0E004EF0  0E004F07  0E004F1E  0E004F35  0E004F4C
0E004F63  0E004F7A  0E004F91  0E004FA8  0E004FBF  0E004FD6
0E004FED  0E005004  0E00501B  0E005032  0E005049  0E005060
0E005077  0E00508E  0E0050A5  0E0050BC  0E0050D3  0E0050EA
0E005101  0E005118  0E00512F  0E005146  0E00515D  0E005174
0E00518B  0E0051A2  0E0051B9  0E0051D0  0E0051E7  0E0051FE
0E005215  0E00522C  0E005243  0E00525A  0E005271  0E005288
0E00529F  0E0052B6  0E0052CD  0E0052E4  0E0052FB  0E005312
0E005329  0E005340  0E005357  0E00536E  0E005385  0E00539C
0E0053B3  0E0053CA  0E0053E1  0E0053F8  0E00540F  0E005426
0E00543D  0E005454  0E00546B  0E005482  0E005499  0E0054B0
0E0054C7  0E0054DE  0E0054F5  0E00550C  0E005523  0E00553A
0E005551  0E005568  0E00557F  0E005596  0E0055AD  0E0055C4
0E0055DB  0E0055F2  0E005609  0E005620  0E005637  0E00564E
0E005665  0E00567C  0E005693  0E0056AA  0E0056C1  0E0056D8
0E0056EF  0E005706  0E00571D  0E005734  0E00574B  0E005762
0E005779  0E005790  0E0057A7  0E0057BE  0E0057D5  0E0057EC
0E005803  0E00581A  0E005831  0E005848  0E00585F  0E005876
0E00588D  0E0058A4  0E0058BB  0E0058D2  0E0058E9  0E005900
0E005917  0E00592E  0E005945  0E00595C  0E005973  0E00598A
0E0059A1  0E0059B8  0E0059CF  0E0059E6  0E0059FD  0E005A14
0E005A2B  0E005A42  0E005A59  0E005A70  0E005A87  0E005A9E
0E005AB5  0E005ACC  0E005AE3  0E005AFA  0E005B11  0E005B28
0E005B3F  0E005B56  0E005B6D  0E005B84  0E005B9B  0E005BB2
```

FIG. 17D

Frequency Analysis Table for All Byte Values in the Sample Sequence
Length: 4,080 Bytes
seed=0E00000E, unconstrained primeM=00000017

| \ | 0 | 1 | 2 | 3 | 4 | 5 | 6 | 7 | 8 | 9 | A | B | C | D | E | F |
|---|---|---|---|---|---|---|---|---|---|---|---|---|---|---|---|---|
| 0 | 1034 | 15 | 15 | 15 | 16 | 15 | 15 | 15 | 15 | 15 | 15 | 15 | 16 | 15 | 1034 | 15 |
| 1 | 15 | 15 | 15 | 15 | 16 | 15 | 15 | 15 | 15 | 15 | 15 | 16 | 15 | 15 | 15 | 15 |
| 2 | 15 | 15 | 15 | 16 | 15 | 15 | 15 | 15 | 15 | 15 | 16 | 15 | 15 | 15 | 15 | 15 |
| 3 | 15 | 15 | 16 | 15 | 15 | 15 | 15 | 15 | 15 | 16 | 15 | 15 | 15 | 15 | 15 | 15 |
| 4 | 15 | 15 | 16 | 15 | 15 | 15 | 15 | 15 | 16 | 15 | 15 | 15 | 15 | 15 | 15 | 15 |
| 5 | 15 | 16 | 15 | 15 | 15 | 15 | 15 | 15 | 16 | 15 | 12 | 4 | 4 | 4 | 4 | 4 |
| 6 | 4 | 4 | 4 | 4 | 4 | 4 | 4 | 4 | 4 | 4 | 4 | 4 | 4 | 4 | 4 | 4 |
| 7 | 4 | 4 | 4 | 4 | 4 | 4 | 4 | 4 | 4 | 4 | 4 | 4 | 4 | 4 | 4 | 4 |
| 8 | 4 | 4 | 4 | 4 | 4 | 4 | 4 | 4 | 4 | 4 | 4 | 4 | 4 | 4 | 4 | 4 |
| 9 | 4 | 4 | 4 | 4 | 4 | 4 | 4 | 4 | 4 | 4 | 4 | 4 | 4 | 4 | 4 | 4 |
| A | 4 | 4 | 4 | 4 | 4 | 4 | 4 | 4 | 4 | 4 | 4 | 4 | 4 | 4 | 4 | 4 |
| B | 4 | 4 | 4 | 4 | 4 | 4 | 4 | 4 | 4 | 4 | 4 | 4 | 4 | 4 | 4 | 4 |
| C | 4 | 4 | 4 | 4 | 4 | 4 | 4 | 4 | 4 | 3 | 4 | 4 | 4 | 4 | 4 | 4 |
| D | 4 | 4 | 4 | 4 | 4 | 4 | 4 | 4 | 4 | 4 | 4 | 4 | 4 | 4 | 4 | 4 |
| E | 3 | 4 | 4 | 4 | 4 | 4 | 4 | 4 | 4 | 4 | 4 | 4 | 4 | 4 | 4 | 4 |
| F | 4 | 4 | 4 | 4 | 4 | 4 | 4 | 3 | 4 | 4 | 4 | 4 | 4 | 4 | 4 | 4 |

FIG. 17E

8,184 Bytes of Merged (Interleaved) Sample Sequence Data Generated Using
Unconstrained primeM Primes
seed=0E00000E, primeM1=01000201, primeM2=00000017, Data is compressible

```
0F00020F  0E000025  10000410  0E00003C  11000611  0E000053
12000812  0E00006A  13000A13  0E000081  14000C14  0E000098
15000E15  0E0000AF  16001016  0E0000C6  17001217  0E0000DD
18001418  0E0000F4  19001619  0E00010B  1A00181A  0E000122
1B001A1B  0E000139  1C001C1C  0E000150  1D001E1D  0E000167
1E00201E  0E00017E  1F00221F  0E000195  20002420  0E0001AC
21002621  0E0001C3  22002822  0E0001DA  23002A23  0E0001F1
24002C24  0E000208  25002E25  0E00021F  26003026  0E000236
27003227  0E00024D  28003428  0E000264  29003629  0E00027B
2A00382A  0E000292  2B003A2B  0E0002A9  2C003C2C  0E0002C0
2D003E2D  0E0002D7  2E00402E  0E0002EE  2F00422F  0E000305
30004430  0E00031C  31004631  0E000333  32004832  0E00034A
33004A33  0E000361  34004C34  0E000378  35004E35  0E00038F
36005036  0E0003A6  37005237  0E0003BD  38005438  0E0003D4
39005639  0E0003EB  3A00583A  0E000402  3B005A3B  0E000419
3C005C3C  0E000430  3D005E3D  0E000447  3E00603E  0E00045E
3F00623F  0E000475  40006440  0E00048C  41006641  0E0004A3
42006842  0E0004BA  43006A43  0E0004D1  44006C44  0E0004E8
45006E45  0E0004FF  46007046  0E000516  47007247  0E00052D
48007448  0E000544  49007649  0E00055B  4A00784A  0E000572
4B007A4B  0E000589  4C007C4C  0E0005A0  4D007E4D  0E0005B7
4E00804E  0E0005CE  4F00824F  0E0005E5  50008450  0E0005FC
51008651  0E000613  52008852  0E00062A  53008A53  0E000641
54008C54  0E000658  55008E55  0E00066F  56009056  0E000686
57009257  0E00069D  58009458  0E0006B4  59009659  0E0006CB
5A00985A  0E0006E2  5B009A5B  0E0006F9  5C009C5C  0E000710
5D009E5D  0E000727  5E00A05E  0E00073E  5F00A25F  0E000755
6000A460  0E00076C  6100A661  0E000783  6200A862  0E00079A
6300AA63  0E0007B1  6400AC64  0E0007C8  6500AE65  0E0007DF
6600B066  0E0007F6  6700B267  0E00080D  6800B468  0E000824
6900B669  0E00083B  6A00B86A  0E000852  6B00BA6B  0E000869
6C00BC6C  0E000880  6D00BE6D  0E000897  6E00C06E  0E0008AE
6F00C26F  0E0008C5  7000C470  0E0008DC  7100C671  0E0008F3
7200C872  0E00090A  7300CA73  0E000921  7400CC74  0E000938
7500CE75  0E00094F  7600D076  0E000966  7700D277  0E00097D
7800D478  0E000994  7900D679  0E0009AB  7A00D87A  0E0009C2
7B00DA7B  0E0009D9  7C00DC7C  0E0009F0  7D00DE7D  0E000A07
7E00E07E  0E000A1E  7F00E27F  0E000A35  8000E480  0E000A4C
8100E681  0E000A63  8200E882  0E000A7A  8300EA83  0E000A91
8400EC84  0E000AA8  8500EE85  0E000ABF  8600F086  0E000AD6
8700F287  0E000AED  8800F488  0E000B04  8900F689  0E000B1B
8A00F88A  0E000B32  8B00FA8B  0E000B49  8C00FC8C  0E000B60
8D00FE8D  0E000B77  8E01008E  0E000B8E  8F01028F  0E000BA5
90010490  0E000BBC  91010691  0E000BD3  92010892  0E000BEA
93010A93  0E000C01  94010C94  0E000C18  95010E95  0E000C2F
96011096  0E000C46  97011297  0E000C5D  98011498  0E000C74
```
(Cont. at FIG. 18B)

FIG. 18A

```
99011699  0E000C8B  9A01189A  0E000CA2  9B011A9B  0E000CB9
9C011C9C  0E000CD0  9D011E9D  0E000CE7  9E01209E  0E000CFE
9F01229F  0E000D15  A00124A0  0E000D2C  A10126A1  0E000D43
A20128A2  0E000D5A  A3012AA3  0E000D71  A4012CA4  0E000D88
A5012EA5  0E000D9F  A60130A6  0E000DB6  A70132A7  0E000DCD
A80134A8  0E000DE4  A90136A9  0E000DFB  AA0138AA  0E000E12
AB013AAB  0E000E29  AC013CAC  0E000E40  AD013EAD  0E000E57
AE0140AE  0E000E6E  AF0142AF  0E000E85  B00144B0  0E000E9C
B10146B1  0E000EB3  B20148B2  0E000ECA  B3014AB3  0E000EE1
B4014CB4  0E000EF8  B5014EB5  0E000F0F  B60150B6  0E000F26
B70152B7  0E000F3D  B80154B8  0E000F54  B90156B9  0E000F6B
BA0158BA  0E000F82  BB015ABB  0E000F99  BC015CBC  0E000FB0
BD015EBD  0E000FC7  BE0160BE  0E000FDE  BF0162BF  0E000FF5
C00164C0  0E00100C  C10166C1  0E001023  C20168C2  0E00103A
C3016AC3  0E001051  C4016CC4  0E001068  C5016EC5  0E00107F
C60170C6  0E001096  C70172C7  0E0010AD  C80174C8  0E0010C4
C90176C9  0E0010DB  CA0178CA  0E0010F2  CB017ACB  0E001109
CC017CCC  0E001120  CD017ECD  0E001137  CE0180CE  0E00114E
CF0182CF  0E001165  D00184D0  0E00117C  D10186D1  0E001193
D20188D2  0E0011AA  D3018AD3  0E0011C1  D4018CD4  0E0011D8
D5018ED5  0E0011EF  D60190D6  0E001206  D70192D7  0E00121D
D80194D8  0E001234  D90196D9  0E00124B  DA0198DA  0E001262
DB019ADB  0E001279  DC019CDC  0E001290  DD019EDD  0E0012A7
DE01A0DE  0E0012BE  DF01A2DF  0E0012D5  E001A4E0  0E0012EC
E101A6E1  0E001303  E201A8E2  0E00131A  E301AAE3  0E001331
E401ACE4  0E001348  E501AEE5  0E00135F  E601B0E6  0E001376
E701B2E7  0E00138D  E801B4E8  0E0013A4  E901B6E9  0E0013BB
EA01B8EA  0E0013D2  EB01BAEB  0E0013E9  EC01BCEC  0E001400
ED01BEED  0E001417  EE01C0EE  0E00142E  EF01C2EF  0E001445
F001C4F0  0E00145C  F101C6F1  0E001473  F201C8F2  0E00148A
F301CAF3  0E0014A1  F401CCF4  0E0014B8  F501CEF5  0E0014CF
F601D0F6  0E0014E6  F701D2F7  0E0014FD  F801D4F8  0E001514
F901D6F9  0E00152B  FA01D8FA  0E001542  FB01DAFB  0E001559
FC01DCFC  0E001570  FD01DEFD  0E001587  FE01E0FE  0E00159E
FF01E2FF  0E0015B5  0001E500  0E0015CC  0101E701  0E0015E3
0201E902  0E0015FA  0301EB03  0E001611  0401ED04  0E001628
0501EF05  0E00163F  0601F106  0E001656  0701F307  0E00166D
0801F508  0E001684  0901F709  0E00169B  0A01F90A  0E0016B2
0B01FB0B  0E0016C9  0C01FD0C  0E0016E0  0D01FF0D  0E0016F7
0E02010E  0E00170E  0F02030F  0E001725  10020510  0E00173C
11020711  0E001753  12020912  0E00176A  13020B13  0E001781
14020D14  0E001798  15020F15  0E0017AF  16021116  0E0017C6
17021317  0E0017DD  18021518  0E0017F4  19021719  0E00180B
1A02191A  0E001822  1B021B1B  0E001839  1C021D1C  0E001850
1D021F1D  0E001867  1E02211E  0E00187E  1F02231F  0E001895
20022520  0E0018AC  21022721  0E0018C3  22022922  0E0018DA
23022B23  0E0018F1  24022D24  0E001908  25022F25  0E00191F
26023126  0E001936  27023327  0E00194D  28023528  0E001964
29023729  0E00197B  2A02392A  0E001992  2B023B2B  0E0019A9  (Cont. at
2C023D2C  0E0019C0  2D023F2D  0E0019D7  2E02412E  0E0019EE  FIG. 18C)
```

FIG. 18B

```
2F02432F  0E001A05  30024530  0E001A1C  31024731  0E001A33
32024932  0E001A4A  33024B33  0E001A61  34024D34  0E001A78
35024F35  0E001A8F  36025136  0E001AA6  37025337  0E001ABD
38025538  0E001AD4  39025739  0E001AEB  3A02593A  0E001B02
3B025B3B  0E001B19  3C025D3C  0E001B30  3D025F3D  0E001B47
3E02613E  0E001B5E  3F02633F  0E001B75  40026540  0E001B8C
41026741  0E001BA3  42026942  0E001BBA  43026B43  0E001BD1
44026D44  0E001BE8  45026F45  0E001BFF  46027146  0E001C16
47027347  0E001C2D  48027548  0E001C44  49027749  0E001C5B
4A02794A  0E001C72  4B027B4B  0E001C89  4C027D4C  0E001CA0
4D027F4D  0E001CB7  4E02814E  0E001CCE  4F02834F  0E001CE5
50028550  0E001CFC  51028751  0E001D13  52028952  0E001D2A
53028B53  0E001D41  54028D54  0E001D58  55028F55  0E001D6F
56029156  0E001D86  57029357  0E001D9D  58029558  0E001DB4
59029759  0E001DCB  5A02995A  0E001DE2  5B029B5B  0E001DF9
5C029D5C  0E001E10  5D029F5D  0E001E27  5E02A15E  0E001E3E
5F02A35F  0E001E55  6002A560  0E001E6C  6102A761  0E001E83
6202A962  0E001E9A  6302AB63  0E001EB1  6402AD64  0E001EC8
6502AF65  0E001EDF  6602B166  0E001EF6  6702B367  0E001F0D
6802B568  0E001F24  6902B769  0E001F3B  6A02B96A  0E001F52
6B02BB6B  0E001F69  6C02BD6C  0E001F80  6D02BF6D  0E001F97
6E02C16E  0E001FAE  6F02C36F  0E001FC5  7002C570  0E001FDC
7102C771  0E001FF3  7202C972  0E00200A  7302CB73  0E002021
7402CD74  0E002038  7502CF75  0E00204F  7602D176  0E002066
7702D377  0E00207D  7802D578  0E002094  7902D779  0E0020AB
7A02D97A  0E0020C2  7B02DB7B  0E0020D9  7C02DD7C  0E0020F0
7D02DF7D  0E002107  7E02E17E  0E00211E  7F02E37F  0E002135
8002E580  0E00214C  8102E781  0E002163  8202E982  0E00217A
8302EB83  0E002191  8402ED84  0E0021A8  8502EF85  0E0021BF
8602F186  0E0021D6  8702F387  0E0021ED  8802F588  0E002204
8902F789  0E00221B  8A02F98A  0E002232  8B02FB8B  0E002249
8C02FD8C  0E002260  8D02FF8D  0E002277  8E03018E  0E00228E
8F03038F  0E0022A5  90030590  0E0022BC  91030791  0E0022D3
92030992  0E0022EA  93030B93  0E002301  94030D94  0E002318
95030F95  0E00232F  96031196  0E002346  97031397  0E00235D
98031598  0E002374  99031799  0E00238B  9A03199A  0E0023A2
9B031B9B  0E0023B9  9C031D9C  0E0023D0  9D031F9D  0E0023E7
9E03219E  0E0023FE  9F03239F  0E002415  A00325A0  0E00242C
A10327A1  0E002443  A20329A2  0E00245A  A3032BA3  0E002471
A4032DA4  0E002488  A5032FA5  0E00249F  A60331A6  0E0024B6
A70333A7  0E0024CD  A80335A8  0E0024E4  A90337A9  0E0024FB
AA0339AA  0E002512  AB033BAB  0E002529  AC033DAC  0E002540
AD033FAD  0E002557  AE0341AE  0E00256E  AF0343AF  0E002585
B00345B0  0E00259C  B10347B1  0E0025B3  B20349B2  0E0025CA
B3034BB3  0E0025E1  B4034DB4  0E0025F8  B5034FB5  0E00260F
B60351B6  0E002626  B70353B7  0E00263D  B80355B8  0E002654
B90357B9  0E00266B  BA0359BA  0E002682  BB035BBB  0E002699
BC035DBC  0E0026B0  BD035FBD  0E0026C7  BE0361BE  0E0026DE
BF0363BF  0E0026F5  C00365C0  0E00270C  C10367C1  0E002723  (Cont. at
C20369C2  0E00273A  C3036BC3  0E002751  C4036DC4  0E002768  FIG. 18D)
```

FIG. 18C

| | | | | | |
|---|---|---|---|---|---|
| C5036FC5 | 0E00277F | C60371C6 | 0E002796 | C70373C7 | 0E0027AD |
| C80375C8 | 0E0027C4 | C90377C9 | 0E0027DB | CA0379CA | 0E0027F2 |
| CB037BCB | 0E002809 | CC037DCC | 0E002820 | CD037FCD | 0E002837 |
| CE0381CE | 0E00284E | CF0383CF | 0E002865 | D00385D0 | 0E00287C |
| D10387D1 | 0E002893 | D20389D2 | 0E0028AA | D3038BD3 | 0E0028C1 |
| D4038DD4 | 0E0028D8 | D5038FD5 | 0E0028EF | D60391D6 | 0E002906 |
| D70393D7 | 0E00291D | D80395D8 | 0E002934 | D90397D9 | 0E00294B |
| DA0399DA | 0E002962 | DB039BDB | 0E002979 | DC039DDC | 0E002990 |
| DD039FDD | 0E0029A7 | DE03A1DE | 0E0029BE | DF03A3DF | 0E0029D5 |
| E003A5E0 | 0E0029EC | E103A7E1 | 0E002A03 | E203A9E2 | 0E002A1A |
| E303ABE3 | 0E002A31 | E403ADE4 | 0E002A48 | E503AFE5 | 0E002A5F |
| E603B1E6 | 0E002A76 | E703B3E7 | 0E002A8D | E803B5E8 | 0E002AA4 |
| E903B7E9 | 0E002ABB | EA03B9EA | 0E002AD2 | EB03BBEB | 0E002AE9 |
| EC03BDEC | 0E002B00 | ED03BFED | 0E002B17 | EE03C1EE | 0E002B2E |
| EF03C3EF | 0E002B45 | F003C5F0 | 0E002B5C | F103C7F1 | 0E002B73 |
| F203C9F2 | 0E002B8A | F303CBF3 | 0E002BA1 | F403CDF4 | 0E002BB8 |
| F503CFF5 | 0E002BCF | F603D1F6 | 0E002BE6 | F703D3F7 | 0E002BFD |
| F803D5F8 | 0E002C14 | F903D7F9 | 0E002C2B | FA03D9FA | 0E002C42 |
| FB03DBFB | 0E002C59 | FC03DDFC | 0E002C70 | FD03DFFD | 0E002C87 |
| FE03E1FE | 0E002C9E | FF03E3FF | 0E002CB5 | 0003E600 | 0E002CCC |
| 0103E801 | 0E002CE3 | 0203EA02 | 0E002CFA | 0303EC03 | 0E002D11 |
| 0403EE04 | 0E002D28 | 0503F005 | 0E002D3F | 0603F206 | 0E002D56 |
| 0703F407 | 0E002D6D | 0803F608 | 0E002D84 | 0903F809 | 0E002D9B |
| 0A03FA0A | 0E002DB2 | 0B03FC0B | 0E002DC9 | 0C03FE0C | 0E002DE0 |
| 0D04000D | 0E002DF7 | 0E04020E | 0E002E0E | 0F04040F | 0E002E25 |
| 10040610 | 0E002E3C | 11040811 | 0E002E53 | 12040A12 | 0E002E6A |
| 13040C13 | 0E002E81 | 14040E14 | 0E002E98 | 15041015 | 0E002EAF |
| 16041216 | 0E002EC6 | 17041417 | 0E002EDD | 18041618 | 0E002EF4 |
| 19041819 | 0E002F0B | 1A041A1A | 0E002F22 | 1B041C1B | 0E002F39 |
| 1C041E1C | 0E002F50 | 1D04201D | 0E002F67 | 1E04221E | 0E002F7E |
| 1F04241F | 0E002F95 | 20042620 | 0E002FAC | 21042821 | 0E002FC3 |
| 22042A22 | 0E002FDA | 23042C23 | 0E002FF1 | 24042E24 | 0E003008 |
| 25043025 | 0E00301F | 26043226 | 0E003036 | 27043427 | 0E00304D |
| 28043628 | 0E003064 | 29043829 | 0E00307B | 2A043A2A | 0E003092 |
| 2B043C2B | 0E0030A9 | 2C043E2C | 0E0030C0 | 2D04402D | 0E0030D7 |
| 2E04422E | 0E0030EE | 2F04442F | 0E003105 | 30044630 | 0E00311C |
| 31044831 | 0E003133 | 32044A32 | 0E00314A | 33044C33 | 0E003161 |
| 34044E34 | 0E003178 | 35045035 | 0E00318F | 36045236 | 0E0031A6 |
| 37045437 | 0E0031BD | 38045638 | 0E0031D4 | 39045839 | 0E0031EB |
| 3A045A3A | 0E003202 | 3B045C3B | 0E003219 | 3C045E3C | 0E003230 |
| 3D04603D | 0E003247 | 3E04623E | 0E00325E | 3F04643F | 0E003275 |
| 40046640 | 0E00328C | 41046841 | 0E0032A3 | 42046A42 | 0E0032BA |
| 43046C43 | 0E0032D1 | 44046E44 | 0E0032E8 | 45047045 | 0E0032FF |
| 46047246 | 0E003316 | 47047447 | 0E00332D | 48047648 | 0E003344 |
| 49047849 | 0E00335B | 4A047A4A | 0E003372 | 4B047C4B | 0E003389 |
| 4C047E4C | 0E0033A0 | 4D04804D | 0E0033B7 | 4E04824E | 0E0033CE |
| 4F04844F | 0E0033E5 | 50048650 | 0E0033FC | 51048851 | 0E003413 |
| 52048A52 | 0E00342A | 53048C53 | 0E003441 | 54048E54 | 0E003458 | (Cont. at
| 55049055 | 0E00346F | 56049256 | 0E003486 | 57049457 | 0E00349D | FIG. 18E)

FIG. 18D

| | | | | | |
|---|---|---|---|---|---|
| 58049658 | 0E0034B4 | 59049859 | 0E0034CB | 5A049A5A | 0E0034E2 |
| 5B049C5B | 0E0034F9 | 5C049E5C | 0E003510 | 5D04A05D | 0E003527 |
| 5E04A25E | 0E00353E | 5F04A45F | 0E003555 | 6004A660 | 0E00356C |
| 6104A861 | 0E003583 | 6204AA62 | 0E00359A | 6304AC63 | 0E0035B1 |
| 6404AE64 | 0E0035C8 | 6504B065 | 0E0035DF | 6604B266 | 0E0035F6 |
| 6704B467 | 0E00360D | 6804B668 | 0E003624 | 6904B869 | 0E00363B |
| 6A04BA6A | 0E003652 | 6B04BC6B | 0E003669 | 6C04BE6C | 0E003680 |
| 6D04C06D | 0E003697 | 6E04C26E | 0E0036AE | 6F04C46F | 0E0036C5 |
| 7004C670 | 0E0036DC | 7104C871 | 0E0036F3 | 7204CA72 | 0E00370A |
| 7304CC73 | 0E003721 | 7404CE74 | 0E003738 | 7504D075 | 0E00374F |
| 7604D276 | 0E003766 | 7704D477 | 0E00377D | 7804D678 | 0E003794 |
| 7904D879 | 0E0037AB | 7A04DA7A | 0E0037C2 | 7B04DC7B | 0E0037D9 |
| 7C04DE7C | 0E0037F0 | 7D04E07D | 0E003807 | 7E04E27E | 0E00381E |
| 7F04E47F | 0E003835 | 8004E680 | 0E00384C | 8104E881 | 0E003863 |
| 8204EA82 | 0E00387A | 8304EC83 | 0E003891 | 8404EE84 | 0E0038A8 |
| 8504F085 | 0E0038BF | 8604F286 | 0E0038D6 | 8704F487 | 0E0038ED |
| 8804F688 | 0E003904 | 8904F889 | 0E00391B | 8A04FA8A | 0E003932 |
| 8B04FC8B | 0E003949 | 8C04FE8C | 0E003960 | 8D05008D | 0E003977 |
| 8E05028E | 0E00398E | 8F05048F | 0E0039A5 | 90050690 | 0E0039BC |
| 91050891 | 0E0039D3 | 92050A92 | 0E0039EA | 93050C93 | 0E003A01 |
| 94050E94 | 0E003A18 | 95051095 | 0E003A2F | 96051296 | 0E003A46 |
| 97051497 | 0E003A5D | 98051698 | 0E003A74 | 99051899 | 0E003A8B |
| 9A051A9A | 0E003AA2 | 9B051C9B | 0E003AB9 | 9C051E9C | 0E003AD0 |
| 9D05209D | 0E003AE7 | 9E05229E | 0E003AFE | 9F05249F | 0E003B15 |
| A00526A0 | 0E003B2C | A10528A1 | 0E003B43 | A2052AA2 | 0E003B5A |
| A3052CA3 | 0E003B71 | A4052EA4 | 0E003B88 | A50530A5 | 0E003B9F |
| A60532A6 | 0E003BB6 | A70534A7 | 0E003BCD | A80536A8 | 0E003BE4 |
| A90538A9 | 0E003BFB | AA053AAA | 0E003C12 | AB053CAB | 0E003C29 |
| AC053EAC | 0E003C40 | AD0540AD | 0E003C57 | AE0542AE | 0E003C6E |
| AF0544AF | 0E003C85 | B00546B0 | 0E003C9C | B10548B1 | 0E003CB3 |
| B2054AB2 | 0E003CCA | B3054CB3 | 0E003CE1 | B4054EB4 | 0E003CF8 |
| B50550B5 | 0E003D0F | B60552B6 | 0E003D26 | B70554B7 | 0E003D3D |
| B80556B8 | 0E003D54 | B90558B9 | 0E003D6B | BA055ABA | 0E003D82 |
| BB055CBB | 0E003D99 | BC055EBC | 0E003DB0 | BD0560BD | 0E003DC7 |
| BE0562BE | 0E003DDE | BF0564BF | 0E003DF5 | C00566C0 | 0E003E0C |
| C10568C1 | 0E003E23 | C2056AC2 | 0E003E3A | C3056CC3 | 0E003E51 |
| C4056EC4 | 0E003E68 | C50570C5 | 0E003E7F | C60572C6 | 0E003E96 |
| C70574C7 | 0E003EAD | C80576C8 | 0E003EC4 | C90578C9 | 0E003EDB |
| CA057ACA | 0E003EF2 | CB057CCB | 0E003F09 | CC057ECC | 0E003F20 |
| CD0580CD | 0E003F37 | CE0582CE | 0E003F4E | CF0584CF | 0E003F65 |
| D00586D0 | 0E003F7C | D10588D1 | 0E003F93 | D2058AD2 | 0E003FAA |
| D3058CD3 | 0E003FC1 | D4058ED4 | 0E003FD8 | D50590D5 | 0E003FEF |
| D60592D6 | 0E004006 | D70594D7 | 0E00401D | D80596D8 | 0E004034 |
| D90598D9 | 0E00404B | DA059ADA | 0E004062 | DB059CDB | 0E004079 |
| DC059EDC | 0E004090 | DD05A0DD | 0E0040A7 | DE05A2DE | 0E0040BE |
| DF05A4DF | 0E0040D5 | E005A6E0 | 0E0040EC | E105A8E1 | 0E004103 |
| E205AAE2 | 0E00411A | E305ACE3 | 0E004131 | E405AEE4 | 0E004148 |
| E505B0E5 | 0E00415F | E605B2E6 | 0E004176 | E705B4E7 | 0E00418D |
| E805B6E8 | 0E0041A4 | E905B8E9 | 0E0041BB | EA05BAEA | 0E0041D2 |
| EB05BCEB | 0E0041E9 | EC05BEEC | 0E004200 | ED05C0ED | 0E004217 |

```
EE05C2EE  0E00422E  EF05C4EF  0E004245  F005C6F0  0E00425C
F105C8F1  0E004273  F205CAF2  0E00428A  F305CCF3  0E0042A1
F405CEF4  0E0042B8  F505D0F5  0E0042CF  F605D2F6  0E0042E6
F705D4F7  0E0042FD  F805D6F8  0E004314  F905D8F9  0E00432B
FA05DAFA  0E004342  FB05DCFB  0E004359  FC05DEFC  0E004370
FD05E0FD  0E004387  FE05E2FE  0E00439E  FF05E4FF  0E0043B5
0005E700  0E0043CC  0105E901  0E0043E3  0205EB02  0E0043FA
0305ED03  0E004411  0405EF04  0E004428  0505F105  0E00443F
0605F306  0E004456  0705F507  0E00446D  0805F708  0E004484
0905F909  0E00449B  0A05FB0A  0E0044B2  0B05FD0B  0E0044C9
0C05FF0C  0E0044E0  0D06010D  0E0044F7  0E06030E  0E00450E
0F06050F  0E004525  10060710  0E00453C  11060911  0E004553
12060B12  0E00456A  13060D13  0E004581  14060F14  0E004598
15061115  0E0045AF  16061316  0E0045C6  17061517  0E0045DD
18061718  0E0045F4  19061919  0E00460B  1A061B1A  0E004622
1B061D1B  0E004639  1C061F1C  0E004650  1D06211D  0E004667
1E06231E  0E00467E  1F06251F  0E004695  20062720  0E0046AC
21062921  0E0046C3  22062B22  0E0046DA  23062D23  0E0046F1
24062F24  0E004708  25063125  0E00471F  26063326  0E004736
27063527  0E00474D  28063728  0E004764  29063929  0E00477B
2A063B2A  0E004792  2B063D2B  0E0047A9  2C063F2C  0E0047C0
2D06412D  0E0047D7  2E06432E  0E0047EE  2F06452F  0E004805
30064730  0E00481C  31064931  0E004833  32064B32  0E00484A
33064D33  0E004861  34064F34  0E004878  35065135  0E00488F
36065336  0E0048A6  37065537  0E0048BD  38065738  0E0048D4
39065939  0E0048EB  3A065B3A  0E004902  3B065D3B  0E004919
3C065F3C  0E004930  3D06613D  0E004947  3E06633E  0E00495E
3F06653F  0E004975  40066740  0E00498C  41066941  0E0049A3
42066B42  0E0049BA  43066D43  0E0049D1  44066F44  0E0049E8
45067145  0E0049FF  46067346  0E004A16  47067547  0E004A2D
48067748  0E004A44  49067949  0E004A5B  4A067B4A  0E004A72
4B067D4B  0E004A89  4C067F4C  0E004AA0  4D06814D  0E004AB7
4E06834E  0E004ACE  4F06854F  0E004AE5  50068750  0E004AFC
51068951  0E004B13  52068B52  0E004B2A  53068D53  0E004B41
54068F54  0E004B58  55069155  0E004B6F  56069356  0E004B86
57069557  0E004B9D  58069758  0E004BB4  59069959  0E004BCB
5A069B5A  0E004BE2  5B069D5B  0E004BF9  5C069F5C  0E004C10
5D06A15D  0E004C27  5E06A35E  0E004C3E  5F06A55F  0E004C55
6006A760  0E004C6C  6106A961  0E004C83  6206AB62  0E004C9A
6306AD63  0E004CB1  6406AF64  0E004CC8  6506B165  0E004CDF
6606B366  0E004CF6  6706B567  0E004D0D  6806B768  0E004D24
6906B969  0E004D3B  6A06BB6A  0E004D52  6B06BD6B  0E004D69
6C06BF6C  0E004D80  6D06C16D  0E004D97  6E06C36E  0E004DAE
6F06C56F  0E004DC5  7006C770  0E004DDC  7106C971  0E004DF3
7206CB72  0E004E0A  7306CD73  0E004E21  7406CF74  0E004E38
7506D175  0E004E4F  7606D376  0E004E66  7706D577  0E004E7D
7806D778  0E004E94  7906D979  0E004EAB  7A06DB7A  0E004EC2
7B06DD7B  0E004ED9  7C06DF7C  0E004EF0  7D06E17D  0E004F07
7E06E37E  0E004F1E  7F06E57F  0E004F35  8006E780  0E004F4C
8106E981  0E004F63  8206EB82  0E004F7A  8306ED83  0E004F91
```

| | | | | | |
|---|---|---|---|---|---|
| 8406EF84 | 0E004FA8 | 8506F185 | 0E004FBF | 8606F386 | 0E004FD6 |
| 8706F587 | 0E004FED | 8806F788 | 0E005004 | 8906F989 | 0E00501B |
| 8A06FB8A | 0E005032 | 8B06FD8B | 0E005049 | 8C06FF8C | 0E005060 |
| 8D07018D | 0E005077 | 8E07038E | 0E00508E | 8F07058F | 0E0050A5 |
| 90070790 | 0E0050BC | 91070991 | 0E0050D3 | 92070B92 | 0E0050EA |
| 93070D93 | 0E005101 | 94070F94 | 0E005118 | 95071195 | 0E00512F |
| 96071396 | 0E005146 | 97071597 | 0E00515D | 98071798 | 0E005174 |
| 99071999 | 0E00518B | 9A071B9A | 0E0051A2 | 9B071D9B | 0E0051B9 |
| 9C071F9C | 0E0051D0 | 9D07219D | 0E0051E7 | 9E07239E | 0E0051FE |
| 9F07259F | 0E005215 | A00727A0 | 0E00522C | A10729A1 | 0E005243 |
| A2072BA2 | 0E00525A | A3072DA3 | 0E005271 | A4072FA4 | 0E005288 |
| A50731A5 | 0E00529F | A60733A6 | 0E0052B6 | A70735A7 | 0E0052CD |
| A80737A8 | 0E0052E4 | A90739A9 | 0E0052FB | AA073BAA | 0E005312 |
| AB073DAB | 0E005329 | AC073FAC | 0E005340 | AD0741AD | 0E005357 |
| AE0743AE | 0E00536E | AF0745AF | 0E005385 | B00747B0 | 0E00539C |
| B10749B1 | 0E0053B3 | B2074BB2 | 0E0053CA | B3074DB3 | 0E0053E1 |
| B4074FB4 | 0E0053F8 | B50751B5 | 0E00540F | B60753B6 | 0E005426 |
| B70755B7 | 0E00543D | B80757B8 | 0E005454 | B90759B9 | 0E00546B |
| BA075BBA | 0E005482 | BB075DBB | 0E005499 | BC075FBC | 0E0054B0 |
| BD0761BD | 0E0054C7 | BE0763BE | 0E0054DE | BF0765BF | 0E0054F5 |
| C00767C0 | 0E00550C | C10769C1 | 0E005523 | C2076BC2 | 0E00553A |
| C3076DC3 | 0E005551 | C4076FC4 | 0E005568 | C50771C5 | 0E00557F |
| C60773C6 | 0E005596 | C70775C7 | 0E0055AD | C80777C8 | 0E0055C4 |
| C90779C9 | 0E0055DB | CA077BCA | 0E0055F2 | CB077DCB | 0E005609 |
| CC077FCC | 0E005620 | CD0781CD | 0E005637 | CE0783CE | 0E00564E |
| CF0785CF | 0E005665 | D00787D0 | 0E00567C | D10789D1 | 0E005693 |
| D2078BD2 | 0E0056AA | D3078DD3 | 0E0056C1 | D4078FD4 | 0E0056D8 |
| D50791D5 | 0E0056EF | D60793D6 | 0E005706 | D70795D7 | 0E00571D |
| D80797D8 | 0E005734 | D90799D9 | 0E00574B | DA079BDA | 0E005762 |
| DB079DDB | 0E005779 | DC079FDC | 0E005790 | DD07A1DD | 0E0057A7 |
| DE07A3DE | 0E0057BE | DF07A5DF | 0E0057D5 | E007A7E0 | 0E0057EC |
| E107A9E1 | 0E005803 | E207ABE2 | 0E00581A | E307ADE3 | 0E005831 |
| E407AFE4 | 0E005848 | E507B1E5 | 0E00585F | E607B3E6 | 0E005876 |
| E707B5E7 | 0E00588D | E807B7E8 | 0E0058A4 | E907B9E9 | 0E0058BB |
| EA07BBEA | 0E0058D2 | EB07BDEB | 0E0058E9 | EC07BFEC | 0E005900 |
| ED07C1ED | 0E005917 | EE07C3EE | 0E00592E | EF07C5EF | 0E005945 |
| F007C7F0 | 0E00595C | F107C9F1 | 0E005973 | F207CBF2 | 0E00598A |
| F307CDF3 | 0E0059A1 | F407CFF4 | 0E0059B8 | F507D1F5 | 0E0059CF |
| F607D3F6 | 0E0059E6 | F707D5F7 | 0E0059FD | F807D7F8 | 0E005A14 |
| F907D9F9 | 0E005A2B | FA07DBFA | 0E005A42 | FB07DDFB | 0E005A59 |
| FC07DFFC | 0E005A70 | FD07E1FD | 0E005A87 | FE07E3FE | 0E005A9E |
| FF07E5FF | 0E005AB5 | 0007E800 | 0E005ACC | 0107EA01 | 0E005AE3 |
| 0207EC02 | 0E005AFA | 0307EE03 | 0E005B11 | 0407F004 | 0E005B28 |
| 0507F205 | 0E005B3F | 0607F406 | 0E005B56 | 0707F607 | 0E005B6D |
| 0807F808 | 0E005B84 | 0907FA09 | 0E005B9B | 0A07FC0A | 0E005BB2 |
| 0B07FE0B | 0E005BC9 | 0C08000C | 0E005BE0 | 0D08020D | 0E005BF7 |

FIG. 18G

Frequency Analysis Table for All Byte Values in the Sample Sequence
Length: 8,184 Bytes
seed=0E00000E, unconstrained primeM1=01000201,
unconstrained primeM2=00000017

| \ | 0 | 1 | 2 | 3 | 4 | 5 | 6 | 7 | 8 | 9 | A | B | C | D | E | F |
|---|---|---|---|---|---|---|---|---|---|---|---|---|---|---|---|---|
| 0 | 1176 | 155 | 156 | 154 | 156 | 155 | 155 | 154 | 29 | 27 | 27 | 27 | 28 | 27 | 1047 | 27 |
| 1 | 27 | 27 | 27 | 27 | 28 | 27 | 27 | 27 | 27 | 27 | 27 | 28 | 27 | 27 | 27 | 27 |
| 2 | 27 | 27 | 27 | 28 | 27 | 27 | 27 | 27 | 27 | 27 | 27 | 28 | 27 | 27 | 27 | 27 |
| 3 | 27 | 27 | 28 | 27 | 27 | 27 | 27 | 27 | 27 | 27 | 28 | 27 | 27 | 27 | 27 | 27 |
| 4 | 27 | 27 | 28 | 27 | 27 | 27 | 27 | 27 | 27 | 28 | 27 | 27 | 27 | 27 | 27 | 27 |
| 5 | 27 | 28 | 27 | 27 | 27 | 27 | 27 | 27 | 27 | 28 | 27 | 27 | 16 | 16 | 16 | 16 |
| 6 | 16 | 16 | 16 | 16 | 16 | 16 | 16 | 16 | 16 | 16 | 16 | 16 | 16 | 16 | 16 | 16 |
| 7 | 16 | 16 | 16 | 16 | 16 | 16 | 16 | 16 | 16 | 16 | 16 | 16 | 16 | 16 | 16 | 16 |
| 8 | 16 | 16 | 16 | 16 | 16 | 16 | 16 | 16 | 16 | 16 | 16 | 16 | 16 | 16 | 16 | 16 |
| 9 | 16 | 16 | 16 | 16 | 16 | 16 | 16 | 16 | 16 | 16 | 16 | 16 | 16 | 16 | 16 | 16 |
| A | 16 | 16 | 16 | 16 | 16 | 16 | 16 | 16 | 16 | 16 | 16 | 16 | 16 | 16 | 16 | 16 |
| B | 16 | 16 | 16 | 16 | 16 | 16 | 16 | 16 | 16 | 16 | 16 | 16 | 16 | 16 | 16 | 16 |
| C | 16 | 16 | 16 | 16 | 16 | 16 | 16 | 16 | 16 | 16 | 16 | 16 | 16 | 16 | 16 | 16 |
| D | 16 | 16 | 16 | 16 | 16 | 16 | 16 | 16 | 16 | 16 | 16 | 16 | 16 | 16 | 16 | 16 |
| E | 16 | 16 | 16 | 16 | 15 | 16 | 15 | 16 | 16 | 16 | 16 | 16 | 16 | 16 | 16 | 16 |
| F | 16 | 16 | 16 | 16 | 16 | 16 | 16 | 16 | 16 | 16 | 16 | 16 | 16 | 16 | 16 | 16 |

FIG. 18H primeM=0103050D

0F03051B 10060A28 11090F35 120C1442 130F194F 14121E5C

FIG. 19A primeM=0103050D

0F03051B 10060A28 11090F35 120C1442 130F194F 14121E5C

FIG. 19B primeM=0103050D

0F03051B 10060A28 11090F35 120C1442 130F194F 14121E5C

FIG. 19C primeM=0103050D

0F03051B 10060A28 11090F35 120C1442 130F194F 14121E5C

FIG. 19D primeM1=0103050D, primeM2=0305070B

0F03051B 11050719 10060A28 140A0E24 11090F35 170F152F

FIG. 20A primeM1=0103050D, primeM2=0305070B

0F03051B 11050719 10060A28 140A0E24 11090F35 170F152F

FIG. 20B primeM1=0103050D, primeM2=0305070B

0F03051B 11050719 10060A28 140A0E24 11090F35 170F152F

FIG. 20C primeM1=0103050D, primeM2=0305070B

8192 Bytes of Rotated Sample Sequence Data Generated
Using Seed=0E00000E, PrimeM1=0103050D, PrimeM2=0305070B

```
21E060A3  6220A0E3  10060A28  140A0E24  78884879  A8B878A9
84830510  8685070E  8A261E32  9E3A3246  014121E5  C201E2A5
8A8A91B4  919198AD  985860A1  D898A0E1  22E365B0  6525A7EE
181E3290  2C32467C  38C909BC  E979BA6C  86890F2A  8C8F1524
3A364E83  6E6A82B7  81C2A46C  4384662A  8E96A5E8  9DA5B4D9
F878C143  78F941C2  23E66ABD  682AAEF9  20365AF8  445A7ED4
F909CB00  2A3AFC2E  888F1944  9299233A  EA467ED4  3E9AD327
024426F2  C506E9B0  92A2BA1C  A9B9D105  589921E5  1959E2A4
24E96FCA  6B2FB604  284E8360  5C82B72C  B94A8C43  6AFC3DF1
8A95235E  98A33150  9A56AF25  0ECB2398  82C5A979  46896D35
96AECE50  B5CDED31  B8B98286  B9BA8385  25EC74D7  6E34BD0F
3066ABC8  74AAEF84  798B4D86  ABBD7FB4  8C9B2D78  9EAD3F66
4A66DF75  DEFB7409  03472BFF  C80BF0BB  9ABAE284  C1E2095D
18D9E328  5A1B2467  26EF79E4  7139C41A  387ED430  8CD327DC
39CC0EC9  EC7EC177  8EA13792  A4B74D7C  FA770FC6  AF2BC479
83C8AE86  498E7440  9EC6F6B8  CDF62589  78FA43C9  FA7BC548
27F27EF1  743ECB25  4096FC98  A4FB6034  FA0CD00D  2D400339
90A741AC  AAC15B92  AA874017  7F5C14EA  044A310C  CB10F7C6
A2D30AEC  DA0A41B5  D91AA46B  9ADC6629  28F583FE  7743D230
48AF2500  BD23988C  BA4D9150  6E0144FC  92AD4BC6  B0CB69A8
5A977068  4F8C655B  84CBB393  4C937B4B  A6DF1F20  E61E5DE1
393B050D  3B3D070B  29F8890B  7A48D93B  50C74D68  D54BD0E4
7A8E5293  AEC286BF  94B355E0  B6D577BE  0AA7A0B9  1FBCB5CC
054D3619  CE15FED1  AAEB3354  F2327A0D  995B65AE  DB9DA7EC
2AFB8E18  7D4DE046  58DF75D0  ED74093C  3ACF13D6  EF83C882
96B95FFA  BCDF85D4  BAB7D109  EFED063C  85CEB8A0  4F988256
AEF74788  FE469639  F97BC650  7BFE48CD  2BFE9325  6052E751
60F79E38  059C4194  FB0FD51A  28450A44  98BF6A14  82E993EA
6AC8015A  BE1D56AD  06503B26  C11B05DC  B3035BBC  8A5AB265
599C26F2  185EE9AF  2D019832  6357EE5C  690FC6A0  1DC479EC
BB50965D  69064C07  9AC5742E  88F3A200  1AD831AB  8E4DA71E
86D1BDAD  429D8961  B70F6FF0  966ECE91  B9BC8793  B8BF8A90
2E049D3F  665CF567  7127EF08  35ECB244  7B9157A0  A9C78DCA
9CCB7E48  8EFDB016  CAE861FC  5E7DF78E  07534033  C4200CE7
BB1B8424  A282EABD  19DCE835  59202B72  2F07A24C  6961FC72
79401770  4E14EA9C  3BD218E3  EA88CF8D  9ED18862  9507BE2C
7AF8924D  2EAE47FF  87D4C2BA  45A2906C  BF279858  AE9706E9
79FD48D6  F980CC53  300AA759  6C67037D  81583FD8  663D22F4
FC12DA27  2B4A114F  A0D7927C  9B11CC42  2B08C29D  FEDE9870
08564540  C72513F2  C333AC8C  BAAB2315  DA1DA978  99E16D34
310DAC66  6F6C0A88  89706840  7E655B4C  BC539B6A  6C0B5312
```

...the sequence continues...

ROTATING BIT VALUES BASED ON A DATA STRUCTURE WHILE GENERATING A LARGE, NON-COMPRESSIBLE DATA STREAM

CROSS REFERENCE TO RELATED APPLICATIONS

This application is related to and a continuation in part of co-pending U.S. application Ser. No. 14/489,317 for GENERATING A LARGE, NON-COMPRESSIBLE DATA STREAM, which is hereby incorporated by reference for all purposes. This application is related to co-pending U.S. patent application Ser. No. 15/420,614 for ROTATING BIT VALUES WHILE GENERATING A LARGE, NON-COMPRESSIBLE DATA STREAM and filed concurrently herewith, U.S. patent application Ser. No. 14/489,363 for GENERATING A DATA STREAM WITH A PREDICTABLE CHANGE RATE, and U.S. patent application Ser. No. 14/489,295 for DATA STREAM GENERATION USING PRIME NUMBERS, which are incorporated herein by reference for all purposes.

BACKGROUND OF THE INVENTION

Certain applications require various sets of data for testing purposes. While real user data can be used for testing, such data changes slowly and infrequently. As such, non-user data can be generated and used for testing. Conventionally, testing data is generated by hashing and/or cryptography techniques. However, generating testing data by hashing and/or cryptography techniques may be slow and inefficient.

Furthermore, in conventional systems, a master copy of a data stream is needed to verify another copy of the data stream. The master copy of the data stream can be compared to the other copy of the data stream to determine whether the values of the data stream to be verified match those of the master copy. However, it may not be feasible and/or too costly to maintain a master copy of each data stream that is to be verified.

In some conventional systems, data is automatically compressed before it is sent across a network to potentially reduce the amount of data to be sent over the network. However, it may not be desirable to compress data in certain testing environments in which it is desired to maintain the original size of the data.

BRIEF DESCRIPTION OF THE DRAWINGS

Various embodiments of the invention are disclosed in the following detailed description and the accompanying drawings.

FIG. 6 is a diagram showing a table that includes sample constrained and unconstrained 32-bit primeM values to help explain how a primeM value is determined to be constrained or unconstrained.

FIG. 9A is a diagram showing a table that includes 32-bit values of a compressible sequence generated using an initialization parameter and an unconstrained prime number.

FIG. 9B is a diagram showing a frequency analysis table for all component byte values of a sampling of 1,032 bytes of the sequence of FIG. 9A

FIG. 10A is a diagram showing a table that includes 32-bit values of a non-compressible sequence generated using an initialization parameter and a constrained prime number.

FIG. 10B is a diagram showing a frequency analysis table for all component byte values of a sampling of 1,032 bytes of the sequence of FIG. 10A.

FIG. 10C is a diagram showing a frequency analysis table for all component byte values of a sampling of 12,288 bytes of the sequence of FIG. 10A.

FIG. 11 is a diagram showing a table of accumulator (generated data) internal byte value rotations.

FIGS. 13A to 13D are diagrams showing a table that includes 32-bit values of a non-compressible sequence generated using an initialization parameter and a constrained prime number.

FIG. 13E is a diagram showing a frequency analysis table for all component byte values of 4,080 bytes of the sequence of FIGS. 13A to 13D.

FIGS. 14A to 14D are diagrams showing a table that includes 32-bit values of a non-compressible sequence generated using an initialization parameter and a constrained prime number.

FIG. 14E is a diagram showing a frequency analysis table for all component byte values of 4,080 bytes of the sequence of FIGS. 14A to 14D.

FIGS. 15A to 15G are diagrams showing a table that includes 32-bit values of a non-compressible data stream generated from merging two non-compressible sequences.

FIG. 15H is a diagram showing a frequency analysis table for all component byte values of 8,124 bytes of the non-compressible data stream of FIGS. 15A to 15G.

FIGS. 16A to 16D are diagrams showing a table that includes 32-bit values of a compressible sequence generated using an initialization parameter and an unconstrained prime number.

FIG. 16E is a diagram showing a frequency analysis table for all component byte values of 4,080 bytes of the sequence of FIGS. 16A to 16D.

FIGS. 17A to 17D are diagrams showing a table that includes 32-bit values of a compressible sequence generated using an initialization parameter and an unconstrained prime number.

FIG. 17E is a diagram showing a frequency analysis table for all component byte values of 4,080 bytes of the sequence of FIGS. 17A to 17D.

FIGS. 18A to 18G are diagrams showing a table that includes 32-bit values of a compressible data stream generated from merging two compressible sequences.

FIG. 18H is a diagram showing a frequency analysis table for all component byte values of 8,184 bytes of the compressible data stream of FIGS. 18A to 18G.

FIG. 19A to D depict how a predictive algorithm may predict byte values in a sequence.

FIG. 20A to D demonstrate byte predictability may also exist within interleaved sequences.

FIG. 21A to C demonstrate bit rotation consistent with an embodiment of the present disclosure.

FIG. 22 depicts a rotated sequence consistent with an embodiment of the present disclosure.

FIG. 24A to C depict an additional or alternative method for bit rotation.

DETAILED DESCRIPTION

Figure 1:
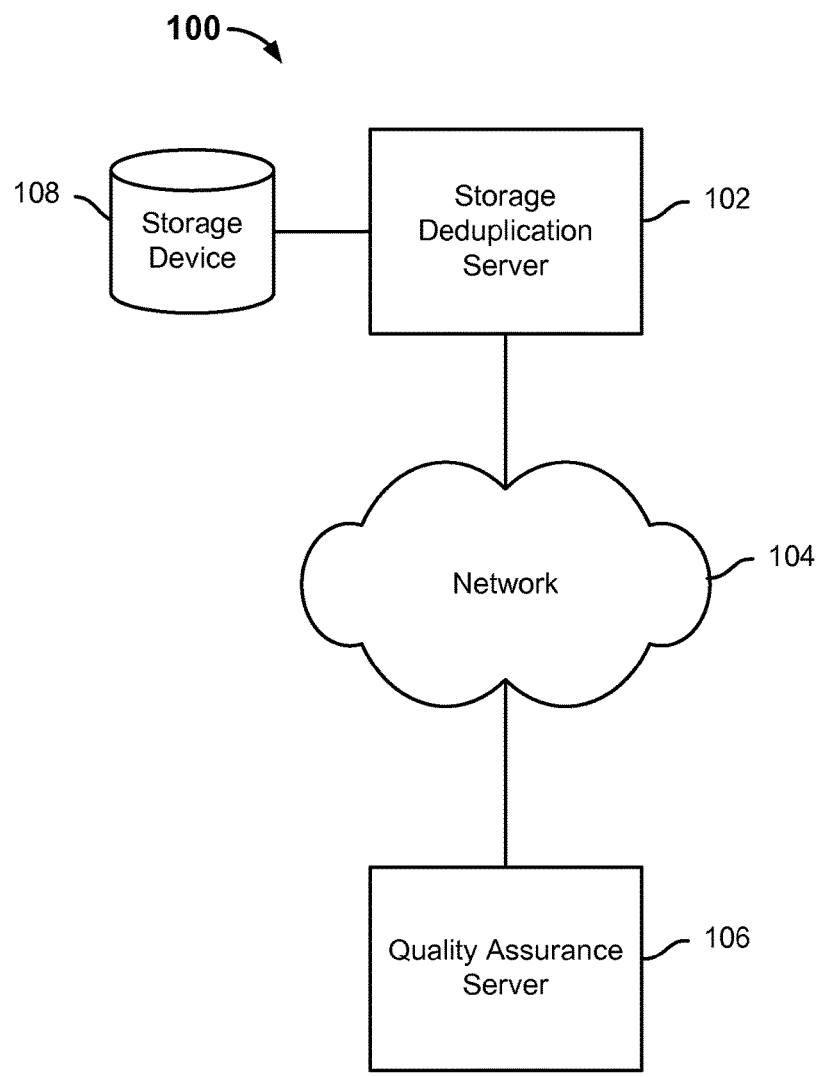
FIG. 1 is a diagram showing an embodiment of a system for performing quality assurance on a storage duplication server.

The invention can be implemented in numerous ways, including as a process; an apparatus; a system; a composition of matter; a computer program product embodied on a computer readable storage medium; and/or a processor, such as a processor configured to execute instructions stored on and/or provided by a memory coupled to the processor. In this specification, these implementations, or any other form that the invention may take, may be referred to as techniques. In general, the order of the steps of disclosed processes may be altered within the scope of the invention. Unless stated otherwise, a component such as a processor or a memory described as being configured to perform a task may be implemented as a general component that is temporarily configured to perform the task at a given time or a specific component that is manufactured to perform the task. As used herein, the term 'processor' refers to one or more devices, circuits, and/or processing cores configured to process data, such as computer program instructions.

A detailed description of one or more embodiments of the invention is provided below along with accompanying figures that illustrate the principles of the invention. The invention is described in connection with such embodiments, but the invention is not limited to any embodiment. The scope of the invention is limited only by the claims and the invention encompasses numerous alternatives, modifications and equivalents. Numerous specific details are set forth in the following description in order to provide a thorough understanding of the invention. These details are provided for the purpose of example and the invention may be practiced according to the claims without some or all of these specific details. For the purpose of clarity, technical material that is known in the technical fields related to the invention has not been described in detail so that the invention is not unnecessarily obscured.

Embodiments of data stream generation using prime numbers are described herein. An initialization parameter is received. In some embodiments, the initialization parameter is any value selected from a constrained address space. In various embodiments, a "sequence" refers to a sequence of values that is generated using an initialization parameter and a prime number. In some embodiments, a first sequence is generated using a first prime number and the initialization parameter. In some embodiments, a second sequence is generated using a second prime number and the initialization parameter. In some embodiments, the first prime number and the second prime number are selected based on a revision parameter that is received. In some embodiments, each of the first prime number and the second prime number is selected from a constrained modified set of prime numbers. A data stream is generated by merging (e.g., interleaving) the first sequence and the second sequence. In various embodiments, a "data stream" refers to a sequence of values that is determined by the merging (e.g., interleaving) of at least two sequences. In some embodiments, a data stream can be referred to as a "merged sequence." In some embodiments, a data stream is not deduplicatable. In various embodiments, a non-deduplicatable data stream comprises a data stream that does not include duplicate blocks of data (e.g., that can be identified by a deduplication system for a block size recognized by the deduplication system). Given a technique to generate a data stream that is not deduplicatable, other techniques can then be used to generate a data stream with a specific level of deduplication. In certain testing scenarios the specification of a specific deduplication level is very desirable.

In some embodiments, a data stream is generated at a high speed of approximately 2.3+ GB per second on 64-bit machines with a single CPU. In some embodiments, a data stream is 100% reproducible on any computer. In some embodiments, a data stream does not repeat any block for 500 TB or more. In some embodiments, four billion or more unique data streams can be generated. In some embodiments, a data stream is unique from any other data stream generated from a different initialization parameter and/or a different pair of prime numbers. Furthermore, any block of a data stream is different from any block of any other data stream generated from a different initialization parameter and/or a different pair of prime numbers.

Embodiments of verifying a data stream without a master copy of the data stream or the parameters used to generate the data stream are described herein. In various embodiments, the parameters used to generate the data stream include at least the initialization parameter, the first prime number, and the second prime number. Whereas conventionally, a master copy (e.g., an original copy of the data stream that is used as a reference copy) of a data stream is required to perform verification of the data stream (e.g., as restored from a storage), as will be described in further detail below, a data stream as generated by embodiments described herein can be verified without a master copy of the data stream and/or even the parameters used to generate the data stream.

Embodiments of generating data that is not compressible are described herein. In various embodiments, "non-compressible" data refers to data that cannot be compressed (e.g., using common compression techniques). Data that cannot be compressed refers to data whose size remains unchanged or even increases (e.g., by an amount of overhead data generated by a compression technique) after the data is subjected to a compression technique. As will be described in further detail below, data can be non-compressible due to certain characteristics of the values in the data. For example, because compression techniques exploit redundancy in data, non-compressible data is generated in a manner that minimizes the redundancy among its values. In various embodiments, a "non-compressible sequence" refers to a sequence of values generated using an initialization parameter and a constrained prime number. In various embodiments, a "non-compressible data stream" refers to a sequence of values generated by merging two non-compressible sequences, each of which is generated using the same initialization parameter and a respective constrained prime number. As will be described in further detail below, a "constrained" prime number refers to a prime number that meets a predetermined set of criteria and therefore can be used to generate non-compressible data. In various embodiments, an "unconstrained" prime number refers to a prime number that does not meet a predetermined set of criteria and therefore may not be used to generate non-compressible data. In some embodiments, a set of constrained prime numbers is first identified. In some embodiments, a non-compressible first sequence associated with a first constrained prime number and the initialization parameter is obtained. In some embodiments, a non-compressible second sequence associated with a second constrained prime number and the initialization parameter is obtained. In some embodiments, the first constrained prime number and the second constrained prime number are selected based on a revision parameter that is received. For example, a revision parameter can map to two constrained prime numbers (or in some cases, two unconstrained prime numbers or a constrained prime number and an unconstrained prime number). A non-compressible data stream is generated by merging (e.g., interleaving) the first non-compressible sequence and the second non-compressible sequence associated with the respective first and second constrained prime numbers. In some embodiments, a non-compressible data stream is not deduplicatable.

FIG. 1 is a diagram showing an embodiment of a system for performing quality assurance on a storage duplication server. In the example, system 100 includes storage deduplication server 102, storage device 108, network 104, and quality assurance server 106. Network 104 includes high-speed data networks and/or telecommunication networks. Storage device 108 comprises a single storage device such as a hard disk, a tape drive, a semiconductor memory, a plurality of storage devices such as a redundant array system (e.g., a redundant array of independent disks (RAID)), a system for storage such as a library system or network attached storage system, or any other appropriate storage device or system.

System 100 includes a quality assurance environment in which quality assurance server 106 generates data streams that are sent over network 104 to storage deduplication server 102. Storage deduplication server 102 is configured to deduplicate data that it receives from quality assurance server 106 with respect to data that is already stored at storage device 108. Storage device 108 is attached to or otherwise accessible by storage deduplication server 102. For example, storage deduplication server 102 comprises a backup server that is configured to store at storage device 108 backup data received from a source location (e.g., quality assurance server 106). In some embodiments, storage deduplication server 102 is configured to segment each received data stream into data blocks (e.g., of a fixed size or of variable sizes) and perform deduplication with respect to each data block. For example, a data stream comprises a sequence of values and each data block comprises one or more values. In various embodiments, "deduplicating a data block" refers to determining whether the data block to be stored has already been stored at a target location (e.g., storage deduplication server 102 and/or storage device 108). In the event that the data block has not already been stored at the target location, the data block is stored at the target location (e.g., by storage deduplication server 102). Otherwise, in the event that the data block has already been stored at the target location, a reference, pointer, link, and/or other associating data to the previously stored data block is stored at the target location (e.g., by storage deduplication server 102) instead of another instance of the data block. In various embodiments, a reference, pointer, link, and/or other associating data to the stored data block comprises a relatively smaller amount of data relative to the amount of data associated with the data block. When a data stream stored at storage device 108 is to be restored (e.g., at the source location), the stored data blocks and/or references to stored data blocks associated with the data stream can be used to reconstruct the data stream. Deduplication can be used to reduce the amount of data that is stored at the target location by only storing new (non-duplicate) data that has not yet been stored at the target location and by storing references to data that has been previously stored at the target location.

For example, the parameters used in the generation of data streams and/or other attributes associated with the data streams are at least known to if not also controlled by quality assurance server 106. How storage deduplication server 102 performs deduplication with respect to storing at least two data streams that it receives from quality assurance server 106 given known data such as, for example, the percentage of difference in data between the two data streams, may indicate a deduplication result (e.g., a quality and/or effectiveness) of the storage deduplication techniques used by storage deduplication server 102. The deduplication result can be used to determine whether the deduplication techniques used by storage deduplication server 102 should be reconfigured, for example.

In some embodiments, quality assurance server 106 is configured to generate a data stream based on parameters such as an initialization parameter (sometimes referred to as a "seed value") and two prime numbers selected from a constrained modified set of prime numbers. In some embodiments, each pair of two prime numbers to be used with the initialization parameter (seed value) is selected based on a received revision parameter (sometimes referred to as a "revision value" and where two different revision values with respect to the same initialization parameter each maps to a different pair of prime numbers). A sequence is determined for the initialization parameter and each of the two prime numbers. In various embodiments, a data stream is determined by merging (e.g., interleaving) the two sequences. For example, merging the two sequences comprises creating a new (merged) sequence that includes each value from the first sequence followed by a corresponding value from the second sequence. For example, a first value from the first sequence that corresponds to a second value from the second sequence is associated with the same position within the first sequence as the second value is within the second sequence (e.g., a first value in position 1 of the first sequence corresponds to a second value in position 1 of the second sequence).

In some embodiments, if the two selected prime numbers each meets a predetermined set of criteria (as will be described in further detail below), then the two prime numbers comprise constrained prime numbers. A non-compressible sequence is generated with the same initialization parameter and each of the two constrained prime numbers and the two non-compressible sequences can be merged (e.g., interleaved) to generate a non-compressible data stream. Otherwise, if the two selected prime numbers each do not meet a predetermined set of criteria, then the two prime numbers comprise unconstrained prime numbers. A compressible sequence is generated with the same initialization parameter and each of the two unconstrained prime numbers and the two compressible sequences can be merged (e.g., interleaved) to generate a compressible data stream.

In some embodiments, this generated data stream is sent by quality assurance server 106 over network 104 to storage deduplication server 102 (e.g., as part of a test backup operation) for storage. Storage deduplication server 102 is configured to segment the data stream into data blocks (e.g., of fixed or variable sizes) and store only the new data blocks (e.g., data blocks that have not already been stored at storage device 108). If, for example, in a test backup operation, none of the data blocks of the data stream have already been stored at storage device 108, storage deduplication server 102 will store all the data blocks of the data stream. If, for example, in a test backup operation, some of the data blocks of the data stream have already been stored at storage device 108, storage deduplication server 102 will store references in place of the data blocks that have already been stored and store all the remaining data blocks of the data stream. Because the data stream is not deduplicatable, storage deduplication server 102 will not identify any duplicate data blocks within the data stream.

After the data stream is stored by storage deduplication server 102, the stored data stream may be restored. For example, restoring a stored data stream includes reconstructing the data stream using the stored data blocks and/or references to stored data blocks associated with the data stream. To test the accuracy or reliability of the storage deduplication techniques and/or the restoration techniques used by storage deduplication server 102, in some embodiments, quality assurance server 106 is configured to verify the data stream that was stored by and thereafter restored by the storage deduplication server 102. In some embodiments, quality assurance server 106 is configured to verify the correctness of the restored data stream by comparing the restored data stream to the original data stream that quality assurance server 106 had generated and then sent to storage deduplication server 102. As will be described in further detail below, in various embodiments, the restored data stream itself can be used to verify its correctness without requiring a master copy of the original data stream and/or the parameters used to generate the original data stream, thereby eliminating the need to maintain a master copy of the data stream for verification purposes. In various embodiments, a data stream can be verified in the same manner regardless if the data stream is compressible or non-compressible.

System 100 shows one example in which embodiments of data stream generation as described herein can be applied. Data stream generation may be applied in various other applications, as appropriate.

Figure 2:
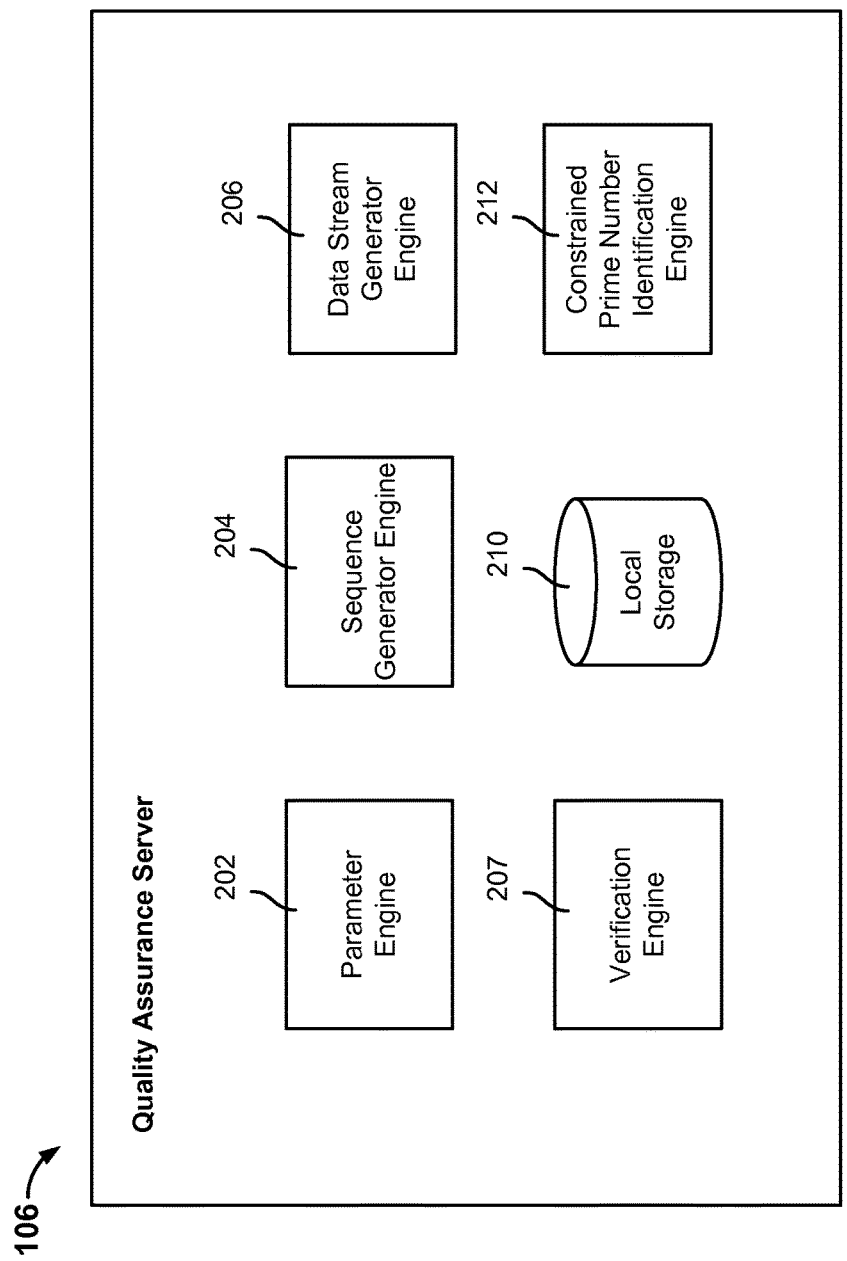
FIG. 2 is a diagram showing an embodiment of a quality assurance server.

FIG. 2 is a diagram showing an embodiment of a quality assurance server. In some embodiments, quality assurance server 106 of system 100 of FIG. 1 can be implemented using the example of FIG. 2. The quality assurance server of FIG. 2 includes parameter engine 202, sequence generator engine 204, data stream generator engine 206, constrained prime number identification engine 212, verification engine 207, and local storage 210. Each of parameter engine 202, sequence generator engine 204, data stream generator engine 206, constrained prime number identification engine 212, and verification engine 207 can be implemented using one or both of software and hardware. Local storage 210 comprises a local storage or a networked file system storage.

Parameter engine 202 is configured to provide parameters to use to generate a data stream. In various embodiments, parameters to use to generate a data stream include at least an initialization parameter and a revision parameter. In some embodiments, an initialization parameter is a seed value. In some embodiments, the seed value is any value selected from an address space that is represented by N bits (e.g., the address space comprising $(0, \ldots, 2^N-1)$). N can be selected to be any positive integer. For example, if N=5, then $2^{N=5}=32$ so the address space is $(0, \ldots, 31)$ and the initialization parameter can be selected to be any value from $(0, \ldots, 31)$. In some embodiments, a revision parameter is a revision value associated with a given "seed value" that uniquely maps to at least two prime numbers. In some embodiments, each of the at least two prime numbers is selected using the revision parameter from a set of prime numbers that is modified to exclude "2" and include "1" and is also constrained/bounded by $2^N-1$. In some embodiments, each of the at least two prime numbers is selected using the revision parameter from a set of constrained prime numbers (e.g., that is identified by constrained prime number identification engine 212, as described below).

In some embodiments, one or more of the initialization parameter (the seed value) and the revision parameter (the revision value), which maps to two or more prime numbers, are input by a user (e.g., associated with performing quality assurance). In some embodiments, one or more of the initialization parameter and the revision parameter, which maps to two or more prime numbers, are generated by a computer program.

In various embodiments, parameter engine 202 is configured to provide the initialization parameter and the revision parameter to sequence generator engine 204.

Constrained prime number identification engine 212 is configured to identify constrained prime numbers that are to be used to generate non-compressible sequences and data streams. In various embodiments, a "constrained" prime number refers to a prime number that meets a predetermined set of criteria and is therefore usable with the initialization parameter to generate a non-compressible sequence (e.g., by sequence generator engine 204). Two or more non-compressible sequences, each generated using the same initialization parameter and a corresponding constrained prime number, can be merged (e.g., interleaved) to generate a non-compressible data stream. Whereas prime numbers that do not meet the predetermined set of criteria ("unconstrained" prime numbers) can be used to generate sequences and such sequences can be merged together to form data streams, neither such sequences nor such data streams are associated with the property of being non-compressible. In other words, sequences and/or data streams generated with prime numbers that do not meet the predetermined set of criteria ("unconstrained" prime numbers) may be compressible.

In some embodiments, constrained prime number identification engine 212 is configured to iterate through a set of numbers and determine whether each number meets the predetermined set of criteria. Those numbers of the set that meet the predetermined set of criteria are included in an identified set of constrained prime numbers. In some embodiments, the set of numbers through which constrained prime number identification engine 212 iterates comprises an address space represented by N bits (e.g., the address space comprising $(0, \ldots, 2^N-1)$). N can be selected to be any positive integer.

As will be described in further detail below, the predetermined set of criteria that is used to identify constrained prime numbers requires that a constrained prime number 1) comprises a prime number from the set of prime numbers that is modified to exclude "2" and include "1," 2) includes component values that are each individually prime numbers from the set of prime numbers that is modified to exclude "2" and include "1," and 3) includes no duplicate component values. As such, the set of constrained prime numbers comprises a subset of all the prime numbers in the set of prime numbers that is modified to exclude "2" and include "1." In various embodiments, a "component value" of a number represents a subset of bits included in the number. For example, where a number is represented by N=32 bits, the 32-bit number p can be represented by a sequence of four bytes (each byte includes 8 bits), p3p2p1p0. In the example of a 32-bit number p that includes four bytes, each byte is referred to as a "component value."

Sequence generator engine 204 is configured to receive the initialization parameter and the revision parameter from parameter engine 202 to use to generate at least two sequences. In some embodiments, sequence generator engine 204 is configured to generate a sequence using each pair of the initialization parameter and a prime number selected using the revision parameter received from parameter engine 202. An example technique by which to generate each such sequence is described in more detail below. For example, if the revision parameter that was received from parameter engine 202 maps to two prime numbers, then sequence generator engine 204 will generate two corresponding sequences. Similarly, if the revision parameter that was received from parameter engine 202 maps to three prime numbers, then sequence generator engine 204 will generate three corresponding sequences. In some embodiments, if sequence generator engine 204 uses a constrained prime number to generate a sequence, then the sequence will be non-compressible. In some embodiments, if sequence generator engine 204 uses an unconstrained prime number (a prime number that is not from the set of constrained prime numbers) to generate a sequence, then the sequence may be compressible. In some embodiments, sequence generator engine 204 is configured to send the generated sequences and/or the corresponding given set of the initialization parameter and the revision parameter received from parameter engine 202 to be stored at local storage 210. In some embodiments, sequence generator engine 204 is configured to send the generated sequences and/or the corresponding given set of the initialization parameter and the revision parameter to data stream generator engine 206 for data stream generator engine 206 to use to generate a data stream.

Data stream generator engine 206 is configured to receive the at least two sequences and/or the corresponding given set of the initialization parameter and the revision parameter from sequence generator engine 204. In some embodiments, data stream generator engine 206 is configured to merge the at least two sequences into one new (merged) sequence that serves as the generated data stream. In some embodiments, if data stream generator engine 206 merges two sequences that were each generated using a constrained prime number, then the generated data stream will be non-compressible. In some embodiments if data stream generator engine 206 merges two sequences that were each generated using an unconstrained prime number (a prime number that is not from the identified set of constrained prime numbers), then the generated data stream may be compressible. In some embodiments, the at least two sequences are merged into one sequence by creating a new merged sequence in which each value from the first sequence is followed by a corresponding value from each other sequence (i.e., the two sequences are interleaved). For example, of the two sequences that are to be merged to become the data stream, the first sequence comprises {S11, S12, S13, . . . } and the second sequence comprises {S21, S22, S23, . . . }. In this example, merging the first and second sequences will yield the following data stream {S11, S21, S12, S22, S13, S23, . . . }. In some embodiments, data stream generator engine 206 is configured to send the generated data stream and/or the corresponding given set of the initialization parameter and the revision parameter to store at local storage 210. In some embodiments, data stream generator engine 206 is configured to send the generated data stream to an external destination (e.g., storage deduplication server 102 of system 100 of FIG. 1).

Verification engine 207 is configured to receive a data stream and verify the data stream without another (e.g., a master) copy of the data stream or the parameters (e.g., the initialization parameter, the first prime number, and the second prime number) that were used to generate the data stream. For example, the data stream to be verified is data restored from a storage device (e.g., by storage deduplication server 102 of system 100 of FIG. 1). It may be desirable to verify the received data stream to determine that the values of the data stream correctly match the pattern of values associated with a merging (e.g., interleaving) of two (or more) sequences generated by an initialization parameter and (at least) two prime numbers even if none of the initialization parameter and two prime numbers are known/retrieved prior to the start of the verification process. In some embodiments, verification engine 207 is configured to use a portion of the data stream to deduce the values of the first prime number and the second prime number and then use the first prime number and the second prime number to verify at least a portion of the data stream. In various embodiments, a data stream can be verified in the same manner regardless if the data stream is compressible or non-compressible. For example, verifying the data stream includes determining whether the difference between every other value of the data stream alternately equals the first prime number and the second prime number. For example, if the data stream can be successfully verified, then the techniques used to restore the data stream from the storage device can be determined to be effective. Otherwise, if the data stream cannot be successfully verified, then the techniques used to restore the data stream from the storage device can be determined to be ineffective and reconfiguration is needed.

Figure 3:
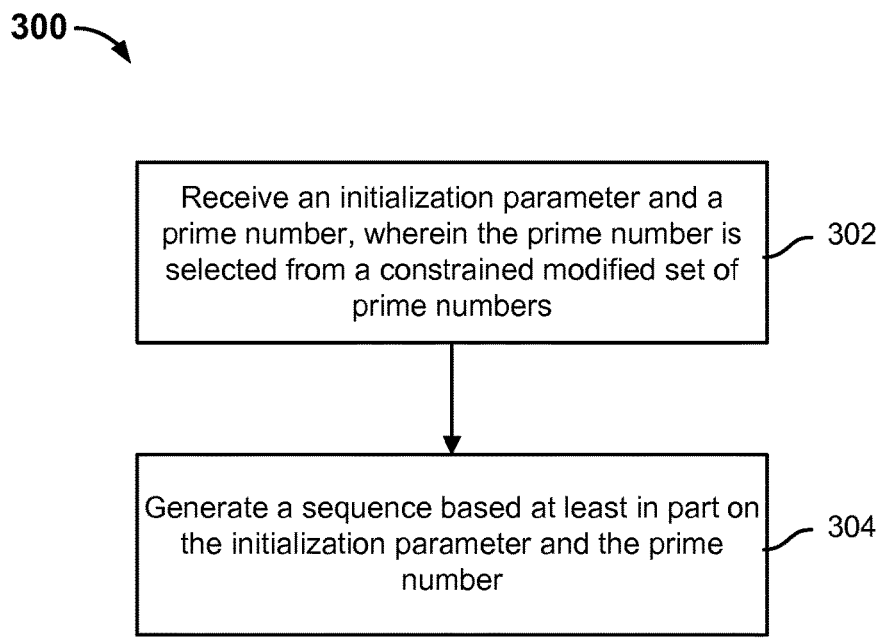
FIG. 3 is a flow diagram showing an embodiment of a process of generating a sequence using an initialization parameter and a prime number.

FIG. 3 is a flow diagram showing an embodiment of a process of generating a sequence using an initialization parameter and a prime number. In some embodiments, process 300 is implemented at system 100 of FIG. 1. Specifically, in some embodiments, process 300 is implemented at quality assurance server 106 of system 100 of FIG. 1.

Parameters may be provided to use to generate a data stream. Such parameters include an initialization parameter (e.g., a starting value or seed value) and a revision parameter (e.g., a revision value). The revision value maps to or is used to select at least two prime numbers from a constrained modified set of prime numbers. Process 300 can be performed to generate a sequence for each pair of the initialization parameter and a prime number (selected using the revision parameter). For example, if an initialization parameter (seed) and a revision parameter that maps to two prime numbers (prime1 and prime2) were received, then process 300 can be performed twice: once to generate a first sequence using the seed and prime1 and a second time to generate a second sequence using the seed and prime2. For example, the first and second sequences can be used to generate a data stream using another process (e.g., process 400 of FIG. 4, below).

At 302, an initialization parameter and a prime number are received, wherein the prime number is selected from a constrained modified set of prime numbers. For example, the initialization parameter can be received from a user input or from a computer program. In some embodiments, the initialization parameter comprises a seed value that is selected from an address space $(0, \ldots, 2^N-1)$, where N is selected to be any positive integer (e.g., 32). In some embodiments, the prime number is selected by/mapped to by a received revision parameter (e.g., a revision value associated with the seed value). The prime number is selected from a modified set of prime numbers that excludes "2" but includes "1" and that is bounded/constrained by $2^N-1$.

At 304, a sequence is generated based at least in part on the initialization parameter and the prime number. In some embodiments, the sequence is of length $2^N$. In various embodiments, the first value of the sequence is the initialization parameter (starting value or seed value). Each subsequent value of the sequence is determined as a function of the prior value in the sequence, the prime number, and $2^N$. For example, each subsequent value of the sequence is determined as the sum of the prior value in the sequence and the prime number and then the sum modulo $2^N$. In some embodiments, sequences generated using the same initialization parameter but different prime numbers will not have any blocks of values (e.g., 8 KiB in size) in common with each other.

An example of generating a sequence using an initialization parameter (seed value) and a prime number is described below:

Below are some definitions that will be used by the following examples:
prime: Any natural prime number
Prime: Set of natural prime numbers (2, 3, 5, 7, . . . )
PrimeM: A set of prime numbers that excludes "2" (even though "2" is considered a prime number) from the set Prime and includes 1 (even though "1" is not considered a prime number)
primeM: A member of the set PrimeM
PrimeN: Set of prime numbers that are less than $2^N-1$
PrimeMN: Set of primeM numbers that are less than $2^N-1$
Example sets of prime numbers:
Prime5=[2, 3, 5, 7, 11, 13, 17, 19, 23, 29, 31]
PrimeM5=[1, 3, 5, 7, 11, 13, 17, 19, 23, 29, 31]
Prime6=[2, 3, 5, 7, 11, 13, 17, 19, 23, 29, 31, 37, 41, 43, 47, 53, 59, 61]
PrimeM6=[1, 3, 5, 7, 11, 13, 17, 19, 23, 29, 31, 37, 41, 43, 47, 53, 59, 61]
Regarding the Set PrimeMN For a given address space (0, . . . , $2^N-1$) and a given a number s (seed value) in the chosen address space, if any specific number from the PrimeMN set is added to seed value s (with modulo-$2^N$), then the resulting sequence will repeat only after all numbers in the address space have been visited. This is not true for the set PrimeN as this property will not hold for the prime number 2. However, this property also holds for the number 1. That is the reason for excluding 2 and including 1 to the set PrimeMN. In some embodiments, set PrimeMN is sometimes referred to as a "constrained modified set of prime numbers."

Below is an example of generating a sequence:
Address space is N=5 bits (so the address space includes (0, . . . , 31)),
PrimeM5 is set [1, 3, 5, 7, 11, 13, 17, 19, 23, 29, 31],
The selected seed value (e.g., the initialization parameter) (which is any number between 0 . . . 31 inclusive) is 14,
The selected primeM5 is 3.
The resulting sequence S(N, seed, prime) will be as follows:
S(5, 14, 3)=
14, 17, 20, 23, 26, 29, 0, 3, 6, 9, 12, 15, 18, 21, 24, 27, 30, 1, 4, 7, 10, 13, 16, 19, 22, 25, 28, 31, 2, 5, 8, 11

The following table, Table 1, illustrates that the values of sequence S(5, 14, 3) are obtained by using the seed value (14) as the first value of the sequence and obtaining each subsequent value in the sequence by incrementing the previous value in the sequence by the prime number (3) with modulo $2^{N=5}=32$:

TABLE 1

| Start | +3 | +3 | +3 | +3 | +3 | +3 | +3 |  |
|---|---|---|---|---|---|---|---|---|
| +3 | 14 | 17 | 20 | 23 | 26 | 29 | 0 | 3 | Next |
| +3 | 6 | 9 | 12 | 15 | 18 | 21 | 24 | 27 | Next |
| +3 | 30 | 1 | 4 | 7 | 10 | 13 | 16 | 19 | Next |
| +3 | 22 | 25 | 28 | 31 | 2 | 5 | 8 | 11 | End |

This holds true for any selected member from the set PrimeM5.

In the above example, if the seed value was changed to 10 then the resulting sequence will be as follows:
S(5, 10, 3)=
10, 13, 16, 19, 22, 25, 28, 31, 2, 5, 8, 11, 14, 17, 20, 23, 26, 29, 0, 3, 6, 9, 12, 15, 18, 21, 24, 27, 30, 1, 4, 7

The following table, Table 2, illustrates that the values of sequence S(5, 10, 3) are obtained by using the seed value (10) as the first value of the sequence and obtaining each subsequent value in the sequence by incrementing the previous value in the sequence by the prime number (3) with modulo $2^{N=5}=32$:

TABLE 2

| Start | +3 | +3 | +3 | +3 | +3 | +3 | +3 |  |
|---|---|---|---|---|---|---|---|---|
| +3 | 10 | 13 | 16 | 19 | 22 | 25 | 28 | 31 | Next |
| +3 | 2 | 5 | 8 | 11 | *14* | 17 | 20 | 23 | Next |
| +3 | *26* | *29* | *0* | *3* | *6* | *9* | *12* | *15* | Next |
| +3 | *18* | *21* | *24* | *27* | *30* | *1* | *4* | *7* | End |

The sequences S(5, 14, 3) and S(5, 10, 3) are basically the same except for the rotation in the positions of their respective values. The values of sequence S(5, 14, 3) can be found starting from value 14 of sequence S(5, 10, 3), which is underlined in Table 2, above.

However, for example, if each value were represented by 32 bits, then if a different prime number is selected, then the resulting sequence will not have any blocks (e.g., blocks that are 8 KiB in size) of values in common with any other sequence.

In another example where the seed value is 14 and the selected primeM5 is 5:
S(5, 14, 5)=
14, 19, 24, 29, 2, 7, 12, 17, 22, 27, 0, 5, 10, 15, 20, 25, 30, 3, 8, 13, 18, 23, 28, 1, 6, 11, 16, 21, 26, 31, 4, 9

The following table, Table 3, illustrates that the values of sequence S(5, 14, 5) are obtained by setting the first value to the seed value (14) and obtaining each subsequent value in the sequence by incrementing the previous value in the sequence by the prime number (5) with modulo $2^{N=5}=32$:

TABLE 3

| Start | +5 | +5 | +5 | +5 | +5 | +5 | +5 |  |
|---|---|---|---|---|---|---|---|---|
| +5 | 14 | 19 | 24 | 29 | 2 | 7 | 12 | 17 | Next |
| +5 | 22 | 27 | 0 | 5 | 10 | 15 | 20 | 25 | Next |
| +5 | 30 | 3 | 8 | 13 | 18 | 23 | 28 | 1 | Next |
| +5 | 6 | 11 | 16 | 21 | 26 | 31 | 4 | 9 | End |

In the above example, if the seed value was changed to 10 then the resulting sequence will be as follows:
S(5, 10, 5)=
10, 15, 20, 25, 30, 3, 8, 13, 18, 23, 28, 1, 6, 11, 16, 21, 26, 31, 4, 9, 14, 19, 24, 29, 2, 7, 12, 17, 22, 27, 0, 5

The following table, Table 4, illustrates that the values of sequence S(5, 10, 5) are obtained by setting the first value to the seed value (10) and obtaining each subsequent value in the sequence by incrementing the previous value in the sequence by the prime number (5) with modulo $2^{N=5}=32$:

TABLE 4

| Start | +5 | +5 | +5 | +5 | +5 | +5 | +5 | |
|---|---|---|---|---|---|---|---|---|
| +5 | 10 | 15 | 20 | 25 | 30 | 3 | 8 | 13 | Next |
| +5 | 18 | 23 | 28 | 1 | 6 | 11 | 16 | 21 | Next |
| +5 | 26 | 31 | 4 | 9 | *14* | 19 | 24 | 29 | Next |
| +5 | 2 | 7 | 12 | 17 | 22 | 27 | 0 | 5 | End |

The sequences S(5, 14, 5) and S(5, 10, 5) are basically the same except for the rotation in the positions of their respective values. The values of sequence S(5, 14, 5) can be found starting from value 14 of sequence S(5, 10, 5), which is underlined in Table 4.

However, sequence S(5, 14, 5) does not have any (e.g., 8 KiB) blocks of (e.g., 32-bit) values in common with the sequence S(5, 14, 3) or any other sequence S(5, seed, prime) when the prime is any number other than 5.

The technique described above to generate a sequence is an example and other techniques may be used to generate a sequence using a seed value and a prime number from a constrained modified set of prime numbers.

Figure 4:
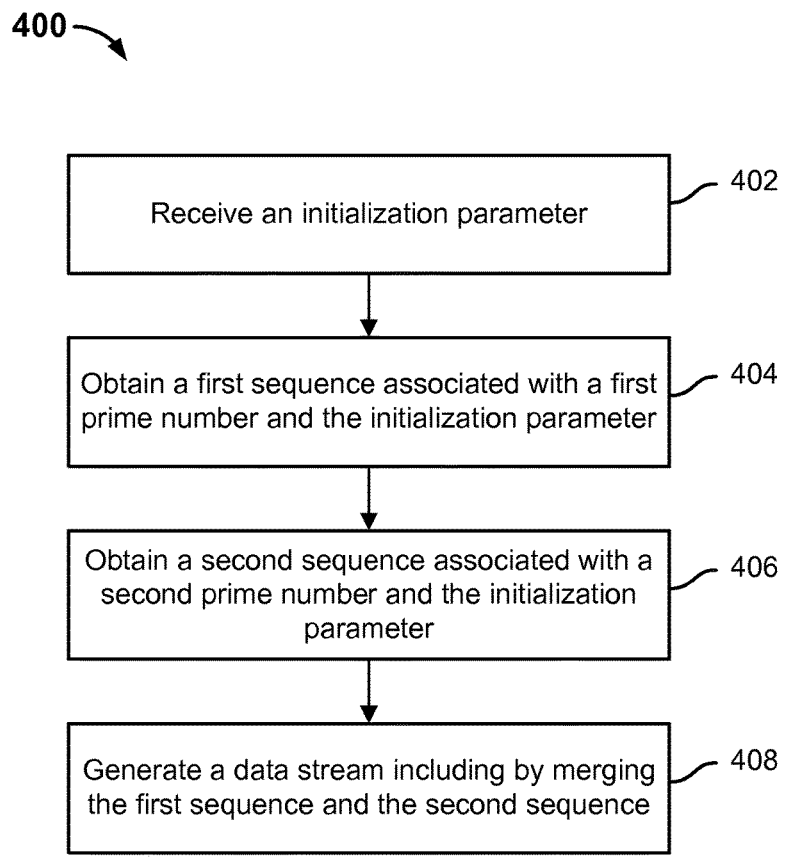
FIG. 4 is a flow diagram showing an embodiment of a process of generating a data stream using prime numbers.

FIG. 4 is a flow diagram showing an embodiment of a process of generating a data stream using prime numbers. In some embodiments, process 400 is implemented at system 100 of FIG. 1. Specifically, in some embodiments, process 400 is implemented at quality assurance server 106 of system 100 of FIG. 1.

At 402, an initialization parameter is received. For example, the initialization parameter can be received from a user input or from a computer program. In some embodiments, the initialization parameter comprises a seed value that is selected from an address space $(0, \ldots, 2^N-1)$, where N is selected to be any positive integer (e.g., 32).

At 404, a first sequence associated with a first prime number and the initialization parameter is obtained. In some embodiments, each of two prime numbers is selected from a modified set of prime numbers that excludes "2" but includes "1" and that is bounded/constrained by $2^N-1$. The two prime numbers may comprise the same prime number or different prime numbers. In some embodiments, the two prime numbers are selected based on a received revision parameter comprising a revision value. In some embodiments, a first sequence is generated using the initialization parameter and one of the two prime numbers using a process such as process 300 of FIG. 3. In some embodiments, the first sequence is received from another entity.

At 406, a second sequence associated with a second prime number and the initialization parameter is obtained. In some embodiments, a second sequence is generated using the initialization parameter and the prime number of the two prime numbers that was not used to generate the first sequence of step 404. In some embodiments, the second sequence is generated using the initialization parameter and the prime number of the two prime numbers that was not used to generate the first sequence using a process such as process 300 of FIG. 3. In some embodiments, the second sequence is received from another entity.

At 408, a data stream is generated including by merging the first sequence and the second sequence. In some embodiments, merging the first sequence and the second sequence includes interleaving the first and second sequences into a new sequence that is referred to as the data stream. In some embodiments, the data stream includes a sequence of alternating values from the first and second sequences. For example, if two sequences are to be merged to become the data stream, and the first sequence comprises {S11, S12, S13, . . . } and the second sequence comprises {S21, S22, S23, . . . }, then merging the first and second sequences will yield the following data stream {S11, S21, S12, S22, S13, S23, . . . }. In some embodiments, the data stream is not deduplicatable.

In some embodiments, more than two prime numbers from the constrained modified set of prime numbers can be selected based on the revision value and the data stream can be generated by merging more than two sequences, each of which is generated using the initialization parameter and a respective prime number.

An example of generating a data stream using an initialization parameter (seed value) and at least two prime numbers is described below:

Two or more S sequences, as described above, can be used to build a new merged sequence (data stream).

For example:

MS2 is a merged sequence (data stream) of two S sequences, and has the following four parameters:

N Address space $(0, \ldots, 2^N-1)$, seed The seed value (e.g., the initialization parameter) (the first value) of each of sequence #1 and sequence #2, prime1 A first prime number selected from set PrimeMN for sequence S(N, seed, prime1), prime2 A second prime number selected from set PrimeMN for sequence S(N, seed, prime2).

MS2(N, seed, prime1, prime2)=S(N, seed, prime1)+S(N, seed, prime2)

Similarly, MS3 is a merged sequence (data stream) of three S sequences, sequence #1, sequence #2, and sequence #3, that has five parameters:

N Address space $(0, \ldots, 2^N-1)$, seed The seed value (e.g., the initialization parameter) (the first value) of each of sequence #1 and sequence #2, prime1 A first prime number selected from set PrimeMN for sequence S(N, seed, prime1), prime2 A second prime number selected from set PrimeMN for sequence S(N, seed, prime2), prime3 A third prime number selected from set PrimeMN for sequence S(N, seed, prime3).

MS3 (N, seed, prime1, prime2, prime3)=

S(N, seed, prime1)+S(N, seed, prime2)+S(N, seed, prime3)

For example, given N=5, seed=14, prime1=3 and prime2=5, the sequence MS2 (5, 14, 3, 5) (data stream) is produced by alternately inserting one value from each individual sequence S(5, 14, 3) and S(5, 14, 5) into a merged sequence.

MS2(5, 14, 3, 5)=

14, 14, 17, 19, 20, 24, 23, 29, 26, 2, 29, 7, 0, 12, 3, 17, 6, 22, 9, 27, 12, 0, 15, 5, 18, 10, 21, 15, 24, 20, 27, 25, 30, 30, 1, 3, 4, 8, 7, 13, 10, 18, 13, 23, 16, 28, 19, 1, 22, 6, 25, 11, 28, 16, 31, 21, 2, 26, 5, 31, 8, 4, 11, 9

The following table, Table 5, illustrates that the values of data stream MS2(5, 14, 3, 5) are obtained by alternately inserting a value from sequence S(5, 14, 3) and a value from sequence S(5, 14, 5) (the values of each sequence are individually displayed with Table 1 and Table 3, above) into a merged sequence:

TABLE 5

| Start | Start | +3 | +5 | +3 | +5 | +3 | +5 |
|---|---|---|---|---|---|---|---|
| 14 | *14* | 17 | *19* | 20 | *24* | 23 | *29* |
| 26 | *2*  | 29 | *7*  | 0  | *12* | 3  | *17* |
| 6  | *22* | 9  | *27* | 12 | *0*  | 15 | *5*  |
| 18 | *10* | 21 | *15* | 24 | *20* | 27 | *25* |
| 30 | *30* | 1  | *3*  | 4  | *8*  | 7  | *13* |
| 10 | *18* | 13 | *23* | 16 | *28* | 19 | *1*  |
| 22 | *6*  | 25 | *11* | 28 | *16* | 31 | *21* |
| 2  | *26* | 5  | *31* | 8  | *4*  | 11 | *9*  |

Note in Table 5 above, the values from sequence S(5, 14, 5) are shown in italics while the values from sequence S(5, 14, 3) are not shown in italics.

In another example, given N=5, seed=10, prime1=3 and prime2=5, the sequence MS2(5, 10, 3, 5) is produced by alternately inserting one value from each of individual sequences S(5, 10, 3) and S(5, 10, 5) into a merged sequence.

MS2(5, 10, 3, 5)=
10, 10, 13, 15, 16, 20, 19, 25, 22, 30, 25, 3, 28, 8, 31, 13, 2, 18, 5, 23, 8, 28, 11, 1, 14, 6, 17, 11, 20, 16, 23, 21, 26, 26, 29, 31, 0, 4, 3, 9, 6, 14, 9, 19, 12, 24, 15, 29, 18, 2, 21, 7, 24, 12, 27, 17, 30, 22, 1, 27, 4, 0, 7, 5

The following table, Table 6, illustrates that the values of data stream MS2(5, 10, 3, 5) are obtained by alternately inserting a value from sequence S(5, 10, 3) and a value from sequence S(5, 10, 5) (the values of each sequence are individually displayed with Table 2 and Table 4, above) into a merged sequence:

TABLE 6

| Start | Start | +3 | +5 | +3 | +5 | +3 | +5 |
|---|---|---|---|---|---|---|---|
| 10 | *10* | 13 | *15* | 16 | *20* | 19 | *25* |
| 22 | *30* | 25 | *3*  | 28 | *8*  | 31 | *13* |
| 2  | *18* | 5  | *23* | 8  | *28* | 11 | *1*  |
| 14 | *6*  | 17 | *11* | 20 | *16* | 23 | *21* |
| 26 | *26* | 29 | *31* | 0  | *4*  | 3  | *9*  |
| 6  | *14* | 9  | *19* | 12 | *24* | 15 | *29* |
| 18 | *2*  | 21 | *7*  | 24 | *12* | 27 | *17* |
| 30 | *22* | 1  | *27* | 4  | *0*  | 7  | *5*  |

Note in Table 6 above, the values from sequence S(5, 10, 5) are shown in italics while the values from sequence S(5, 10, 3) are not shown in italics.

It was shown above that sequences S(N, seed1, prime) and S(N, seed2, prime) included the same values except for the rotation in the positions of their respective values. This does not hold true for the data stream, MS2. As shown with the two examples of data stream MS2, each seed value produces an entirely new data stream. Note that the pattern/consecutive values of 14 and 14 appear only in data stream MS2(5, 14, 3, 5) and not in merged sequence data stream MS2(5, 10, 3, 5).

Using the merging of two sequences as described above, $2^N$ data streams (one for each seed value in the address space) can be generated for any given pair of prime numbers (prime1, prime2). Each data stream determined from merging two sequences has $2*2^N$ values.

Assume that N=32 (the most often used size in bits of an unsigned integer) then the length of the data stream MS2(32, seed, prime1, prime2) will be as follows:

$2*(2^{32})$ unsigned integers of 32 bit size or $4*2*(2^{32})$ bytes≈32 gigabytes (GiB).

As such, a data stream MS2(32, seed, prime1, prime2) will repeat after exactly 32 GiB. Put another way, each seed value will provide a new data stream and if N=32, then $2^{32}$ seed values are available to use to build approximately 4 billion data streams where each data stream will be exactly 32 GiB long.

In some embodiments, each revision value (e.g., the revision parameter) with respect to a given seed value uniquely maps to a first prime number of a fixed value and a second prime number that is associated with a position within the constrained modified set of prime numbers that matches the revision value. For example, each pair of prime numbers can be represented by (prime1, prime2). For example, given seed=10; revision 0 can map to the pair of prime1=3 and prime2=1, revision 1 can map to the pair of prime1=3 and prime2=3, revision 2 can map to the pair of prime1=3 and prime2=5, revision 4 can map to the pair of prime1=3 and prime2=7, and so forth.

In some embodiments, each revision value (which maps to a different pair of prime numbers (prime1, prime2)) for a given seed value can be used to generate a data stream that is distinct from any data stream that is generated from the same seed value and any other revision value. In some embodiments, each revision value (which maps to a different pair of prime numbers (prime1, prime2)) for a given seed value can be used to generate a data stream that is distinct from any data stream that is generated from any other seed value and revision value.

Because for a given seed value, merged sequence data stream MS2(32, seed, prime1, prime2) will repeat after approximately 32 GiB, if the desired application of the data stream requires a data stream to be longer than 32 GiB, then one or more enhancements can be performed to increase the length of the data stream.

Below are some example enhancements that can be performed to increase the length of a data stream:

Enhancement #1:

MS2 comprises two simple sequences S(N, seed, prime1) and S(N, seed, prime2).

This enhancement automatically alters the prime used for the first sequence (prime1) to a new value when the repetition is about to occur.

This enhancement allows for a very large sequence to be built as long as we have a prime number available.

Enhancement #2:

Let each value of a sequence be represented by 64 bits. Therefore, let N=64 (instead of N=32). Where N=64, a generated data stream will not repeat for approximately $2*(2N=^{64})$ unsigned integers of 64 bit size or $8*2*(2^{64})$ bytes≈256 exabytes.

Enhancement #3:

More than two sequences are merged together to generate a data stream.

For example:

A merged sequence data stream that includes three sequences can be represented as MS3(N, seed, prime1, prime2, prime3).

Depending on the merging mode utilized, this can produce extremely long sequences.

The technique described above to generate a data stream is an example and other techniques may be used to generate a data stream using a seed value and at least two prime numbers selected from a constrained modified set of prime numbers.

In some embodiments, as described above, each seed value can be used to generate data streams that are distinct from data streams generated with any other seed values and a given seed value with a revision value can be used to generate a data stream that is distinct from a data stream generated with the given seed value and any other revision value. Therefore, in certain applications, different seed values and/or revision values can be assigned to different users involved in performing quality assurance such that each group of users and/each user in a group can perform testing on their respective data stream (generated with a given seed value and revision value) without impacting the testing performed by any other user. For example, each group of users (e.g., in a quality assurance team) can be assigned a seed value and each user within a group can be assigned a revision value with respect to that group's assigned seed value so each user within the group can use their respectively assigned seed value and revision value to generate a data stream distinct from each other's.

In some embodiments, a data stream comprising the merging (e.g., interleaving) of two (or more) sequences can be generated in memory using a small memory footprint. Below is pseudocode that describes one example implementation of a data stream generation engine as described in some embodiments:

The following four variables can be created and stored in memory:
   prime1
   prime2
   accumulator1
   accumulator2

The inputs to the data stream generation engine are seed (e.g., the initialization parameter), prime1 (e.g., a first prime number), and prime2 (e.g., a second prime number). The variables are initialized using the input parameters:
   Set accumulator1=seed
   Set accumulator2=seed
   Set accumulator1=accumulator1+prime1
   Set accumulator2=accumulator2+prime2

As will be shown in further detail below, accumulator1 represents the values from a first sequence generated using seed and prime1 and accumulator2 represents the values from a second sequence generated using seed and prime2.

The values of the data stream are generated by alternately outputting a value from each of the two sequences. As such, in the pseudocode below, the data stream is generated by alternately outputting a value from each of accumulator1 and accumulator2 and modifying both accumulator1 and accumulator2 after outputting from accumulator1 and accumulator2. The below pseudocode for outputting the values of the data stream can be repeated until a stop condition is met (e.g., the stop condition can be that either of the output of accumulator1 or accumulator2 is the same as a value previously output by accumulator1 or accumulator2, respectively, which indicates that the values of the data stream are starting to repeat).
   Output accumulator1
   Output accumulator2
   Set accumulator1=accumulator1+prime1
   Set accumulator2=accumulator2+prime2

The data stream generation as described in the above example implementation is extremely fast because only two ADD operations are used.

Embodiments of verifying a data stream are described herein. In various embodiments, a data stream generated in accordance with the embodiments described above can be verified without another copy (e.g., a master copy) of the data stream and without the parameters that were used to generate the data stream (e.g., the initialization parameter, a first prime number, a second prime number). A verification capability that does not require another copy (e.g., a master copy) of the data stream for comparison purposes is invaluable for proving the correctness of a storage system. For example, a verification capability that does not require another copy of the data stream for comparison purposes (or even the parameters that were used to generate the data stream) can free up storage space that would have otherwise been used to store the other copy of the data stream and/or the parameters. In various embodiments, verification can be performed on any part of a data stream. A self-verification capability is valuable for proving the store and restore capabilities of a storage system.

A data stream may be verified for correctness in various different applications. For example, to verify a data stream for correctness is to confirm that the data stream is actually the merging (e.g., interleaving) of two sequences (e.g., each of which is generated using a process such as process 300 of FIG. 3, above). In a first example application, data stored at a storage device associated with a data stream is restored and the restored version of the data stream can be verified to test the effectiveness of storing and/or restoring techniques. In a second example application, a newly generated data stream can be verified to confirm that the data stream had been correctly generated.

Figure 5:
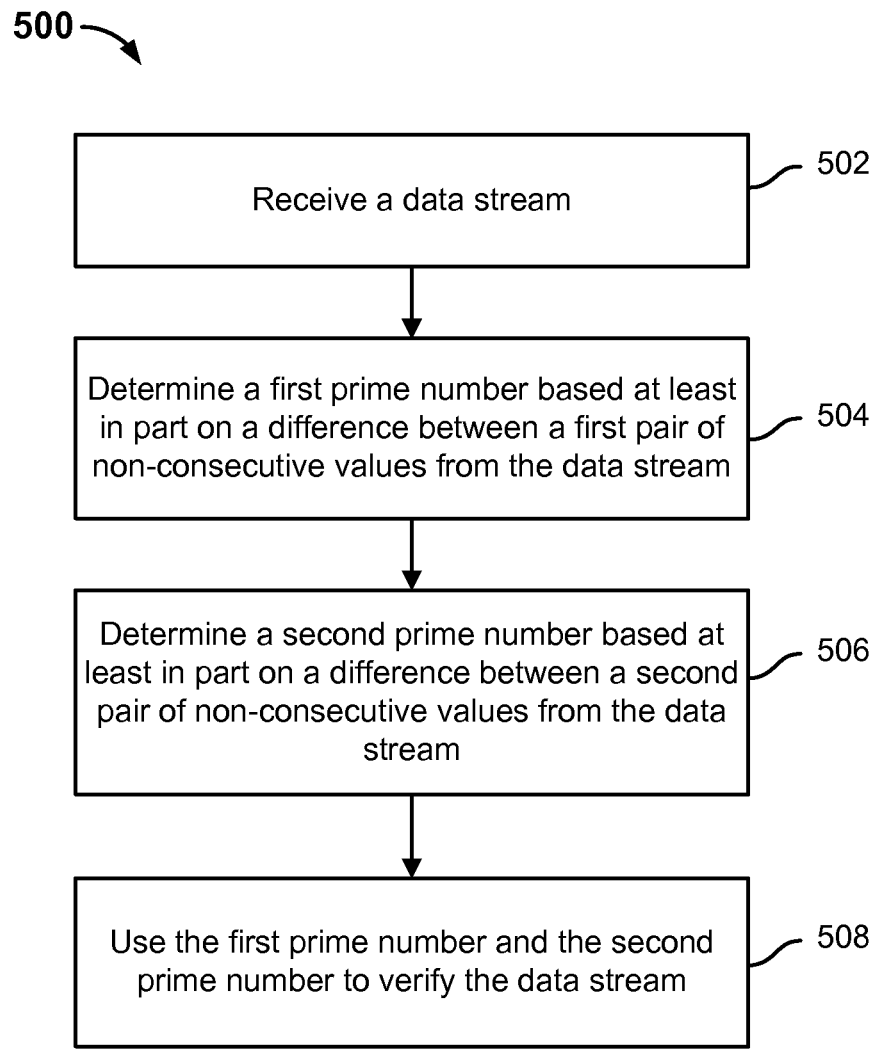
FIG. 5 is a flow diagram showing an embodiment of a process of verifying a data stream.

FIG. 5 is a flow diagram showing an embodiment of a process of verifying a data stream. In some embodiments, process 500 is implemented at system 100 of FIG. 1. Specifically, in some embodiments, process 500 is implemented at quality assurance server 106 of system 100 of FIG. 1.

In some embodiments, process 500 describes an example of performing verification on a data stream that was generated by merging (e.g., interleaving) two sequences (e.g., using a process such as process 400 of FIG. 4). In some embodiments, process 500 describes an example of performing verification on a non-compressible data stream that was generated by merging (e.g., interleaving) two non-compressible sequences (e.g., using a process such as process 1200 of FIG. 12, below). As will be described in further detail below, process 500 deduces the two (e.g., unconstrained or constrained) prime numbers associated with the respective two sequences and uses these two prime numbers to verify the (e.g., compressible or non-compressible) data stream.

At 502, a data stream is received. For example, the data stream is restored from data stored at a storage device (e.g., by a quality assurance server such as quality assurance server 106 of system 100 of FIG. 1). In another example, the data stream is recently generated (e.g., by a quality assurance server such as quality assurance server 106 of system 100 of FIG. 1).

At 504, a first prime number is determined based at least in part on a difference between a first pair of non-consecutive values from the data stream. Each of the two sequences that were interleaved to generate the data stream is based on a prime number and the initialization parameter (e.g., seed value). Each of the two sequences initially starts with the seed value plus the prime number associated with that sequence and each subsequent value is generated by a prior value plus the prime number associated with that sequence. As such, the difference between every other value of the data stream should equal one of the two prime numbers associated with the sequences that were interleaved to form the data stream. For example, a first prime number can be deduced as the difference between a pair of values of the data stream that are separated by a value (e.g., the Xth and (X+2)th values of the data stream).

At 506, a second prime number is determined based at least in part on a difference between a second pair of non-consecutive values from the data stream. Similarly, a second prime number can be deduced as the difference between another pair of values of the data streams that are separated by a value (e.g., the (X+1)th and (X+3)th values of the data stream).

At 508, the first prime number and the second prime number are used to verify the data stream. Once the first and second prime numbers have been deduced, the data stream (or any portion thereof) can be verified based on determining whether the difference between pairs of values separated by a value of the data stream matches one of the first and second prime numbers. In some embodiments, while the initialization parameter comprising a seed value was used to generate the data stream, the seed value is not used in verifying the data stream and therefore does not need to be determined.

In some embodiments, a data stream consists of two interleaved sequences each based upon their own prime number resulting in a data stream that is not deduplicatable. For example, each sequence starts with the seed value (seed) plus their individual prime (prime1 or prime2) and subsequent values are generated by the prior value plus their individual prime. Therefore, the values in a data stream in some embodiments are (where value[X] represents the value in position X in the data stream):

seed (in hexadecimal)=0E00000E, prime1 (in hexadecimal)=0103050D, prime2 (in hexadecimal)=0305070B
        value1=seed+prime1 0F03051B=0E00000E+0103050D
        value2=seed+prime2 11050719=0E00000E+0305070B
        value3=value1+prime1 10060A28=0F03051B+0103050D
        value4=value2+prime2 140A0E24=11050719+0305070B
        value5=value3+prime1 11090F35=10060A28+0103050D
        value6=value4+prime2 170F152F=140A0E24+0305070B
        value1=value5+prime1 120C1442=11090F35+0103050D
        value8=value6+prime2 1A141C3A=170F152F+0305070B In this data stream, the first value and every other value are from the sequence generated with prime1 (the values above written in bold) and the second value and every other value are from the sequence with prime2 (the values written not in bold).

The difference of the Xth and (X+2)th values is either prime1 if the Xth value was from the first sequence or prime2 if the Xth value was from the second sequence.

seed (in hexadecimal)=0E00000E, prime1 (in hexadecimal)=0103050D, prime2 (in hexadecimal)=0305070B
        value3−value1=prime1 10060A28−0F03051B=0103050D
        value4−value2=prime2 140A0E24−11050719=0305070B
        value5−value3=prime1 11090F35−10060A28=0103050D
        value6−value4=prime2 170F152F−140A0E24=0305070B
        value1−value5=prime1 120C1442−11090F35=0103050D
        value8−value6=prime2 1A141C3A−170F152F=0305070B As shown above, four consecutive values of the data stream are enough to determine the two prime numbers (prime1 and prime2). Once the values of prime1 and prime2 are deduced, the correctness of the entire data stream can be established as all subsequent values must be equal to the prior value plus an alternating prime1 and prime2 value.

For verification, the input can be at least a portion from the start or middle of the data stream. In various embodiments, values for prime1 and prime2 can be deduced and the entire data stream verified as long as a minimum of four values of the data stream are made available.

The following is pseudocode that shows the example steps that will cause the portion of the data stream comprising value3, value4, value5, value6, value7 and value8 to be verified. Note: The data stream started with value1 but the data stream verification is being attempted from value3.

Input: value3
    save value3 in accumulator1
    Input: value4
    save value4 in accumulator2
    Input: value5
    save difference of value5 and accumulator1 in prime1
    save value5 in accumulator1
    Input: value6
    save difference of value6 and accumulator2 in prime2
    save value6 in accumulator2
    At this point, the prime1 and prime2 values are deduced.
    Input: value7
    ensure that the difference of value7 and accumulator1 equals prime1
    save value7 in accumulator1
    Input: value8
    ensure that the difference of value8 and accumulator2 equals prime2
    save value8 in accumulator2

As shown above, in some embodiments, prime1 and prime2 associated with a data stream to be verified can be derived just from four (e.g., initial) values of the data stream. In some embodiments, the seed value can also be derived using the (e.g., initial) four values and the values for the prime1 and prime2. In various embodiments, the seed value is not required for verification but can be deduced and reported (e.g., to enable the regeneration of the exact same data stream if desired).

If prime1 is repeatedly added to the first value of the data stream and prime2 is repeatedly added to the second value of the data stream and when both the accumulators are equal, the seed is found.

Since the initial value of each interleaved sequence is value=seed+prime and all succeeding values are value=value+prime, given enough additions of prime to value, value will at some point be equal to seed due to modulo arithmetic wrap around.

Therefore, the seed can be deduced by repeatedly performing the following additions, described in pseudocode, as required:

value_from_prime1_sequence=value_from_prime1 sequence+prime1
    value_from_prime2_sequence=value_from_prime2 sequence+prime2
    Until value_from_prime1_sequence=value_from_prime2 sequence. The two values will be equal only when they are both equal to the seed value, seed.

In some embodiments, a data stream comprising the merging (e.g., interleaving) of two (or more) sequences can be verified in memory using a small memory footprint. Below is pseudocode that describes one example implementation of a data stream verification engine as described in some embodiments:

The following six variables can be created and stored in memory:
    prime1
    prime2
    accumulator1
    accumulator2 next_step=Initialization#1
result=true

In step Initialization#1, accumulator1 is initialized by inputting a first value of the data stream to be used in the verification process:
  Set accumulator1=value
  Set next_step=Initialization#2

In step Initialization#2, accumulator2 is initialized by inputting a next value of the data stream:
  Set accumulator2=value
  Set next_step=Initialization#3

In step Initialization#3, the difference between a next value of the data stream and accumulator1 is set as prime1:
  Set prime1=value−accumulator1
  Set accumulator1=value
  Set next_step=Initialization#4

In step Initialization#4, the difference between a next value of the data stream and accumulator2 is set as prime2:
  Set prime2=value−accumulator2
  Set accumulator2=value
  Set next step=Verify#1

In step Verify#1, it is checked whether the difference between the next value of the data stream and accumulator1 equals prime1:
  if (value−accumulator1) does not equal prime1 then set result to false
  Set accumulator1=value
  Set next step as Verify#2

In step Verify#2, it is checked whether the difference between the next value of the data stream and accumulator2 equals prime2:
  if (value−accumulator2) does not equal prime2 then set result to false
  Set accumulator2=value
  Set next step as Verify#1

Verify#1 and Verify#2 are alternately performed until a stop condition is met (e.g., the end of the data stream has been reached). If result is ever set to false, then the data stream cannot be verified to be correct. However, if result remains set to true after the stop condition is met, then the data stream is verified to be correct.

The data stream verification as described in the above example implementation is extremely fast because only a few subtraction operations are used.

Embodiments of generating data that is not compressible are described herein. A data stream used for testing may be first compressed. If the data stream is compressible, then the size of the compressed data set (plus the overhead data associated with compression) will most likely be smaller than the size of the original data stream. However, in certain testing scenarios, it may be desirable to preserve the (approximate) size of the data stream even if the data stream undergoes a compression process so as to better observe the effectiveness of a separate process that is applied to the data stream. Given a method to generate a data stream that is not compressible, other methods can then be used to generate a data stream with a specific level of compression. In certain testing scenarios the specification of a specific compression level is very desirable.

For example, a 2 GiB data stream may be compressed into a 1.5 GiB data stream prior to a test deduplication process. In the test deduplication process, the test data stream is to be compared against previously stored data of which 0.5 GiB is known to be common to the uncompressed 2 GiB data stream. However, if the compressed 1.5 GiB data stream is compared to the previously stored data in the deduplication process and 0.4 GiB of the compressed 1.5 GiB data stream is determined by the deduplication process to be common to the previously stored data, then because of the effect of compression on the tested data stream, it is unclear whether the 0.1 GiB discrepancy in the deduplication is a result of a fault in the deduplication process or the compression technique. As such, in some embodiments, a data stream is generated to be non-compressible so that a particular testing technique (e.g., of deduplication) with the data stream can be isolated from any compression techniques that may be applied to the data stream.

In some embodiments, deduplication systems deal with data in "blocks." A deduplication system can use either fixed or variable sized blocks. An example of variable block sizes is block sizes ranging from 4 KiB to 12 KiB with an average size of 8 KiB. The data streams can be segmented at certain natural boundaries and variable sized blocks are created. The blocks that are duplicates (of previously stored data) are detected and only the unique blocks are stored in the deduplication storage. Instead of storing a duplicate block multiple times, a reference to the previously stored block is stored. The reference requires significantly less storage space than the duplicate data blocks would have required. In the event that the deduplication process occurs at a client that is remote from the server associated with the deduplication storage, detection of duplicate blocks results in significantly less network bandwidth than sending the actual block data from the client to the server. Requiring less storage space and less network bandwidth is traded for requiring more CPU cycles for duplicate block detection, duplicate block reference storage, and lookup and duplicate block retrieval.

Many compression techniques deal with data at the bit and byte level. Compression techniques typically replace occurrences of often repeated series of bytes in the data with a reference or code value that is smaller than the often repeated sequence of bits or bytes. For example, replacing frequent multiple occurrences of a repeated series of three byte values with a one byte code throughout a data set reduces the size of a data set, which then requires less storage to store the data set. A compressor builds a dictionary of smaller sequences on-the-fly that are used to replace larger sequences. A compressed data set also requires less network bandwidth to transfer. Requiring less storage space to store a data set and less network bandwidth to transfer a data set is traded for requiring CPU cycles for compression and decompression.

In some embodiments, deduplication systems perform both duplicate data set block detection and data set compression. Data blocks can be compressed before or after duplicate block detection.

In some embodiments, each value in a sequence or in a data stream, which comprises merging two or more sequences, can be represented in hexadecimal. Examples of using hexadecimal to represent values are described below:

Note that all commas and underscores used below are merely for easier reading of the digits of a number.

Computers store all values in binary (base 2). Each additional bit represents another power factor of 2. One bit ($2^1$=2 values) can store the values 0, 1 in decimal and 0, 1 in binary. Two bits ($2^2$=4 values) can store the values 0, 1, 2, 3 in decimal or 00, 01, 10, 11 in binary. Four bits ($2^4$=16 values) can store the values 0, 1, 2, 3, 4, 5, 6, 7, 8, 9, 10, 11, 12, 13, 14, 15 in decimal or 0000, 0001, 0010, 0011, 0100, 0101, 0110, 0111, 1000, 1001, 1010, 1011, 1100, 1101, 1110, 1111 in binary. We now have four bits described. Four bits is called a "nibble." Using the same math, eight bits ($2^8$=256 values) can store the values 0 to 255 in decimal or 0000_0000 to 1111_1111 in binary. Eight bits is called a "byte" and consists of two nibbles. If a number were represented by N bits, the highest value storable is $2^N-1$ bits.

Referring back to the four bit ($2^4=16$ values) example, the four bits can be perceived as a single digit or a two digit decimal number from 0 to 15, or a single four digit binary number from 0000 to 1111. For convenience, base 16 is also used to represent the sixteen values of a four bit nibble using the single hexadecimal digits 0 to 9 and A to F. The A to F hexadecimal digits can also be in lower case. The sixteen four bit values in hexadecimal are 0, 1, 2, 3, 4, 5, 6, 7, 8, 9, A, B, C, D, E, F. In order to distinguish a hexadecimal number from a decimal number, it is generally written with a prefix of "0x" or a suffix of "hexadecimal" or "hex."

Similarly, for convenience, an eight bit number can also be perceived as two four bit nibbles. Since a single hexadecimal digit represents each four bit nibble value, two hexadecimal digits represent two four bit nibbles. Together, two four bit nibbles represent a full eight bit byte value. In other words, an eight bit byte can be represented by two hexadecimal digits, where each digit can be one of 0 to 9 or A to F.

Example eight bit (byte) values in decimal, binary, and hexadecimal representations:
  0 decimal, 0000_0000 binary, 00 hex (or 0x00)
  10 decimal, 0000_1010 binary, 0A hex (or 0x0A)
  50 decimal, 0011_0010 binary, 32 hex (or 0x32)
  203 decimal, 1100_1011 binary, CB hex (or 0xCB)
  255 decimal, 1111_1111 binary, FF hex (or 0xFF)

If 32 bits were used to represent a value, the largest decimal value that can be represented is $2^{32}-1=4,294,967,295$. As such, 32 bits can be used to represent just over 4,000,000,000 decimal or 4 billion values, $2^{32}=4,294,967,296$, ranging from 0 to 4,294,967,295. For convenience, a 32-bit number is frequently perceived as four sets of eight bits or four bytes. Each byte's value is written using two base 16 digits. There is one hexadecimal digit for each nibble in a byte. This is more convenient because with practice, one can "see" the individual bits by looking at the four bit base 16 nibbles and their digits. It is also easier to remember and write A028FC1D instead of 2687040541.

An example 32-bit value in binary, decimal and hexadecimal representations:
  1010_0000_0010_1000_1111_1100_0001_1101 binary (very hard to remember, all bits visible)
  A0_28_FC_1D hex (easier to remember and the underlying four bit sets can be seen)
  2,687,040,541 decimal (around 2.687 billion) (harder to remember, bit sets obscured)

In some embodiments, a data stream is generated as described in some embodiments with 32-bit values, at least some of which may include component eight bit or byte values that can repeat and therefore be replaced by a shorter sequence of bits or bytes. As such, such data streams are compressible. A compressor can locate and replace larger sequences of byte values that repeat within the data stream with a smaller sequence of bits or bytes, thereby reducing the storage required to store the data stream.

Below are some examples of 32-bit values in decimal representation and their byte values in hexadecimal:
  17 decimal–00_00_00_11 hex
  3,439,329,280 decimal–CD_00_00_00 hex
  2,818,572,318 decimal–A8_00_00_1E hex
  31,247 decimal–00_00_7A_0F hex
  287,456,068 decimal–11_22_3B_44 hex
  4,179,770,180 decimal–F9_22_3B_44 hex A compressor may locate the repeated multiple byte sequences 00_00 or 00_00_00 or 22_3B_44 across the different 32-bit values in the data stream.

In various embodiments, a prime number, primeM (a member of set of prime numbers PrimeM that includes "1" and excludes "2" and from an address space defined by $(0, \ldots, 2^N-1)$) that meets a predetermined set of criteria is specially identified as a "constrained" prime number, which can be used to generate non-compressible sequences and non-compressible data streams, which comprise a merging of multiple such sequences. In some embodiments, the predetermined set of criteria for a "constrained" N-bit prime number comprises 1) that a constrained prime number comprises a prime number from a set of prime numbers that is modified to exclude "2" and include "1" and is also constrained/bounded by $2^N-1$ 2) that each component value of the constrained prime number comprises a prime number from the set of prime numbers that is modified to exclude "2" and include "1" and 3) that none of the component values of the constrained prime number are duplicates. In some embodiments, a constrained prime number is represented by N bits and each component value of the constrained prime number comprises a subset of the values (e.g., a byte) of the constrained prime number.

In actual implementation, the number of bits to use to represent a value, N, can be selected to be of various values. For purposes of illustration, in various examples below, N is selected to be 32 bits. A constrained 32-bit prime number comprises four component eight bit byte values that are each a prime number in the range 0 to $2^8-1$ (=255) (including "1" and excluding "2") and that no byte prime number is a duplicate within the same 32-bit prime number. Put another way, the component byte values of a prime number p of N=32 bits can be represented as p3p2p1p0 and p would be identified as a constrained prime number if each of p0, p1, p2, and p3 is a prime number in the range 0 to 255 (including "1" and excluding "2") and none of p0, p1, p2, and p3 were duplicates. This avoids the case where bytes in a data stream were not uniformly distributed, which most of the time is for lower values of primes. Therefore, a compressor can no longer locate any repeated multiple byte sequences in the sequence or data stream.

The following table shows all primes that are members of PrimeM8 (PrimeM8 is a modified set of prime numbers that excludes "2" but includes "1" and that is bounded/constrained by $2^8-1=255$) set:
  PrimeM8=[1, 3, 5, 7, 11, 13, 17, 19, 23, 29, 31, 37, 41, 43, 47, 53, 59, 61,
  67, 71, 73, 79, 83, 89, 97, 101, 103, 107, 109, 113, 127, 131, 137, 139, 149, 151,
  157, 163, 167, 173, 179, 181, 191, 193, 197, 199, 211, 223, 227, 229, 233, 239, 241, 251]

In hexadecimal representation, PrimeM8=[01, 03, 05, 07, 0B, 0D, 11, 13, 17,
  1D, 1F, 25, 29, 2B, 2F, 35, 3B, 3D, 43, 47, 49, 4F, 53, 59, 61, 65, 67, 6B, 6D, 71, 7F, 83, 89, 8B, 95, 97, 9D, A3, A7, AD, B3, B5, BF, C1, C5, C7, D3, DF, E3, E5, E9, EF, F1, FB]

Where N=32 bits, any member of the set PrimeM32 (PrimeM32 is a modified set of prime numbers that excludes "2" but includes "1" and that is bounded/constrained by $2^{32}-1=4,294,967,295$) that has individual component byte values outside of the PrimeM8 members are not constrained prime numbers and therefore not considered for non-compressible data generation.

Any member of the set PrimeM32 that has duplicate individual component byte values (PrimeM8 members) are also not constrained prime numbers and therefore not considered for non-compressible data generation.

The component byte values in an unconstrained primeM number can be any value from 0 to 255 dec or 00 to FF hex. One or more of the four component byte values (PrimeM8 members) within an unconstrained 32-bit value can be the same (duplicate). This results in generated data that is compressible. Below are three example 32-bit values (with four component byte values) represented as decimal and hexadecimal that do not meet the three predetermined criteria for constrained prime numbers and are therefore unconstrained prime numbers:

A) 11 decimal, 00_00_00_0B hex
B) 16,777,729 decimal, 01_00_02_01 hex
C) 16,777,751 decimal, 01_00_02_17 hex In the example above, the hexadecimal representation of value A includes duplicate "00" byte values and also non-prime value "00," the hexadecimal representation of value B includes duplicate "01" byte values and also non-prime value "00," and the hexadecimal representation of value C includes non-prime value "00." Therefore, each of values A, B, and C are compressible.

Below are two example 32-bit values (with four component byte values) represented as decimal and hexadecimal that do meet the three predetermined criteria for constrained prime numbers:

D) 16,975,117 decimal, 01_03_05_0D hex
E) 50,661,131 decimal, 03_05_07_0B hex

In the example above, the hexadecimal representations of values D and E are each a prime number, the four component byte values of each are prime numbers, and none of the four component byte values of each of values D and E are duplicates. Therefore, each of values D and E are not compressible.

Generally, the component byte values in a constrained primeM number must each be a primeM number in the range 0 to 255 decimal or 00 to FF hex, and all four component byte values must have a different value.

FIG. 6 is a diagram showing a table that includes sample constrained and unconstrained 32-bit primeM values to help explain how a primeM value is determined to be constrained or unconstrained. In FIG. 6, a primeM value that is "good" is a constrained prime number that will result in generated data that cannot be compressed and a primeM value that is "bad" is an unconstrained prime number that may result in generated data that may be compressed.

Figure 7:
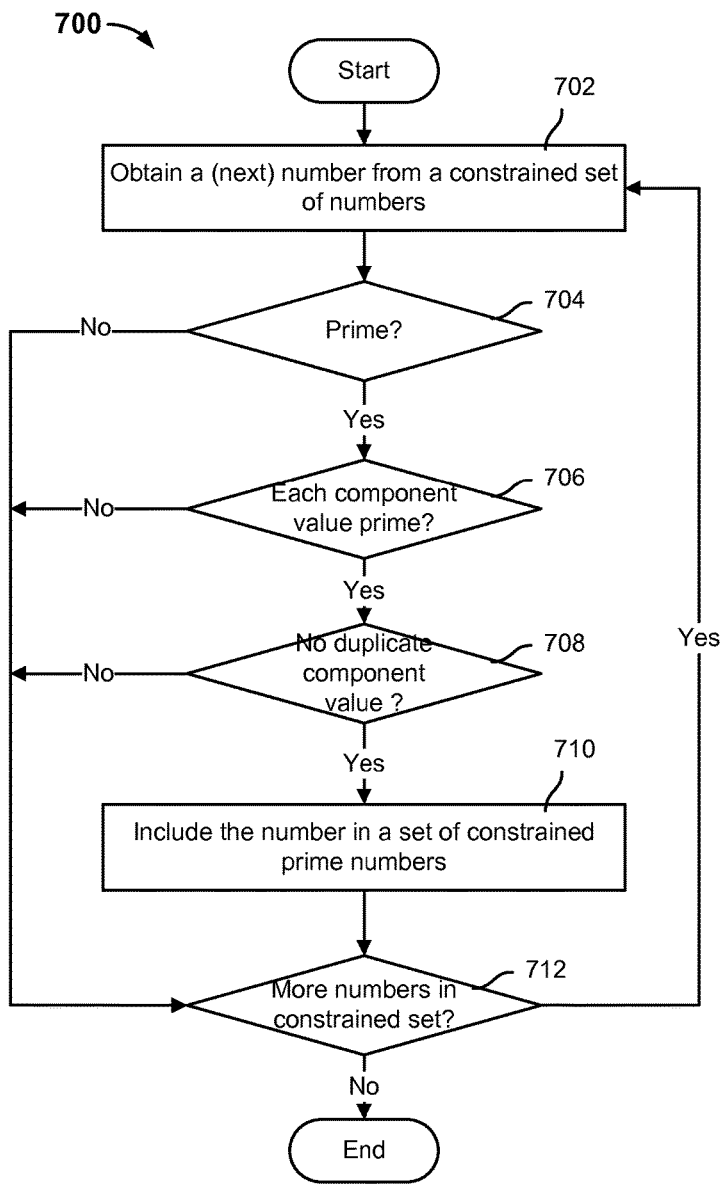
FIG. 7 is a flow diagram showing an embodiment of a process for identifying a set of constrained prime numbers.

FIG. 7 is a flow diagram showing an embodiment of a process for identifying a set of constrained prime numbers. In some embodiments, process 700 is implemented at system 100 of FIG. 1. Specifically, in some embodiments, process 700 is implemented at quality assurance server 106 of system 100 of FIG. 1.

Process 700 is an example process of identifying a set of constrained prime numbers from a set of numbers constrained by N bits by iterating through each number of the set and determining whether the number meets a predetermined set of criteria associated with steps 704, 706, and 708 required for a constrained prime number. As described herein, a constrained prime number can be used with an initialization parameter to generate a non-compressible sequence.

At 702, a (next) number from a constrained set of numbers is obtained. For example, if N=32 bits, then the constrained set of numbers includes (0, . . . , $2^{32}-1$).

At 704, it is determined whether the number is a prime number. In various embodiments, the prime number is from a set of prime numbers that is modified to exclude "2" and include "1" and is also constrained/bounded by $2^N-1$. In the event that the number is a prime number, control is transferred to 706. Otherwise, in the event that the number is not a prime number, control is transferred to 712.

At 706, it is determined whether each component value of the number is itself a prime number. In some embodiments, the size of each component value of the number is a byte (eight bits). For example, if N=32 bits and the size of each component value is a byte, then each number p of the constrained set would have four component byte values p3p2p1p0. For example, each component byte value of p3p2p1p0 should be a prime number from a set of prime numbers that is modified to exclude "2" and include "1" and within range 0 to 255 (set Prime8). In some embodiments, the size of each component value of the number is dependent on the size with which a particular compression technique determines compression. In the event that the each component value of the number is a prime number, control is transferred to 708. Otherwise, in the event that not every component value of the number is a prime number, control is transferred to 712.

At 708, it is determined whether there is a duplicate component value in the number. There should not be any duplicates among the component values of a constrained prime number. Put another way, each component value of a constrained prime number must be different from each other. Returning to the former example, if N=32 bits and the size of each component value is a byte, then there should be no duplicate component values among the four component byte values p3p2p1p0 of number p. In the event that there are no duplicate component values in the number, control is transferred to 710. Otherwise, in the event that there are duplicate component values in the number, control is transferred to 712.

At 710, the number is included in a set of constrained prime numbers. If the number meets the three criteria of steps 704, 706, and 708, then the number is determined to be a constrained prime number and included in a set of constrained prime numbers.

At 712, it is determined whether there is at least one more number in the constrained set of numbers. In the event that there is at least one more number in the constrained set of numbers, control is returned 702. Otherwise, in the event that there are no more numbers in the constrained set of numbers, process 700 ends.

Figure 8:
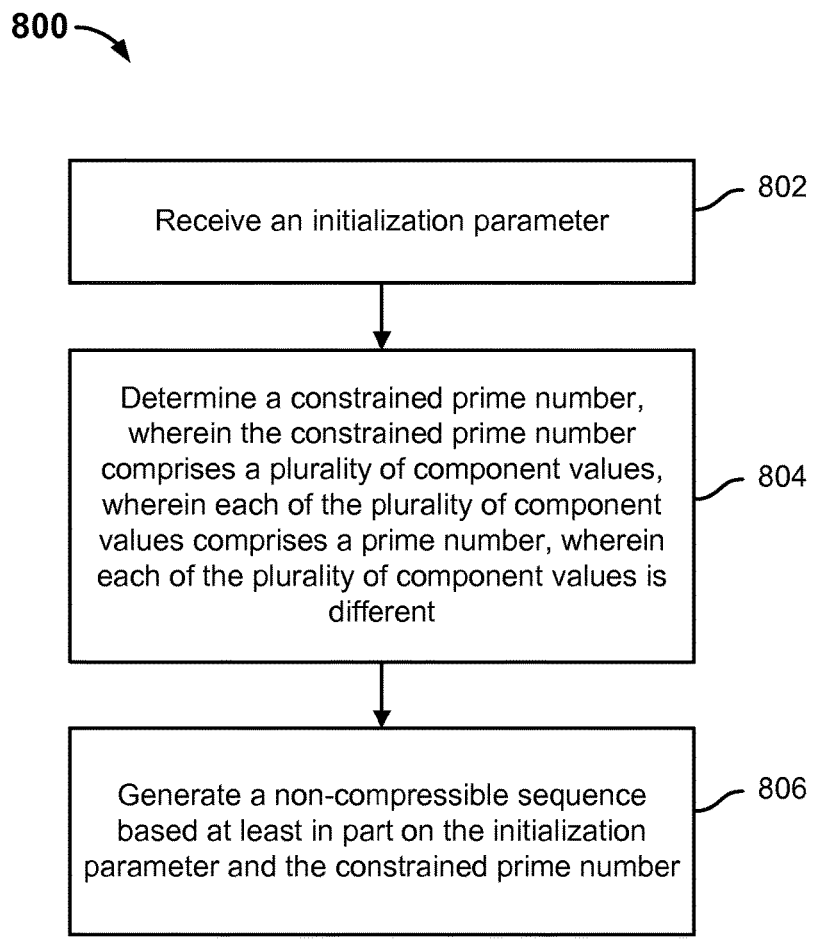
FIG. 8 is a flow diagram showing an embodiment of a process for generating a non-compressible sequence using an initialized parameter and a constrained prime number.

FIG. 8 is a flow diagram showing an embodiment of a process for generating a non-compressible sequence using an initialized parameter and a constrained prime number. In some embodiments, process 800 is implemented at system 100 of FIG. 1. Specifically, in some embodiments, process 800 is implemented at quality assurance server 106 of system 100 of FIG. 1.

At 802, an initialization parameter is received. For example, the initialization parameter can be received from a user input or from a computer program. In some embodiments, the initialization parameter comprises a seed value that is selected from an address space (0, . . . , $2^N-1$), where N is selected to be any positive integer (e.g., 32).

At 804, a constrained prime number is determined, wherein the constrained prime number comprises a plurality of component values, wherein each of the plurality of component values comprises a prime number, wherein each of the plurality of component values is different. In some embodiments, a constrained prime number is selected from the identified set of constrained prime numbers based on a received revision parameter (e.g., associated with the initialization parameter). In some embodiments, a constrained prime number is selected from the identified set of constrained prime numbers based on any appropriate technique. In some embodiments, a set of constrained prime numbers can be identified using a process such as process 700 of FIG. 7.

At 806, a non-compressible sequence is generated based at least in part on the initialization parameter and the constrained prime number. In some embodiments, the initial value of the non-compressible sequence comprises the sum of the seed value and the selected constrained prime number and each subsequent value comprises the sum of the prior value and the constrained prime number.

For example, the sequence generator engine generates the initial 32-bit value of the sequence by computing:

Accumulator=seed+primeM where seed represents the initialization parameter and primeM represents the selected constrained prime number. The sequence generator engine always generates the next 32-bit value of the sequence by computing:

Accumulator=Accumulator+primeM

Please note that the numbers in hexadecimal are written with underscores merely to help visualize the value of the four individual bytes (eight bits each) that are each a component value of a 32-bit (four byte) primeM number.

FIG. 9A is a diagram showing a table that includes 32-bit values of a compressible sequence generated using an initialization parameter and an unconstrained prime number. In FIG. 9A, the initialization parameter ("seed") and the unconstrained prime number ("primeM") used to generate the sequence are represented in hexadecimal as "0E00000E" and "01000201," respectively. The values of the sequence of FIG. 9A are ordered from left-to-right in each row from the top to the bottom. In FIG. 9A, the initial value of the sequence ("0F00020F") is a sum of the seed and the unconstrained prime number and each subsequent value is the sum of the prior value and the unconstrained prime number. Prime number "01000201" is not a constrained prime number because it includes duplicate component byte values of "00" and also a non-prime component byte value of "00." Because an unconstrained prime number was used to generate the sequence, the sequence includes values that can be compressed. Therefore, the sequence generated with an unconstrained prime number is compressible.

As shown in the table of FIG. 9A, within each 32-bit value of the sequence, there can be component byte values that are the same. Some byte values occur much more frequently than other byte values.

FIG. 9B is a diagram showing a frequency analysis table for all component byte values of a sampling of 1,032 bytes of the sequence of FIG. 9A. The frequency values of FIG. 9B are in decimal representation. The most significant hexadecimal nibble values are located down the left of the table. The least significant hexadecimal nibble values are located across the top of the table. The generated data sequence that was shown in FIG. 9A is compressible since the frequency distribution of all 256 possible byte values is not uniformly distributed.

FIG. 10A is a diagram showing a table that includes 32-bit values of a non-compressible sequence generated using an initialization parameter and a constrained prime number. In FIG. 10A, the initialization parameter ("seed") and the constrained prime number ("primeM") used to generate the sequence are represented in hexadecimal as "0E00000E" and "0103050D," respectively. The values of the sequence of FIG. 10A are ordered from left-to-right in each row from the top to the bottom. In FIG. 10A, the initial value of the sequence ("0F03051B") is a sum of the seed and the constrained prime number and each subsequent value is the sum of the prior value and the constrained prime number. Prime number "0103050D" is a constrained prime number because each component byte value is a prime number and there are no duplicate component byte values. Because a constrained prime number was used to generate the sequence, the sequence includes values that cannot be compressed. Therefore, the sequence generated with a constrained prime number is non-compressible.

As shown in the table of FIG. 10A, within each 32-bit value of the sequence, there are rarely component values that are the same. There are no repeated 32-bit values. All the component byte values of the non-compressible sequence of FIG. 10A occur with basically the same frequency. The thirty-six data values in lines #11 through #16 marked by vertical bars are extracted and used in the table of FIG. 11, below.

Figure 10B:
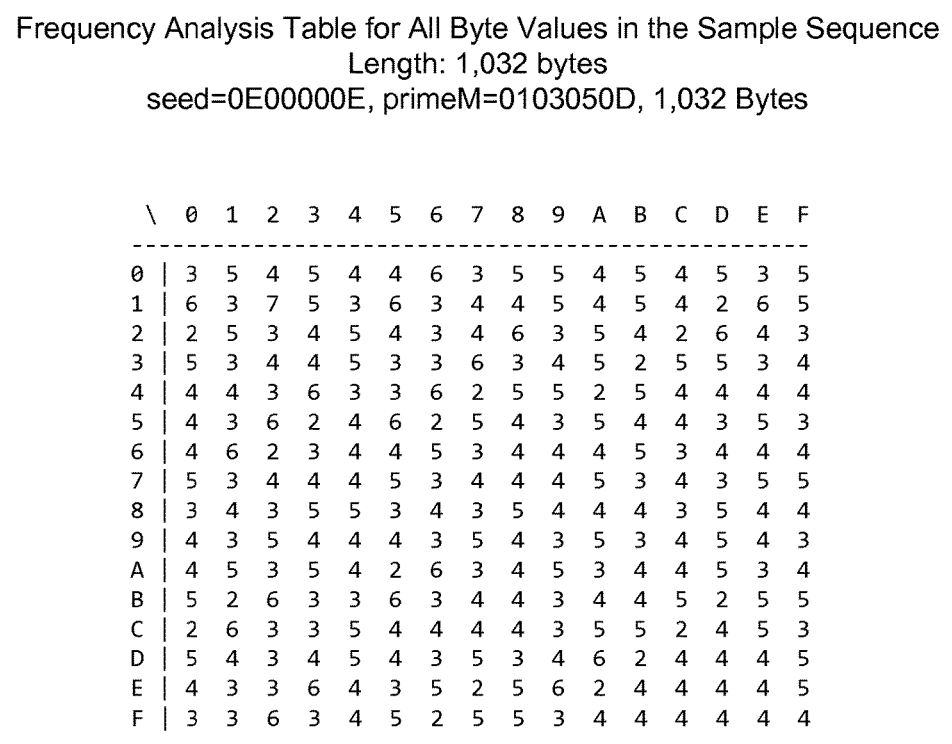

FIG. 10B is a diagram showing a frequency analysis table for all component byte values of a sampling of 1,032 bytes of the sequence of FIG. 10A. The frequency values of FIG. 10B are in decimal representation. The most significant hexadecimal nibble values are located down the left of the table. The least significant hexadecimal nibble values are located across the top of the table. The generated data is not compressible since the frequency distribution of all 256 possible byte values in this sampling of 1032 bytes is near uniformly distributed. Even when the sample size is decreased to 516 bytes or increased to 2064 bytes or higher, the distribution stays near uniform.

Figure 10C:
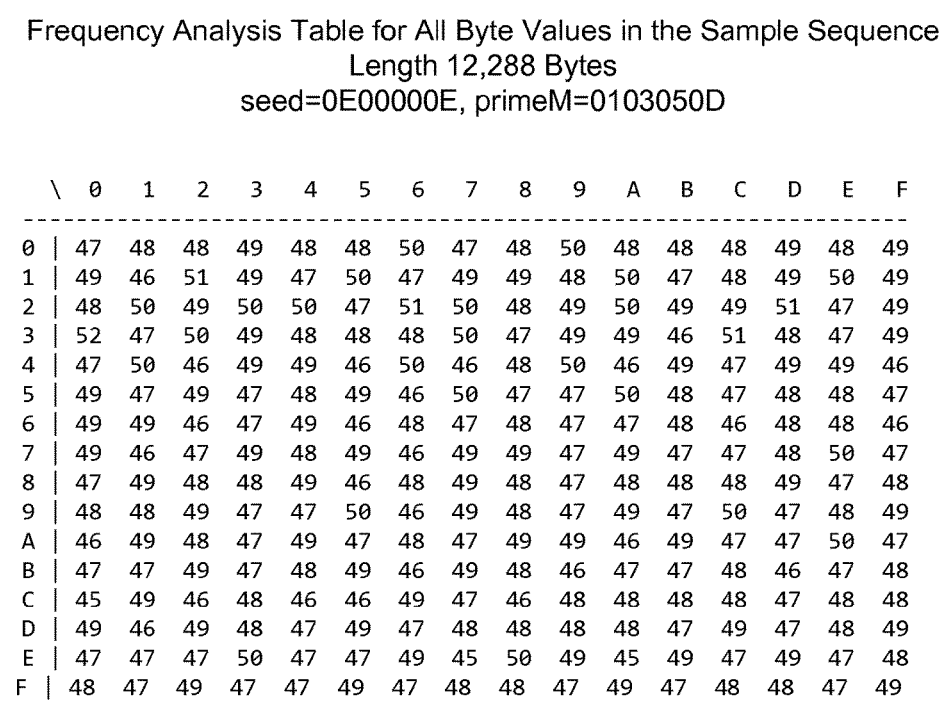

FIG. 10C is a diagram showing a frequency analysis table for all component byte values of a sampling of 12,288 bytes of the sequence of FIG. 10A. The frequency values of FIG. 10C are in decimal representation. The most significant hexadecimal nibble values are located down the left of the table. The least significant hexadecimal nibble values are located across the top of the table. Even though FIG. 10C shows a frequency table with a greater sampling size of the sequence of FIG. 10A than that used in the frequency table of FIG. 10B, the table of FIG. 10C shows that the generated data is not compressible since the frequency distribution of all 256 possible byte values in this sampling of 12,288 bytes is still near uniformly distributed.

FIG. 11 is a diagram showing a table of accumulator (generated data) internal byte value rotations. The thirty-six 32-bit data values used for the table of FIG. 11 are taken from the six marked data lines #11 through #16 in the table of FIG. 10A. The initialization parameter ("seed") used was "0E00000E." The constrained prime number ("primeM") used was "0103050D." Its four component byte values are p3 p2 p1 p0 in bytes b3, b2, b1, b0. All initial component byte values are themselves a prime number (in decimal): 1, 3, 5 and 13. Each time the "accumulator=accumulator+primeM" step is performed, the accumulator bytes increment and rotate plus any applicable carries on each addition. The component byte values in each column visit the 256 values in the eight bit address space as the accumulator value visits the four billion values in the 32-bit address space.

Figure 12:
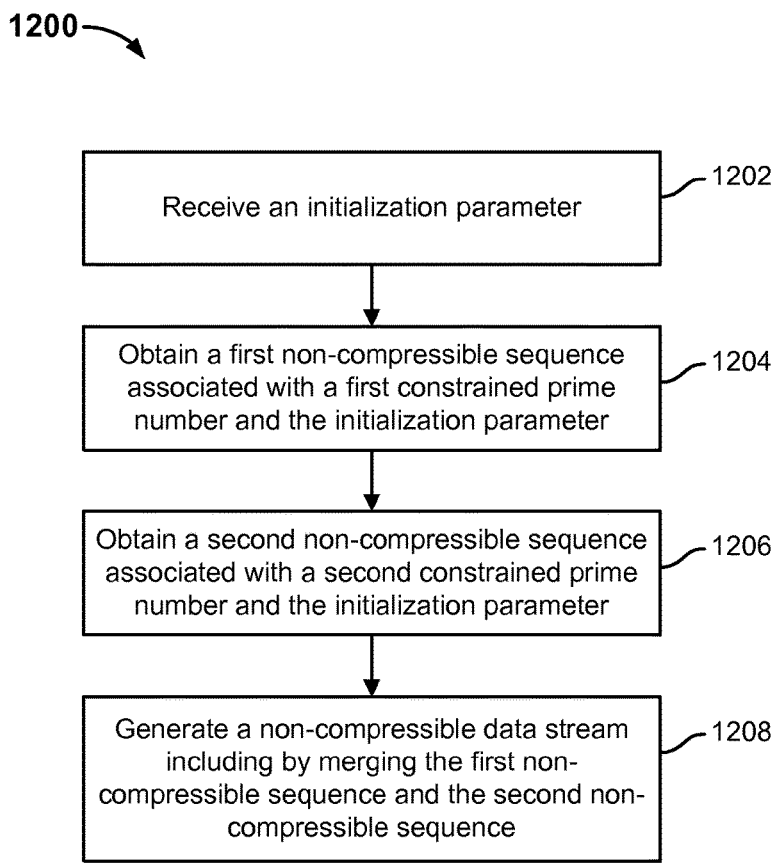
FIG. 12 is a flow diagram showing an embodiment of a process for generating a non-compressible data stream using two constrained prime numbers.

FIG. 12 is a flow diagram showing an embodiment of a process for generating a non-compressible data stream using two constrained prime numbers. In some embodiments, process 1200 is implemented at system 100 of FIG. 1. Specifically, in some embodiments, process 1200 is implemented at quality assurance server 106 of system 100 of FIG. 1.

Process 1200 shows an example process of generating a non-compressible data stream by merging (e.g., interleaving) two sequences, each generated using the same initialization parameter (e.g., a seed value) and a respective unconstrained prime number.

At 1202, an initialization parameter is received. For example, the initialization parameter can be received from a user input or from a computer program. In some embodiments, the initialization parameter comprises a seed value that is selected from an address space $(0, \ldots, 2^N-1)$, where N is selected to be any positive integer (e.g., 32).

At 1204, a first non-compressible sequence associated with a first constrained prime number and the initialization parameter is obtained. In some embodiments, each of two constrained prime numbers is selected from an identified set of constrained prime numbers. In some embodiments, the set of constrained prime numbers is identified using a process such as process 700 of FIG. 7. The two constrained prime numbers may comprise the same constrained prime number or different constrained prime numbers. In some embodiments, the two constrained prime numbers are selected based on a received revision parameter comprising a revision value. In some embodiments, a first non-compressible sequence is generated using the initialization parameter and one of the two constrained prime numbers using a process such as process 800 of FIG. 8. In some embodiments, the first non-compressible sequence is received from another entity.

At 1206, a second non-compressible sequence associated with a second constrained prime number and the initialization parameter is obtained. In some embodiments, a second non-compressible sequence is generated using the initialization parameter and the constrained prime number of the two constrained prime numbers that was not used to generate the first non-compressible sequence of step 1204. In some embodiments, the second non-compressible sequence is generated using the initialization parameter and the constrained prime number of the two prime numbers that was not used to generate the first non-compressible sequence using a process such as process 800 of FIG. 8. In some embodiments, the second non-compressible sequence is received from another entity.

At 1208, a non-compressible data stream is generated including by merging the first non-compressible sequence and the second non-compressible sequence. In some embodiments, a data stream having the property of being non-compressible is generated including by merging the first non-compressible sequence and the second non-compressible sequence. In some embodiments, merging the first non-compressible sequence and the second non-compressible sequence includes interleaving the first and second non-compressible sequences into a new sequence that is referred to as the non-compressible data stream. In some embodiments, the data stream includes a sequence of alternating values from the first and second non-compressible sequences. For example, of two sequences that are to be merged to become the data stream, the first sequence comprises {S11, S12, S13, . . . } and the second sequence comprises {S21, S22, S23, . . . }, then merging the first and second sequences will yield the following data stream {S11, S21, S12, S22, S13 S23, . . . }. In some embodiments, the non-compressible data stream is also not deduplicatable.

In some embodiments, more than two constrained prime numbers from the constrained modified set of prime numbers can be selected based on the revision value and the non-compressible data stream can be generated by merging more than two non-compressible sequences, each of which is generated using the initialization parameter and a respective constrained prime number.

In some embodiments, a non-compressible data stream generated using a process such as process 1200 can be verified using a process such as process 500 of FIG. 5.

FIGS. 13A to 15H illustrate examples of two non-compressible sequences that can be merged to generate a non-compressible data stream. FIGS. 13A to 13E are diagrams that illustrate the values and properties of a first non-compressible sequence that is generated with an initialization parameter (e.g., a seed value) and a first constrained prime number. FIGS. 14A to 14E are diagrams that illustrate the values and properties of a second non-compressible sequence that is generated with the initialization parameter (e.g., a seed value) and a second constrained prime number. FIGS. 15A to 15H are diagrams that illustrate the values and properties of a non-compressible data stream that is generated by merging the two non-compressible sequences respectively associated with FIGS. 13A to 13E and FIGS. 14A to 14E.

FIGS. 13A to 13D are diagrams showing a table that includes 32-bit values of a non-compressible sequence generated using an initialization parameter and a constrained prime number. In FIGS. 13A to 13D, the initialization parameter ("seed") and the constrained prime number ("primeM") used to generate the sequence are represented in hexadecimal as "0E00000E" and "0103050D," respectively. The values of the sequence span FIGS. 13A to 13D and are ordered from left-to-right in each row from the top to the bottom of each figure.

Figure 13E:
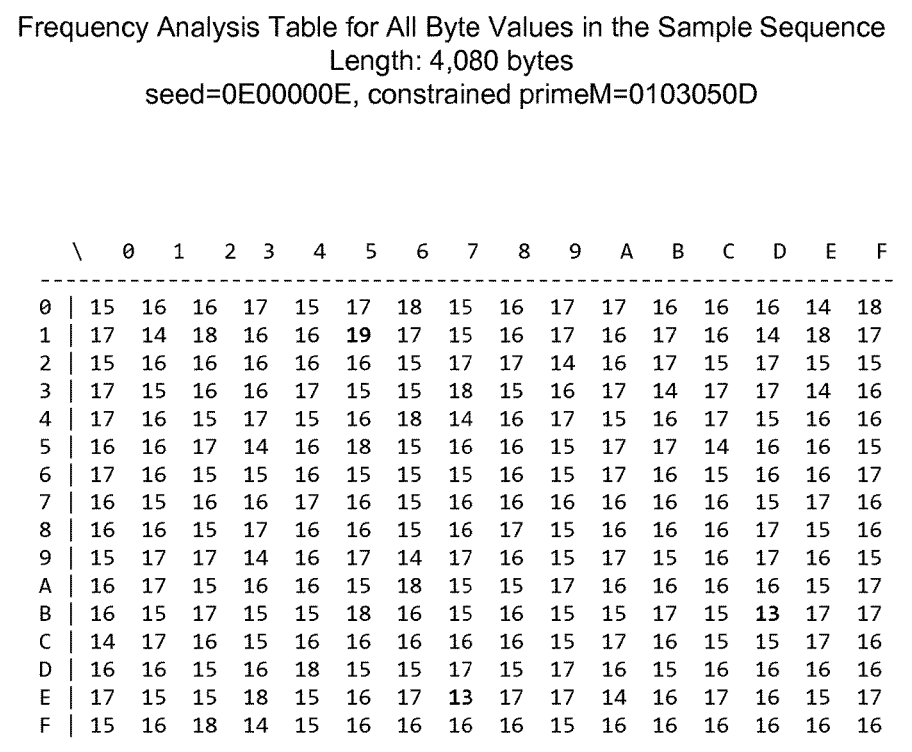

FIG. 13E is a diagram showing a frequency analysis table for all component byte values of 4,080 bytes of the sequence of FIGS. 13A to 13D. The frequency values of FIG. 13E are in decimal representation. The most significant hexadecimal nibble values are located down the left of the table. The highest frequency count is 19. The lowest frequency count is 13. The delta is 6 between the highest and lowest frequency counts. The generated data is not compressible since the frequency distribution of all 256 possible byte values is roughly uniformly distributed.

The uncompressed sequence of FIGS. 13A to 13D has a file size of 4,080 bytes. After compressing the sequence of FIGS. 13A to 13D (e.g., using a known ZIP compression technique), the compressed file size is 4,133 bytes. The data generated using constrained primes is not compressible so therefore the compressed file size is larger than the uncompressed file size due to the compression metadata overhead bytes.

FIGS. 14A to 14D are diagrams showing a table that includes 32-bit values of a non-compressible sequence generated using an initialization parameter and a constrained prime number. In FIGS. 14A to 14D, the initialization parameter ("seed") and the constrained prime number ("primeM") used to generate the sequence are represented in hexadecimal as "0E00000E" and "0305070B," respectively. The values of the sequence span FIGS. 14A to 14D and are ordered from left-to-right in each row from the top to the bottom of each figure.

FIG. 14E is a diagram showing a frequency analysis table for all component byte values of 4,080 bytes of the sequence of FIGS. 14A to 14D. The frequency values of FIG. 14E are in decimal representation. The most significant hexadecimal nibble values are located down the left of the table. The highest frequency count is 20. The lowest frequency count is 12. The delta is 8 between the highest and lowest frequency counts. The generated data is not compressible since the frequency distribution of all 256 possible byte values is roughly uniformly distributed.

The uncompressed sequence of FIGS. 14A to 14D has a file size of 4,080 bytes. After compressing the sequence of FIGS. 14A to 14D (e.g., using a known ZIP compression technique), the compressed file size is 4,133 bytes. The data generated using constrained primes is not compressible so therefore the compressed file size is larger than the uncompressed file size due to the compression metadata overhead bytes.

FIGS. 15A to 15G are diagrams showing a table that includes 32-bit values of a non-compressible data stream generated from merging two non-compressible sequences. In FIGS. 15A to 15G, the initialization parameter ("seed"), the first constrained prime number ("primeM1") used to generate the first sequence (described with FIGS. 13A to 13D, above), and the second constrained prime number ("primeM2") used to generate the second sequence (described with FIGS. 14A to 14D, above) are represented in hexadecimal as "0E00000E," "0103050D," and "0305070B," respectively. The values of the data stream span FIGS. 15A to 15G and are ordered from left-to-right in each row from the top to the bottom of each figure.

Figure 15H:
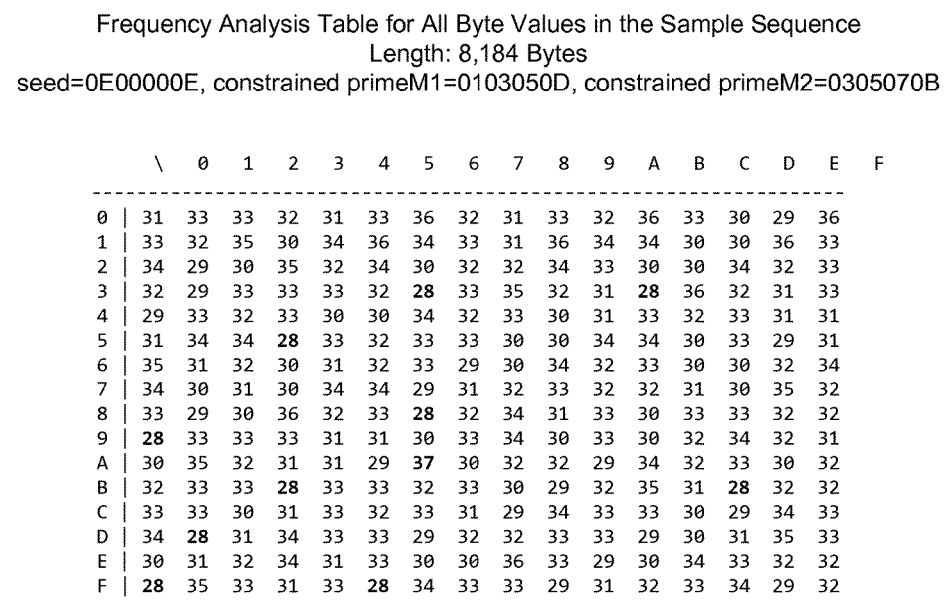

FIG. 15H is a diagram showing a frequency analysis table for all component byte values of 8,124 bytes of the non-compressible data stream of FIGS. 15A to 15G. The frequency values of FIG. 15H are in decimal representation. The most significant hexadecimal nibble values are located down the left of the table. The highest frequency count is 37. The lowest frequency count is 28. The delta is 9 between the highest and lowest frequency counts. The generated data is not compressible since the frequency distribution of all 256 possible byte values is roughly uniformly distributed.

The uncompressed data stream of FIGS. 15A to 15G has a file size of 8,184 bytes. After compressing the sequence of FIGS. 15A to 15G (e.g., using a known ZIP compression technique), the compressed file size is 8,241 bytes. The data generated using constrained primes is not compressible so therefore the compressed file size is larger than the uncompressed file size due to the compression metadata overhead bytes.

In contrast to the examples of FIGS. 13A to 15H, FIGS. 16A to 18H illustrate examples of two compressible sequences that can be merged to generate a compressible data stream. FIGS. 16A to 16E are diagrams that illustrate the values and properties of a first compressible sequence that is generated with an initialization parameter (e.g., a seed value) and a first unconstrained prime number. FIGS. 17A to 17E are diagrams that illustrate the values and properties of a second compressible sequence that is generated with the initialization parameter (e.g., a seed value) and a second unconstrained prime number. FIGS. 18A to 18H are diagrams that illustrate the values and properties of a compressible data stream that is generated by merging the two compressible sequences respectively associated with FIGS. 16A to 16E and FIGS. 17A to 17E, respectively.

FIGS. 16A to 16D are diagrams showing a table that includes 32-bit values of a compressible sequence generated using an initialization parameter and an unconstrained prime number. In FIGS. 16A to 16D, the initialization parameter ("seed") and the unconstrained prime number ("primeM") used to generate the sequence are represented in hexadecimal as "0E00000E" and "01000201," respectively. The values of the sequence span FIGS. 16A to 16D and are ordered from left-to-right in each row from the top to the bottom of each figure.

FIG. 16E is a diagram showing a frequency analysis table for all component byte values of 4,080 bytes of the sequence of FIGS. 16A to 16D. The frequency values of FIG. 16E are in decimal representation. The most significant hexadecimal nibble values are located down the left of the table. The highest frequency count is 140. The lowest frequency count is 10. The delta is 130 between the highest and lowest frequency counts. The generated data is compressible since the frequency distribution of all 256 possible byte values is not uniformly distributed.

The uncompressed sequence of FIGS. 16A to 16D has a file size of 4,080 bytes. After compressing the sequence of FIGS. 16A to 16D (e.g., using a known ZIP compression technique), the compressed file size is 3,934 bytes. The data generated using unconstrained primes is compressible so therefore the uncompressed file size is larger than the compressed file size and the number of bytes removed due to compression exceeds the compression metadata overhead bytes.

FIGS. 17A to 17D are diagrams showing a table that includes 32-bit values of a compressible sequence generated using an initialization parameter and an unconstrained prime number. In FIGS. 17A to 17D, the initialization parameter ("seed") and the unconstrained prime number ("primeM") used to generate the sequence are represented in hexadecimal as "0E00000E" and "00000017," respectively. The values of the sequence span FIGS. 17A to 17D and are ordered from left-to-right in each row from the top to the bottom of each figure.

FIG. 17E is a diagram showing a frequency analysis table for all component byte values of 4,080 bytes of the sequence of FIGS. 17A to 17D. The frequency values of FIG. 17E are in decimal representation. The most significant hexadecimal nibble values are located down the left of the table. The highest frequency count is 1,034. The lowest frequency count is 3. The delta is 1,031 between the highest and lowest frequency counts. The generated data is compressible since the frequency distribution of all 256 possible byte values is not uniformly distributed.

The uncompressed sequence of FIGS. 17A to 17D has a file size of 4,080 bytes. After compressing the sequence of FIGS. 17A to 17D (e.g., using a known ZIP compression technique), the compressed file size is 1,621 bytes. The data generated using unconstrained primes is compressible so therefore the uncompressed file size is larger than the compressed file size and the number of bytes removed due to compression exceeds the compression metadata overhead bytes.

FIGS. 18A to 18G are diagrams showing a table that includes 32-bit values of a compressible data stream generated from merging two compressible sequences. In FIGS. 18A to 18G, the initialization parameter ("seed"), the first unconstrained prime number ("primeM1") used to generate the first sequence (described with FIGS. 16A to 16D, above), and the second unconstrained prime number ("primeM2") used to generate the second sequence (described with FIGS. 17A to 17D, above) are represented in hexadecimal as "0E00000E," "01000201," and "00000017," respectively. The values of the data stream span FIGS. 18A to 18G and are ordered from left-to-right in each row from the top to the bottom of each figure.

FIG. 18H is a diagram showing a frequency analysis table for all component byte values of 8,184 bytes of the compressible data stream of FIGS. 18A to 18G. The frequency values of FIG. 18H are in decimal representation. The most significant hexadecimal nibble values are located down the left of the table. The highest frequency count is 1,176. The lowest frequency count is 15. The delta is 1,161 between the highest and lowest frequency counts. The generated data is compressible since the frequency distribution of all 256 possible byte values is not uniformly distributed.

The uncompressed data stream of FIGS. 18A to 18G has a file size of 8,184 bytes. After compressing the sequence of FIGS. 18A to 18G (e.g., using a known ZIP compression technique), the compressed file size is 6,852 bytes. The data generated using unconstrained primes is compressible so therefore the uncompressed file size is larger than the compressed file size and the number of bytes removed due to compression exceeds the compression metadata overhead bytes.

Turning now to an additional or alternative embodiment of the present disclosure, a method for generating a large, non-compressible data stream by rotating stream values is discussed. The methods and processes discussed above may result in non-compressible data streams having byte values that are nearly equally likely and nearly uniformly distributed throughout the sequence. While these streams may work well to thwart lossless compression algorithms that eliminate redundancy, they may not be as effective when a predictive compression algorithm is applied. There is a need, therefore, for a method and process for generating large, data streams that are non-compressible by predictive compression algorithm.

For example, as discussed above, FIG. 10A depicts a data stream that is not compressible by an algorithm configured to eliminate redundancy. This is because the byte values are nearly equally likely and uniformly distributed through the sequence. Predictive compression algorithms, however, may attempt to identify relationships between bytes in the near vicinity, thereby predicting next byte values based on prior values and making the sequence compressible.

FIG. 19A-D, in combination with FIG. 10A, depict how a predictive algorithm may predict byte values in a sequence, thereby making it compressible. FIG. 19A-D each show the first 24 bytes from the sequence depicted in FIG. 10A, where primeM=0103050D. As shown by the underlined bytes in each figure, the value of each byte is based on the fourth byte prior to it plus the corresponding value of primeM. For example, FIG. 19A shows that every fourth byte is the sum of the previous byte value and 1 (since primeM=1). FIG. 19B demonstrates every fourth byte is the sum of the previous byte value and 3. FIG. 19C shows every fourth byte is the sum of the previous byte value and 5. FIG. 19D shows every fourth byte value is the sum of the previous byte value and 13 (0D in hex). This pattern substantially continues through the sequence depicted in FIG. 10A et seq. In some embodiments, the pattern may not continue when a carry moves to a next higher order during byte addition.

FIG. 20A-D, in combination with FIG. 15A, demonstrate this predictability may also exist within interleaved sequences. FIG. 20A-D each show the first 24 bytes from the sequence depicted in FIG. 15A. Since the sequence is interleaved, there are two primes: primeM1=0103050D and primeM2=0305070B. Since the sequence is interleaved, the value of each byte is based on the eighth (rather than fourth) byte prior to it. The first set of four bytes are calculated using primeM1, the second set of four bytes use primeM2, the third four use primeM1 and so on. As such, a predictive algorithm may determine a bytes value based on the value of the eighth byte prior to it.

Since the sequences depicted in FIGS. 10A and 15A have an identifiable pattern, predictive compression algorithms may compress them by predicting subsequent byte values. To create an uncompressible data stream for a predictive compression algorithm, the byte values of that data stream should be difficult or impossible to predict. A sequence generation algorithm based on bit rotation may satisfy this condition.

In some embodiments, bit rotation may focus on eight byte chunks coming from the regular sequence. For example, the first eight bytes from the interleaved sequence depicted in FIG. 15A are "0F03051B 11050719". While eight byte chunks are used by way of example, other chunk sizes may also be used.

FIG. 21A depicts the binary values for the eight byte chunk. To rotate the chunk, a rotation value must be determined. In an embodiment, the rotation value is based on the last N bits of a given byte value. This could be any byte value in the eight byte chunk (randomly chosen or selected by a user/system), and N may be any number of bits. In some embodiments, N is randomly generated or selected by a user. Additionally or alternatively, the rotation value may be based on any random bits from the eight byte chunk, or may be based on a random number from a random number generator. FIG. 21A shows an embodiment where N=3, and the rotation value is based on the bottom most bits in the fourth byte ("11050719"). Specifically, the bits located at 34:32, assuming an eight byte system. These bits are underlined for easier identification.

In some embodiments, the bits located at 34:32 may be selected because the 32d bit may always flip. Similarly, the bit at position 0 may also always flip. This may result from adding a prime number to each byte to obtain the next byte value. Since the prime is always an odd number, and the addition of an odd number to an even/odd value results in an odd/even flip, the least significant bit (either at position 0 or 32) will always flip.

In FIG. 21A, the binary value (011) selected as the rotation value equals three. The rotation value therefore equals three. Once a rotation value is determined, the chunk of the bit stream may be circularly rotated left or right by that value. For example, FIG. 21B and FIG. 21C depict a right circular rotation by the rotation value, three. A left or right determination may be based on user preference and/or policy.

FIG. 21B demonstrates the rotation by the bold/italics right three bits. Since the sequence is rotating right by a value of three, these rightmost bits may end up at the front of the final rotated eight byte chunk. FIG. 21C depicts the final binary, eight byte chunk after the rotation. As shown, the bold/italics bits are now at the start of the chunk, and every other bit has rotated right by three positions.

The new eight byte chunk resulting from the rotation may be "21E060A3 6220A0E3", compared to the original "0F03051B 11050719". The process may continue to rotate the next eight byte chunk until all the chunks in the sequence have been rotated. This may result in a data stream that defeats predictive compression algorithms and subsequent byte values are difficult to predict. The sequence may also preserve the benefits over other compression algorithms as the values still remain fairly distributed. FIG. 22 depicts the starting values of a final rotated sequence based on the parameters discussed above and the original sequence depicted in FIG. 15A-G.

Figure 23:
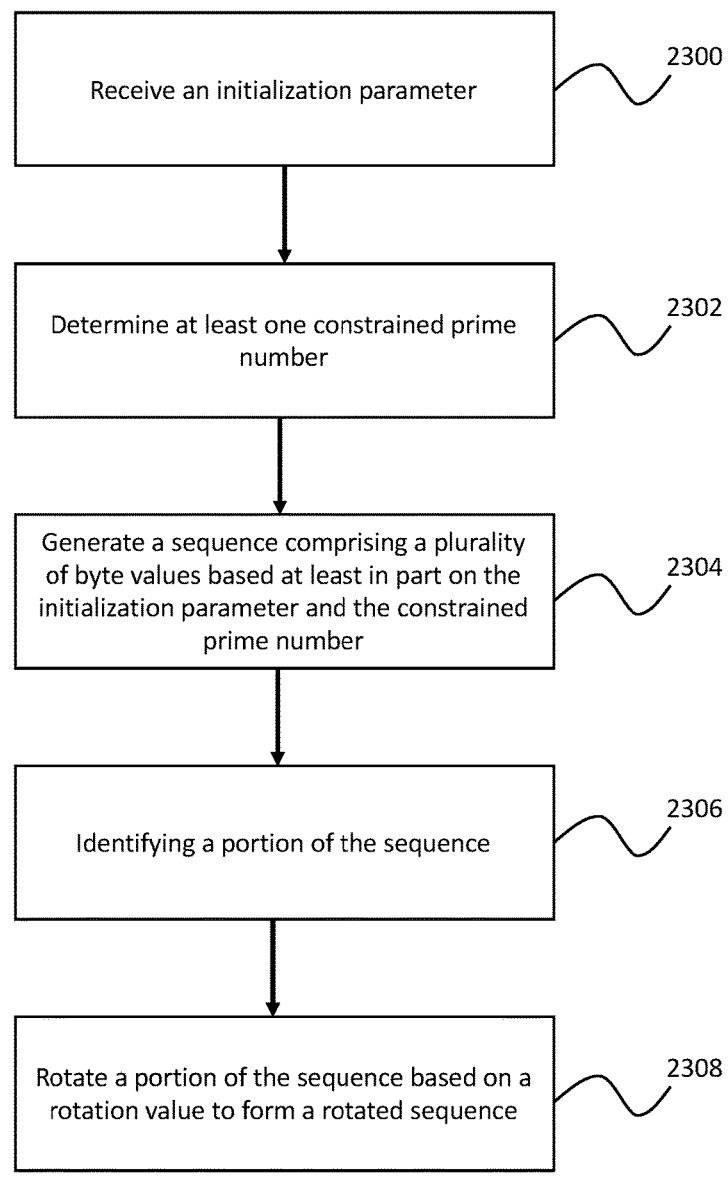
FIG. 23 depicts a process for bit rotation consistent with an embodiment of the present disclosure.

Turning now to FIG. 23, a sample process for generating a large, non-compressible data stream by rotating values is discussed. This process may be, for example, similar to that discussed in reference FIG. 21A et seq, or any other process discussed herein.

At block 2300 an initialization parameter may be received, and at block 2302 at least one constrained prime number may be determined. In some embodiments, multiple constrained prime numbers may be determined. These blocks may be substantially similar to those discussed above in reference to generating sequences.

At 2304, a sequence comprising a plurality of byte values may be generated. This sequence may be based at least in part on the initialization parameter and the one or more constrained prime numbers. If multiple constrained prime numbers are used, generating the sequence may comprise interleaving a plurality of sequences. This step may be substantially similar to that discussed above.

At block 2306, a portion of the sequence may be identified. This portion may be a chunk from the sequence, such as the eight byte chunk discussed above.

Finally, at block 2308, the portion of the sequence may be rotated to form a rotated sequence. In some embodiments, the rotation may be based on a rotation value. This rotation value may be calculated in many ways, some of which are discussed above.

Once a portion of the sequence has been rotated, the process may continue to a next portion, such as the next eight byte chunk, and rotate that as well. This may continue until all the portions of the sequence have been rotated.

Turning now to FIG. 24A-C, an additional or alternative method for bit rotation is discussed. In some embodiments, bit values at a specific location may be used as an index into an array or other data structure. This data structure may contain integer values, which may be used as the rotation value. For example, the data structure may contain the set PrimeM and/or a set of constrained prime numbers. In some embodiments, multiple data structures may be used with different values at each index.

For example, FIG. 24A depicts a plurality of bits comprising an eight byte chunk. As discussed in reference to FIG. 21A, the underlined bits may be selected to use during a rotation. This selection process may be substantially similar to that discussed above.

Once the bits have been selected, they may be used as an index into a data structure containing integer values. For example, the data structure may comprise an array of prime numbers: 3, 5, 7, 11, 13, 17, 19, 23. In the present example, the selected bits equal 3. The value at location 3 in the array is 11, and 11 may therefore be used as the rotation value.

FIG. 24B depicts the bits selected for rotation. The 11 bold, italicized bits are selected using the rotation value from the data structure. Finally, FIG. 24C depicts the bit values of the eight byte chunk after rotation. Note that the present example uses a right rotation, but a left rotation may also be used.

After the rotation is complete, the process may repeat for each subsequent chunk in the data stream. The may result in a data stream that is not compressible by predictive compression algorithms.

Figure 25:
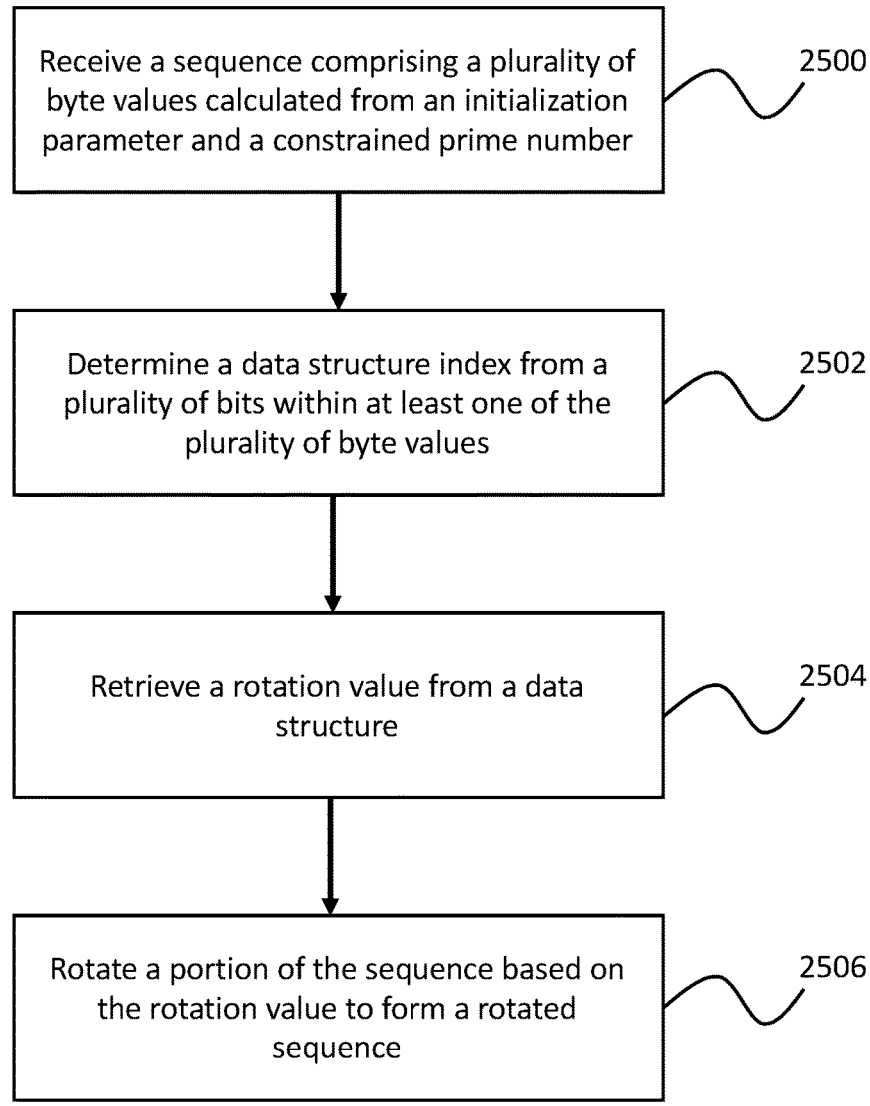
FIG. 25 depicts an additional or alternative method for bit rotation.

Turning now to FIG. 25, a process for bit rotation using a data structure is discussed. This process may be, for example, similar to that discussed in reference to FIG. 24A-C.

At 2500, a sequence comprising a plurality of byte values calculated from an initialization parameter and a constrained prime number may be received. This sequence may be generated using any method discussed herein.

At 2502, a data structure index may be determined from a plurality of bits within at least one of the plurality of byte values. For example, an eight byte chunk may be selected from the sequence, and bits somewhere within that chunk may be selected. These could be the bits at location 34:32, as used by the example shown in FIG. 24A.

Once determined, the data structure index may be used to retrieve a rotation value from a data structure at block 2504. This data structure could be, for example, an array of prime and/or constrained prime numbers.

Finally, at 2506, a portion of the sequence may be rotated based on the selected rotation value. For example, the portion may be an eight byte chunk as shown in FIG. 24A-C. The rotation may be either left or right. After rotating the portion, a next portion may be selected and the process may repeat. This may continue until each successive portion of the sequence has been rotated.

Although the foregoing embodiments have been described in some detail for purposes of clarity of understanding, the invention is not limited to the details provided. There are many alternative ways of implementing the invention. The disclosed embodiments are illustrative and not restrictive.

What is claimed is:

1. A system for generating a large non-compressible data stream by rotating bit values, comprising:
    a processor configured to:
        receive an initialization parameter;
        determine a first constrained prime number and a second constrained prime number, wherein a constrained prime number comprises a plurality of component values, wherein each of the plurality of component values comprises a prime number, wherein each of the plurality of component values is different;
        generate a non-compressible data stream comprising a plurality of data blocks at least in part by:
            generate a first non-compressible sequence based at least in part on the initialization parameter and the first constrained prime number;
            generate a second non-compressible sequence based at least in part on the initialization parameter and the second constrained prime number, wherein the first and second non-compressible sequences are each comprised of a non-repeating sequence of numbers; and
            merge the first non-compressible sequence and the second non-compressible sequence to generate the non-compressible data stream, wherein values of the non-compressible data stream alternate between values of the first non-compressible sequence and values of the second non-compressible sequence;
        determine a data structure index from a plurality of bits within at least one of a plurality of byte values from the non-compressible data stream;
        retrieve a rotation value from a data structure, wherein the rotation value is stored in the data structure at the data structure index;
        rotate a portion of the non-compressible data stream based on the rotation value to form a rotated non-compressible data stream, the rotated non-compressible data stream comprising the plurality of data blocks; and
        send the rotated non-compressible data stream to be stored at a storage device, wherein the storage device is configured to store all of the plurality of data blocks in response to determining that none of the data blocks have been already stored at the storage device;
        receive restored data associated with the rotated non-compressible data stream from the storage device, wherein the restored data associated with the non-compressible data stream comprises the plurality of data blocks;
determine the first constrained prime number based at least in part on a difference between a first pair of non-consecutive values from the restored data associated with the rotated non-compressible data stream;
determine the second constrained prime number based at least in part on a difference between a second pair of non-consecutive values from the restored data associated with the rotated non-compressible data stream; and
verify an accuracy and/or reliability of the storage device, wherein to verify the accuracy and/or reliability of the storage device, the restored data associated with the rotated non-compressible data stream is verified by using the determined first constrained prime number and the determined second constrained prime number; and
a memory coupled to the processor and configured to provide the processor with instructions.

2. The system of claim 1, wherein the data structure comprises an array of constrained prime numbers.

3. The system of claim 1, wherein the data structure comprises an array of prime numbers.

4. The system of claim 1, wherein the portion of the non-compressible data stream is rotated left.

5. The system of claim 1, wherein the portion of the non-compressible data stream is rotated right.

6. A method for generating a large non-compressible data stream by rotating bit values, comprising:
receiving an initialization parameter;
determining a first constrained prime number and a second constrained prime number, wherein a constrained prime number comprises a plurality of component values, wherein each of the plurality of component values comprises a prime number, wherein each of the plurality of component values is different;
generating a non-compressible data stream comprising a plurality of data blocks at least in part by:
generating a first non-compressible sequence based at least in part on the initialization parameter and the first constrained prime number;
generating a second non-compressible sequence based at least in part on the initialization parameter and the second constrained prime number, wherein the first and second non-compressible sequences are each comprised of a non-repeating sequence of numbers; and
merging the first non-compressible sequence and the second non-compressible sequence to generate the non-compressible data stream, wherein values of the non-compressible data stream alternate between values of the first non-compressible sequence and values of the second non-compressible sequence;
determining a data structure index from a plurality of bits within at least one of a plurality of byte values from the non-compressible data stream;
retrieving a rotation value from a data structure, wherein the rotation value is stored in the data structure at the data structure index;
rotating a portion of the non-compressible data stream based on the rotation value to form a rotated non-compressible data stream, the rotated non-compressible data stream comprising the plurality of data blocks; and sending the rotated non-compressible data stream to be stored at a storage device, wherein the storage device is configured to store all of the plurality of data blocks in response to determining that none of the data blocks have been already stored at the storage device;
receiving restored data associated with the rotated non-compressible data stream from the storage device, wherein the restored data associated with the non-compressible data stream comprises the plurality of data blocks;
determining the first constrained prime number based at least in part on a difference between a first pair of non-consecutive values from the restored data associated with the rotated non-compressible data stream;
determining the second constrained prime number based at least in part on a difference between a second pair of non-consecutive values from the restored data associated with the rotated non-compressible data stream; and
verifying an accuracy and/or reliability of the storage device, wherein to verify the accuracy and/or reliability of the storage device, the restored data associated with the rotated non-compressible data stream is verified by using the determined first constrained prime number and the determined second constrained prime number.

7. The method of claim 6, wherein the data structure comprises an array of constrained prime numbers.

8. The method of claim 6, wherein the data structure comprises an array of prime numbers.

9. The method of claim 6, wherein the portion of the non-compressible data stream is rotated left.

10. The method of claim 6, wherein the portion of the non-compressible data stream is rotated right.

11. A computer program product for generating a large non-compressible data stream by rotating bit values, the computer program product embodied in a nontransitory computer readable storage medium and comprising computer instructions for:
receiving an initialization parameter;
determining a first constrained prime number and a second constrained prime number, wherein a constrained prime number comprises a plurality of component values, wherein each of the plurality of component values comprises a prime number, wherein each of the plurality of component values is different;
generating a non-compressible data stream comprising a plurality of data blocks at least in part by:
generating a first non-compressible sequence based at least in part on the initialization parameter and the first constrained prime number;
generating a second non-compressible sequence based at least in part on the initialization parameter and the second constrained prime number, wherein the first and second non-compressible sequences are each comprised of a non-repeating sequence of numbers; and
merging the first non-compressible sequence and the second non-compressible sequence to generate the non-compressible data stream, wherein values of the non-compressible data stream alternate between values of the first non-compressible sequence and values of the second non-compressible sequence;
determining a data structure index from a plurality of bits within at least one of a plurality of byte values from the non-compressible data stream;
retrieving a rotation value from a data structure, wherein the rotation value is stored in the data structure at the data structure index;

rotating a portion of the non-compressible data stream based on the rotation value to form a rotated non-compressible data stream, the rotated non-compressible data stream comprising the plurality of data blocks; and sending the rotated non-compressible data stream to be stored at a storage device wherein the storage device is configured to store all of the plurality of data blocks in response to determining that none of the data blocks have been already stored at the storage device;

receiving restored data associated with the rotated non-compressible data stream from the storage device, wherein the restored data associated with the non-compressible data stream comprises the plurality of data blocks;

determining the first constrained prime number based at least in part on a difference between a first pair of non-consecutive values from the restored data associated with the rotated non-compressible data stream;

determining the second constrained prime number based at least in part on a difference between a second pair of non-consecutive values from the restored data associated with the rotated non-compressible data stream; and verifying an accuracy and/or reliability of the storage device, wherein to verify the accuracy and/or reliability of the storage device, the restored data associated with the rotated non-compressible data stream is verified by using the determined first constrained prime number and the determined second constrained prime number.

12. The computer program product of claim 11, wherein the data structure comprises an array of constrained prime numbers.

13. The computer program product of claim 11, wherein the data structure comprises an array of prime numbers.

14. The computer program product of claim 11, wherein the portion of the non-compressible data stream is rotated left.

15. The computer program product of claim 11, wherein the portion of the non-compressible data stream is rotated right.

* * * * *